United States Patent
Yazaki et al.

(10) Patent No.: US 7,408,935 B2
(45) Date of Patent: *Aug. 5, 2008

(54) PACKET FORWARDING APPARATUS WITH A FLOW DETECTION TABLE

(75) Inventors: Takeki Yazaki, Hachioji (JP); Takeshi Aimoto, Sagamihara (JP); Kazuo Sugai, Ebina (JP); Nobuhito Matsuyama, Hadano (JP)

(73) Assignee: Hitachi, Ltd., Tokyo (JP)

( * ) Notice: Subject to any disclaimer, the term of this patent is extended or adjusted under 35 U.S.C. 154(b) by 836 days.

This patent is subject to a terminal disclaimer.

(21) Appl. No.: 10/836,228

(22) Filed: May 3, 2004

(65) Prior Publication Data

US 2004/0202184 A1  Oct. 14, 2004

Related U.S. Application Data

(63) Continuation of application No. 09/393,326, filed on Sep. 10, 1999, now Pat. No. 6,768,738.

(30) Foreign Application Priority Data

Oct. 5, 1998 (JP) ............................... 10-282206
Feb. 25, 1999 (JP) ............................... 11-047591

(51) Int. Cl.
 *H04L 12/28* (2006.01)
(52) U.S. Cl. ................. 370/392; 370/400; 370/465
(58) Field of Classification Search ............. 370/392, 370/400, 233, 395.42, 389, 401, 420, 421, 370/395.21, 231, 235; 455/445
See application file for complete search history.

(56) References Cited

U.S. PATENT DOCUMENTS 4,638,477 A * 1/1987 Okada et al. ............... 370/400

(Continued)

FOREIGN PATENT DOCUMENTS

EP          871 309          10/1998

(Continued)

OTHER PUBLICATIONS

Srinivasan, V. et al, "Fast and Scalable Layer Four Switching", SIGCOMM 1998, Vancouver, BC, pp. 191-202.

(Continued)

*Primary Examiner*—Hassan Kizou
*Assistant Examiner*—Mounir Moutaouakil
(74) *Attorney, Agent, or Firm*—Mattingly, Stanger, Malur & Brundidge, PC

(57) ABSTRACT

A packet forwarding apparatus provided with a plurality of line interface units, comprises a routing processing unit for referring to a routing table, based on header information of received packet to specify one of output lines to output the received packet, a flow detection unit for referring to an entry table, in which a plurality of entries with flow conditions and control information are registered, to retrieve control information defined by the entry with a flow condition which coincides with that of the header information of the received packet, and a packet forwarding unit for transferring the received packet to one of the line interface units connected to the output line specified by the routing processing unit. The entry table id divided into a plurality of subtables corresponding to the values of flow attributes associated with the received packets and the flow detection unit retrieves the control information from one of said subtables specified by the value of the flow attribute corresponding to the received packet.

4 Claims, 38 Drawing Sheets

U.S. PATENT DOCUMENTS

| | | | | |
|---|---|---|---|---|
| 5,504,743 | A * | 4/1996 | Drefenstedt | 370/395.32 |
| 5,636,210 | A * | 6/1997 | Agrawal | 370/390 |
| 5,748,905 | A * | 5/1998 | Hauser et al. | 709/249 |
| 6,038,217 | A * | 3/2000 | Lyles | 370/233 |
| 6,104,700 | A * | 8/2000 | Haddock et al. | 370/235 |
| 6,157,614 | A * | 12/2000 | Pasternak et al. | 370/236 |
| 6,157,955 | A * | 12/2000 | Narad et al. | 709/228 |
| 6,167,049 | A * | 12/2000 | Pei et al. | 370/395.43 |
| 6,272,109 | B1 * | 8/2001 | Pei et al. | 370/230 |
| 6,279,035 | B1 * | 8/2001 | Brown et al. | 709/224 |
| 6,363,253 | B1 * | 3/2002 | Valentine et al. | 455/445 |
| 6,587,457 | B1 * | 7/2003 | Mikkonen | 370/356 |
| 6,768,738 | B1 * | 7/2004 | Yazaki et al. | 370/392 |

FOREIGN PATENT DOCUMENTS

| | | |
|---|---|---|
| JP | 6-104900 | 4/1994 |
| JP | 6-197128 | 7/1994 |
| JP | 6-232904 | 8/1994 |
| JP | 10-222535 | 8/1998 |
| WO | 98/38771 | 9/1998 |

OTHER PUBLICATIONS

Srinivasan V. et al, "Fast and Scalable Layer Four Switching," Computer Communications Review, US, Association for Computing Machinery, New York, vol. 28, No. 4, pp. 191-202.

IETF RFC 2475.

"The ATM forum Traffic Management Specification Version 4.0", May 3, 2004.

* cited by examiner

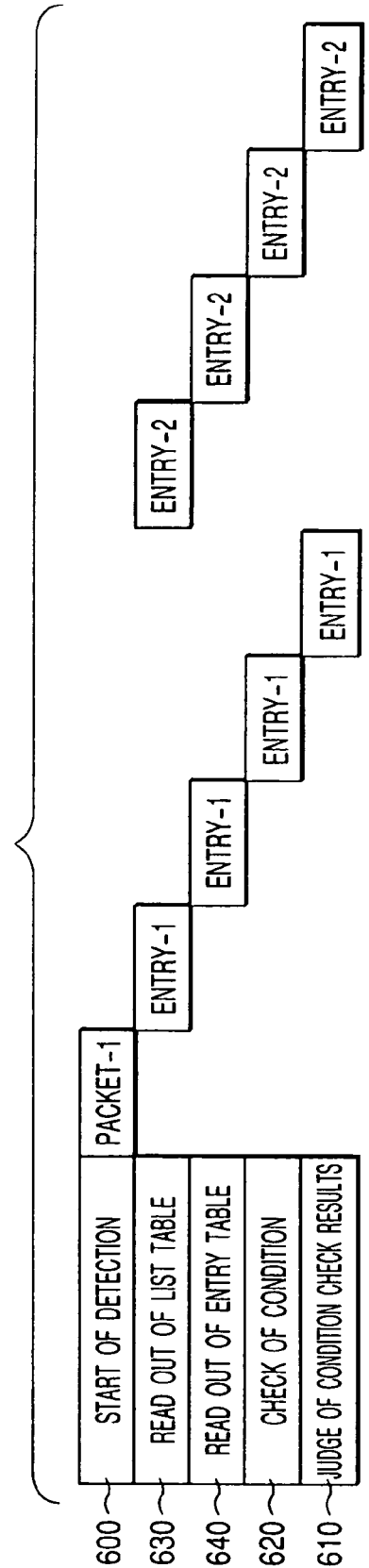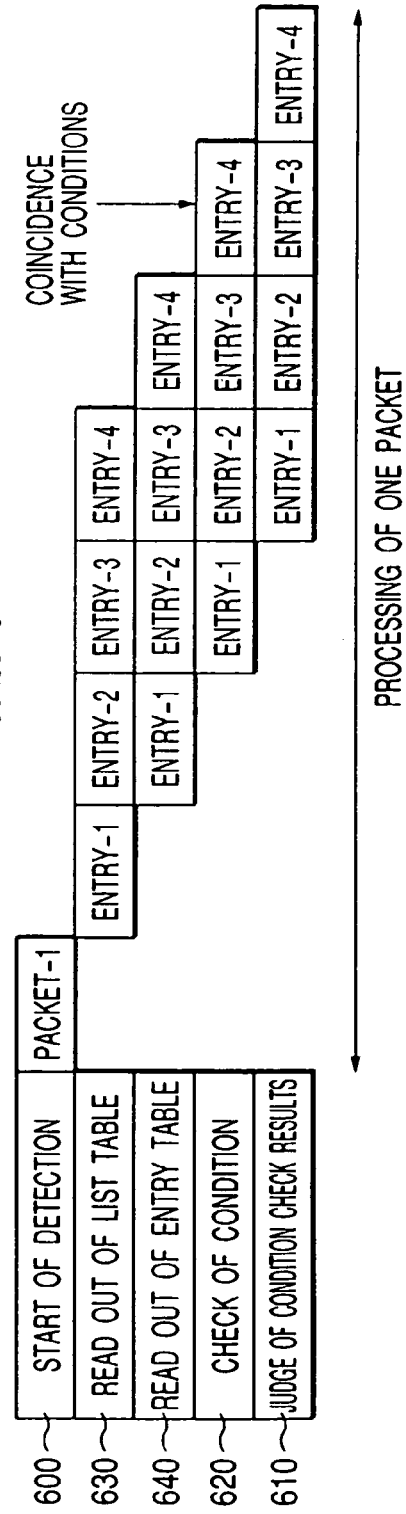

| APPLICATION | PORT NO. |
|---|---|
| FTP | 21 |
| TELNET | 23 |
| SMTP | 25 |
| HTTP | 80 |

PACKET FORWARDING APPARATUS WITH A FLOW DETECTION TABLE

The above-referenced patent application is a continuation application of U.S. Ser. No. 09/393,326 filed Sep. 10, 1999, which is now U.S. Pat. No. 6,768,738, from which priority is claimed under 35 U.S.C. § 120.

BACKGROUND OF THE INVENTION

1. Field of the Invention

The present invention relates to a packet forwarding apparatus wherein a plurality of networks are connected to one another and packets are forwarded between the networks.

2. Description of the Related Art

Traffics (packets), which flow over an Internet, are increasing rapidly with an increase in Internet users. Since the same line can be shared between packets sent from a large number of users in a packet type communication system employed in the Internet, the cost per bandwidth can be less reduced. The non-execution of strict management of quality control or the like for each users also leads to the implementation of a cost reduction.

Owing to the advantage of the low cost, which is held by the packet type communication system, moves have been made to integrate telephone networks and enterprise networks which have heretofore been implemented by dedicated networks, into one by the Internet thereby to implement a reduction in communication cost. It is necessary to implement quality of service (QoS) such as a low delay time, a low discard rate, etc. which have been carried out by the conventional telephone networks or enterprise networks, and security even over the Internet for the purpose of integrating these plural networks into one.

As to QoS control for implementing QoS, forwarding or transfer control must be effected on respective packets with priority corresponding to a contract while specific applications (such as telephone traffics, etc.) and individual users (enterprises, etc.) taken as objects to be controlled are being identified. The QoS control is generally used in an ATM (Asynchronous Transfer Mode) switch. The QoS control of the ATM switch is implemented by a bandwidth monitoring device for monitoring the presence or absence of a breach of a contracted bandwidth at the entrance of a network, and a priority control forwarding device for preferentially forwarding each packet made compliant with the contracted bandwidth with the contracted priority.

The priority control forwarding device employed in the ATM switch has been described in, for example, Japanese Patent Application Laid-Open No. Hei 6-197128 (prior art 1). In the prior art 1, two output buffers for CBR (Constant Bit Rate) and VBR (Variable Bit Rate) are provided every output lines, and the priority for outputting each cell stored in the buffer for CBR is set higher than that for each cell stored in the buffer for VBR, whereby a communication delay time in the ATM switch is limited to within a constant value with respect to a cell group of CBR traffics having a strict restriction on a communication delay.

Further, the bandwidth monitoring function employed in the ATM switch has been described in, for example, Chapter 4 of "The ATM Forum Traffic Management Specification Version 4.0" (prior art 2). In the prior art 2, bandwidth monitoring based on GCRA (Generic Cell Rate Algorithm) corresponding to an algorithm for bandwidth monitoring is effected at the entrance of each network, whereby resources for the network can be prevented from being occupied by a specific user.

The ATM switch is a connecting device for connection type communications, wherein a user packet having a fixed length is communicated after a connection has been established between terminals. When the ATM switch receives a cell from an input line, it reads bandwidth monitoring information and QoS control information such as priority information for cell transfer, etc. from a connection information table provided in the ATM switch, based on connection information indicative of users and applications, included in a header of the input cell, thereby to perform bandwidth monitoring based on the bandwidth monitoring information and priority control of cell forwarding according to the priority information.

On the other hand, a router device is a connecting device for packet type (connection-less type) communications, in which a user packet is communicated without establishing a connection between terminals in advance. The router does not have the connection information table for storing the bandwidth monitoring information and the QoS control information as in the ATM switch. Therefore, the router device must be provided with a flow detector or detection device for detecting bandwidth monitoring information and priority information from header information set every input packets in order to perform priority transfer control and bandwidth monitoring. It is further necessary to control the bandwidth monitoring and the priority transfer, based on the bandwidth monitoring information and the priority information detected by the flow detector.

In the specification of the present application, a packet identification condition defined by a combination of a plurality of items of parameter information included in a packet header will be called "flow condition", a traffic comprised of a series of packets coincident with the flow condition will be called "flow", and determination as to whether header information of each received packet coincides with a predetermined flow condition, will be called "flow detection", respectively.

The QoS control employed in the router device has been disclosed in, for example, Japanese Patent Application Laid-Open No. Hei 6-232904 (prior art 3). In order to execute the QoS control, a router disclosed in the prior art 3 has a mapping table which holds priorities in association with all the combinations of priority identification information and protocol (upper application) information which will be included within the packet header so that the router executes priority forwarding control by determining the priority for each input packet from the mapping table.

As another prior art related to the QoS control employed in the router device, there is known Diffserv (Differentiated Service) indicated by RFC2475 (prior art 4) of IETF (Internet Engineering Task Force).

According to the prior art 4, for example, when an edge router 326 or 327 called a boundary node located in the entrance of an Internet 325 in a network shown in FIG. 2 in which QoS is contracted between enterprise networks A, B, C and D and the Internet 325, receives a packet sent from an enterprise network 321 or 324, it performs a flow detection through a flow detector called classifier, with a source IP address and a destination IP address, a source port number and a destination port number, protocol, etc. in a TCP/IP header as flow conditions respectively. Each boundary node monitors a bandwidth for each flow detected by the classifier and writes the result of determination of DS indicative of each priority in the Internet 325 into a DS field (TOS field) of each received packet. A backbone router (called an interior node in the prior art 4) corresponding to a core node of the Internet 325 performs QoS control on each packet, based on the value of each DS field referred to above.

The flow detection is a technique necessary even for filtering to keep security. In a connection type communication network, for example, each terminal is controlled so that a connection is established only between the terminal and a pre-allowed communication opposite party, and a connection between the terminal and a non-allowed communication opposite party is prohibited from establishing, whereby the reception of cells from an unexpected terminal can be avoided. However, since there is a possibility that in a packet type communication network which starts communication without establishing a connection, each individual terminals will receive packets from all the other terminals connected to networks, it is necessary to provide a filtering function for completely discarding packets sent from unexpected opposite parties.

In order to perform filtering on each received packet, a router needs to effect a flow detection for identifying each packet for filtering, on each input packet in a manner similar to the QoS control to thereby generate control information indicative of whether or not packet transfer is allowed and to selectively transfer or discard the input packets.

The filtering employed in the router device has been described in, for example, Japanese Patent Application Laid-Open No. Hei 6-104900 (prior art 5). In the prior art 5, a LAN-to-LAN connecting device is provided with a filtering table indicative of the correspondence between source addresses and destination addresses, and only such packets that are proceeding from the source address to the destination address registered in the filtering table is set as an object to be transferred, whereby the filtering is implemented.

SUMMARY OF THE INVENTION

When the number of flows to be detected by each router increases as Internet users increase, flow detection devices capable of setting a large number of flow conditions are necessary for the respective routers. With an increase in traffic flowing over the Internet and the speeding up of a line rate, the shortening of a processing desired time interval per packet and high speed execution of QoS control (priority forwarding control, bandwidth monitoring, etc.) and filtering under high volumes of flow condition entries are required for each router. It is also desirable that a manager for each router is able to easily set a variety of flow conditions to an entry table of each router. However, these problems remain unsolved in the prior arts 3, 4 and 5.

A principal object of the present invention is to provide a packet forwarding apparatus capable of setting flow conditions comprised of a plurality of items including user identification information, protocol information, priority identification information, etc. in large quantity and performing a flow detection, QoS control and filtering at high speed.

Another object of the present invention is to provide a packet forwarding apparatus capable of flexibly coping with the request of a router's manager and easily registering a variety of flow conditions.

In a network wherein routers are connected to one another by an ATM network or frame relay network as shown in FIG. 46 by way of example, there is a possibility that a congestion incident to an excessive traffic will occur in a public ATM network 4301 and hence QoS cannot be maintained. Therefore, high-speed QoS control is necessary even for the ATM network and frame relay network which connect between the routers. However, the prior arts 3, 4 and 5 lack a useful technical disclosure related to a method of determining connections such as VC/VP (Virtual Channel/Virtual Path), DLCI, etc. for high-speed flow detection and QoS control necessary for these networks.

A further object of the present invention is to provide a router which rapidly determines VC/VP or DLCI and is effective for QoS control of an ATM network and a frame relay network.

In order to achieve the above objects, there is provided a packet forwarding apparatus according to the present invention, wherein an entry table referred to for detecting flows to which respective input packets belong, is divided into a plurality of subtables respectively corresponding to the values of flow attributes associated with the respective packets.

Described more specifically, according to the present invention, the packet forwarding apparatus provided with a plurality of Line interface units each connected to an input line and an output line, comprises: a routing processing unit for referring to a routing table, based on header information of packets received from the input lines by said line interface units to specify one of the output lines for each of said received packets to output the packet; a flow detection unit for retrieving, by referring to an entry table with a plurality of entries each including a flow condition and control information therein, control information defined by one of said entries with a flow condition coincide with that of the header information of said received packet; and a packet forwarding unit for transferring the received packet to one of said line interface units connected to the output line specified by the routing processing unit; and wherein said entry table comprises of a plurality of subtables respectively corresponding to the values of flow attributes associated with the received packets, and the flow detection unit retrieves the control information for each of said received packets from the subtable specified by the value of the flow attribute associated with the received packet, and the packet forwarding unit controls the transfer of each of said received packets to one of said line interface units in accordance with the control information notified from the flow detection unit.

According to a preferred embodiment of the present invention, the entry table comprises a first table for storing the plurality of entries therein and a list table for storing therein pointer addresses for accessing the entries lying within the first table. The list table is divided into a plurality of sub-list tables corresponding to the values of the flow attributes. The flow detection unit refers to one of said sub-list tables specified by the value of the flow attribute corresponding to each received packet and retrieves the entry with a flow condition coincident with that of the header information of the received packet, based on a pointer address stored in the sub-list table.

The flow attribute is, for example, a line number indicative of an input line of the received packet or a line number indicative of an output line to output the received packet.

The flow attribute may be a MAC identifier produced from a source MAC address included in the header information of each received packet, a MAC identifier produced from a destination MAC address included in the header information of the received packet, a source subnet identifier for identifying a subnet to which a source IP address included in the header information of the received packet belongs, or a destination subnet identifier for identifying a subnet to which a destination IP address included in the header information of the received packet belongs. Each entry registered in the entry table includes, as the flow condition, at least one type of information selected from among a line number indicative of an input line of the received packet, a line number indicative of an output line of the received packet, and address information, application identification information and identification information on service priority included in the header of the received packet, for example.

In the packet forwarding apparatus according to the present invention, for example, each entry registered in the entry table includes, as the control information, at least one of priority information indicative of priority for the transmission of the received packet to the output line and forwarding control information indicative of whether the transfer of the packet to other output lines is required. The packet forwarding unit performs at least one of filtering control of the received packet and priority control for the transfer of the packet to the corresponding output line in accordance with the control information notified from the flow detection unit.

One feature of the present invention resides in that each entry registered in the entry table includes, as the control information, priority information indicative of priority for the transmission of the received packet to one of the output lines, and TOS (Type of Service) information, and the packet forwarding unit rewrites TOS information included in header information of the received packet in accordance with the TOS information notified from the flow detection unit as the control information and thereafter performs priority control for the transfer of the received packet to the output line in accordance with the priority information notified from the flow detection unit as the control information.

Another feature of the present invention resides in that each entry registered in the entry table includes priority information and connection identification information as the control information, the packet forwarding unit adds the connection identification information notified form the flow detection unit as the control information to the received packet and thereafter performs priority control for the transfer of the received packet to the output line in accordance with the priority information notified from the flow detection unit as the control information, and each line interface unit outputs the packet received from the packet forwarding unit to a connection corresponding to the connection identification information formed over the corresponding output line.

A further feature of the present invention resides in that the list table comprises a first list table for use in filtering control and a second list table for use in forwarding control, and the first and second list tables are divided into a plurality of subtabls corresponding to the values of the flow attributes respectively, and the flow detection unit selectively refers to the first and second list tables for each received packet to thereby retrieve control information for filtering control and control information for forwarding control, both of which are related to the received packet.

Other problems to be solved by the present application, and their solving device will become apparent from the section of embodiments according to the present invention and the accompanying drawings.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 16A is a diagram depicting a time sequence for flow detection in which a plurality of processes are serially executed;

FIG. 16B is a diagram illustrating a time sequence for flow detection in which a plurality of processes are subjected to pipeline processing;

DESCRIPTION OF THE PREFERRED EMBODIMENTS

Preferred embodiments of the present invention will hereinafter be described with reference to the accompanying drawings.

Problems on a flow detection of a linear search type will first be explained with reference to FIGS. 3 through 6 to provide easy understanding of the present invention.

Figure 3:
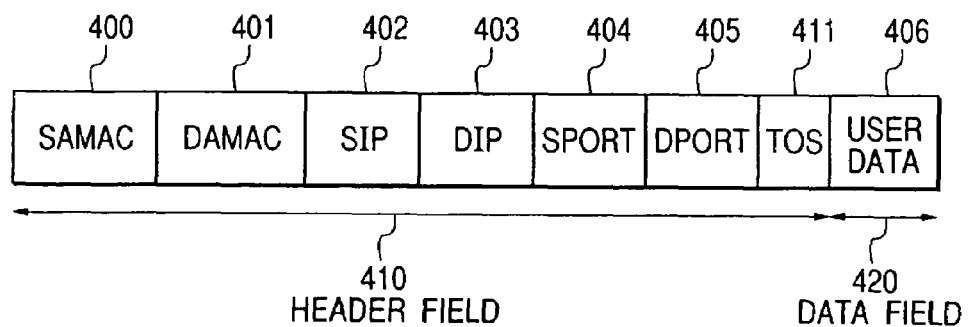
FIG. 3 is a diagram illustrating a format of a packet employed in a network.

FIG. 3 shows one example of a format of a packet on a network.

The format of the packet on the network is comprised of a header field 410 and a data field 420. The header field 410 includes a source MAC (Media Access Control) address (SA-MAC) 400 indicative of a physical address (hardware address) of a router which has sent the packet just before, a destination MAC address (AMAC) 401 indicative of a physical address of a router which next receives a packet, a source IP address (SIP) 402 indicative of an address of a source terminal of the packet, a destination IP address (DIP) 403 indicative of an address of a destination terminal of the packet, a source port (hereinafter called "SPORT") 404 indicative of a protocol (=upper application), a destination port (DPORT) 405, and TOS (Type of Service) or DS filed 411 indicative of priority of the packet in the network. The data field 420 includes user data 406.

FIG. 3 indicates a format of a packet in which the protocol of a transport layer indicates a TCP (Transmission Control Protocol) or UDP (User Datagram Protocol), and the protocol of a network layer is IP (Internet Protocol). In the present invention, however, the protocol of the network layer may be another protocol, e.g., IPX or the like.

Figure 4:
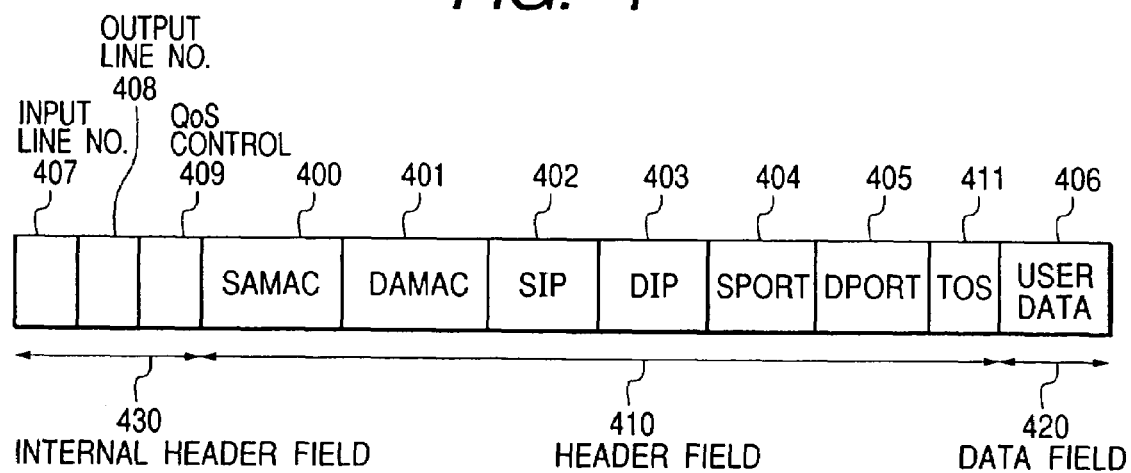
FIG. 4 is a diagram depicting a format of a packet processed in the router.

FIG. 4 shows one example of a format of an internal packet handled inside a router.

The internal packet treated within the router has a format in which an internal header field 430 is added to the format of the packet on the network. The internal header field 430 includes an input line number 407, an output line number 408, and priority information 409 for use in priority transfer control of each packet under QoS control.

Figure 5:
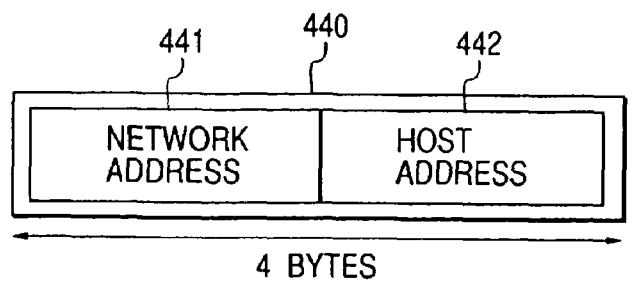
FIG. 5 is a diagram showing a format of an IP address.

FIG. 5 shows a format of an IP address 440.

The IP address 440 is composed of a network address 441 and a host address 442. A network (or subnet) is identified by the network address 441 and each of terminals or terminal equipment in respective networks is identified by the host address 442.

Since the upper bit in the IP address 440 corresponds to the network address, a plurality of terminals held within the same network have continuous IP addresses respectively. Thus, all the terminals contained in one network can be specified by the range (upper limit value or lower limit value) of the IP address.

Figure 6:
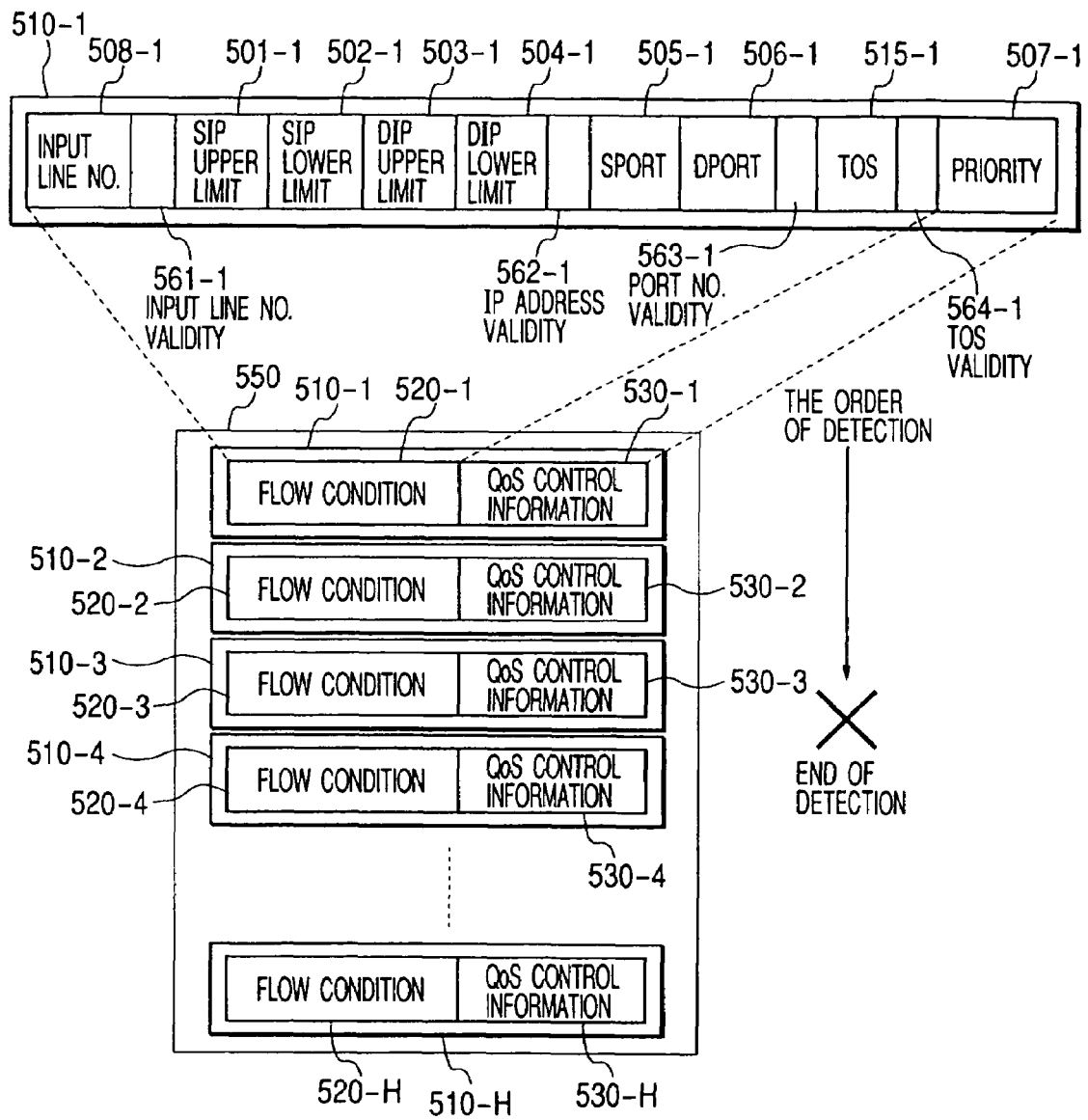
FIG. 6 is a diagram for describing the detection of an entry table by a linear search.

FIG. 6 shows the configuration of an entry table used for flow detection.

An entry table 550 has one or a plurality of entries 510-*i* (where i=1 to H). The entries 510-*i* is composed of flow conditions 520-*i* and QoS control information 530-*i* respectively.

The QoS control information 530-*i* include priority information 507 used for packet's priority transfer control respectively. Further, each of the flow conditions 520-*i* includes a plurality of items of parameter information indicative of flow conditions for identifying source users or destination users, flow conditions for identifying applications and flow conditions for identifying priorities.

As items indicative of the flow conditions for identifying the source users or destination users, may be mentioned, for example, an SIP upper limit value 501 and an SIP lower limit value 502 indicative of the range of a source IP address, a DIP upper limit value 503 and a DIP lower limit value 504 indicative of the range of a destination IP address, an IP address validity indication bit 562 indicative of whether these upper and lower limit values are effective or not, an input line number 508, and an input line number validity indication bit 561 indicative of whether the value of the input line number 508 is effective.

Figure 2:
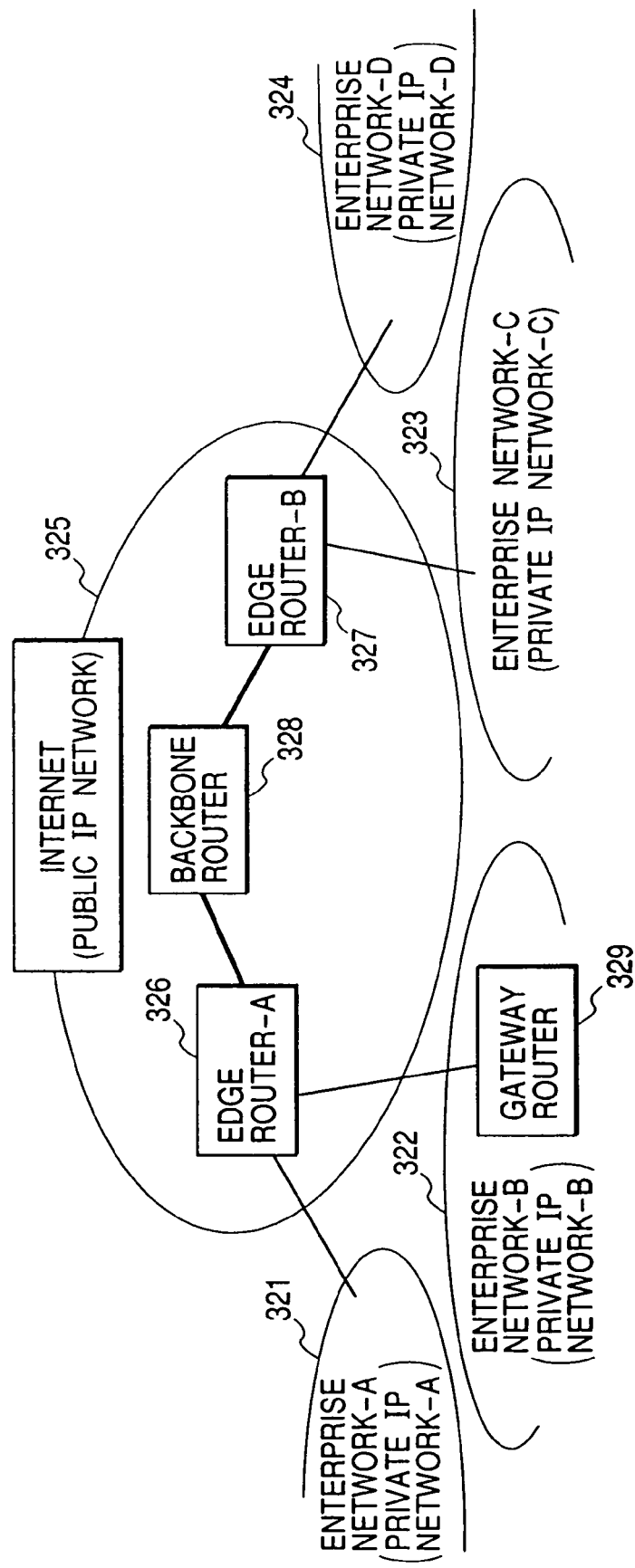
FIG. 2 is a configurational diagram of an Internet.

For example, the edge router-B: 327 of the network shown in FIG. 2 identifies whether an enterprise network for a packet source corresponds to the enterprise network-C: 323 or the enterprise network-D: 324 according to an input line number of a packet. If the upper limit values of SIP and DIP and the lower limit values thereof are set to the flow conditions 520 of respective entries in an entry table held by the edge router as shown in FIG. 6, then a terminal address can be identified by one entry 516-*i* in network units or subnetwork units.

Figures 45, 46:
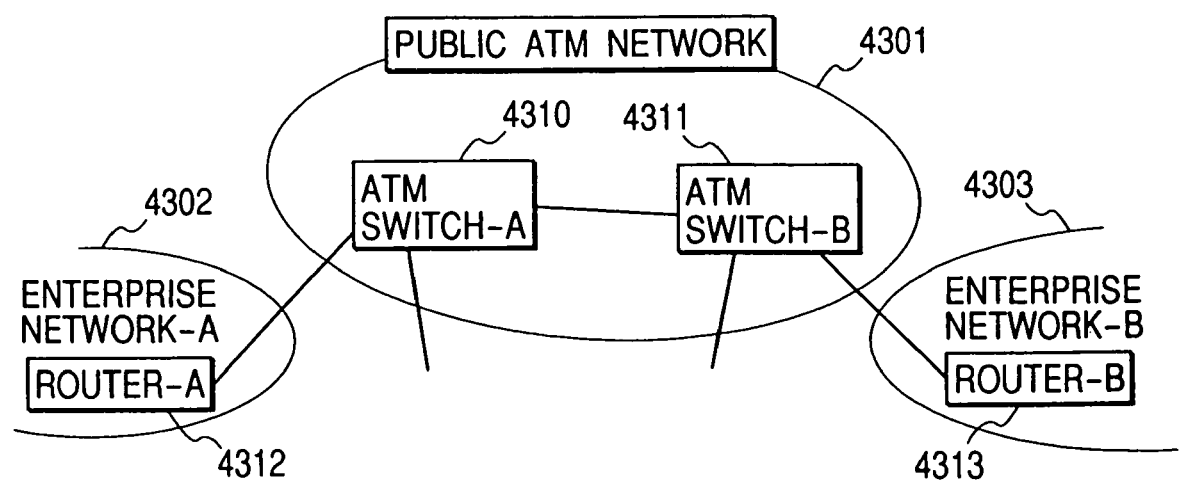
FIG. 45 is a diagram showing the correspondence of applications and port numbers.
FIG. 46 is a diagram illustrating a network in which a plurality of enterprise networks are connected to one another by a public ATM network.

As items indicative of the flow conditions for identifying the applications, may be mentioned, a SPORT 505 indicative of a source port, a DPORT 506 indicative of a destination port, and a port number validity indication bit 563 indicative of whether the values of the SPORT 505 and DPORT 506 are effective. One example illustrative of the relationship of correspondences between applications to which port numbers are assigned at present and the port numbers, is shown in FIG. 45.

As items indicative of the flow conditions for identifying the priority, there are shown a TOS 515 and a TOS validity indication bit 564. The respective interior nodes in the Diffserv described in the prior art 4 detect flows according to the TOS 515 to perform packet's priority transfer control.

Validity indication bits 561, 562, 563 and 564 indicate whether the values of the input line number 508, IP addresses 501 through 504, port numbers 505 through 506 and TOS 515 are valid as flow identification information. When the values of these items are valid as the flow identification information, "1" is set to the validity indication bits corresponding to the respective items, and "0" is set to the valid indicative bits corresponding to the items unused for packet identification.

Upon the flow detection of received packets, the entries 510-*i* (where i=0.1 to H) are sequentially read from the entry table 550. It is determined whether the internal header field 430 and header field 410 of the received packet include header information coincident to the valid flow conditions defined in the flow condition 520-*i* of each entry 510-*i* referred to above. When the header information of the received packet coincides with all the validity flow conditions defined in the flow conditions 520-*i*, the priority information 507 defined in the entry 510-*i* is assigned to the received packet, and the flow detection for the received packet is terminated.

When the header information of the received packet coincides with the flow condition of the third entry 510-3 registered in the entry table 550, the priority information 507-3 defined in the entry 510-3 is given to the received packet, and the flow detection is terminated without executing reference to the flow conditions of four and later entries. In the present specification, a flow detection method of reading the entries from the entry table 550 in registration order as described above and checking for the flow conditions of the received packet will be called "linear search type".

Now consider where QoS control and filtering of each received packet are executed by an Internet 325 shown in FIG. 2. In the network shown in FIG. 2, enterprise networks-A, -B and -C (321, 322 and 323), which belong to the same enterprise, and an enterprise network-D (324), which belongs to an enterprise different from the above enterprise, are connected to one another by the Internet 325 corresponding to the public IP network. The Internet 325 comprises an edge router-A: 326 for connecting the enterprise networks 321 and 322 to each other, an edge router-B: 327 for connecting the enterprise networks 323 and 324 to each other, and a backbone router 328 for connecting the edge router-A: 326 and the edge router-B: 327 to each other. A gateway router 329 is placed in a gateway to the Internet 325, of the enterprise network-B: 322.

The priority transfer based on the QoS control is mainly performed by the edge router-A: 326, edge router-B: 327 and backbone router 328 in the Internet 325, whereas bandwidth monitoring based on the QoS control and the rewriting of TOS are principally performed by the edge router-A: 326 and edge router-B: 327 in the Internet 325. Since large amounts of packets, which are communicated between enterprises, pass through the Internet 325, a processing time interval allowed per packet is short. Therefore, the edge router-A: 326, edge router-B: 327 and backbone router 328 need to perform the QoS control at high speed. When, however, the enterprises connected to the Internet 325 increase in number, a high volume of entries 510-*i* are set to the entry table 550 for the purpose of identifying a large number of enterprise networks. Since the flow conditions are determined every received packets with all the entries 510-*i* registered in the entry table 550 as objects in the flow detection of the above-described linear search type, this is not suited for the high-speed QoS control necessary for the edge router-A: 326, edge router-B: 327 and backbone router 328.

On the other hand, in the flow detection for filtering, the priority information 507 defined in the entry 510 with the flow condition coincident with that of the received packet may be used as forwarding control information indicative of a decision as to the forwarding of the received packet. Such filtering is performed by the gateway router 329 in the enterprise network-B: 322 in the case of the network shown in FIG. 2. Since the gateway router 329 must process all the packets inputted to the enterprise network-B: 322, a processing time interval allowed per packet is extremely short and hence high-speed filtering capability is required.

The entries 510-*i* are set to the entry table 550 so that packets, which are communicated between the enterprise networks-A, -B and -C (321, 322 and 323) corresponding to the same enterprise, are transferred to the gateway router 329 selectively among the received packets. When the number of networks, which belong to the same enterprise, is increased to 3 or more, the number of the entries 510-*i* set to the entry table 550 also increases. When the number of the entries 510-*i* registered in the entry table of the gateway router 329 increases, the linear search type for sequentially referring to all the entries 510-*i* in the entry table 550 encounters difficulties in performing filtering at high speed.

Therefore, the present invention adopts an entry table structure capable of performing a flow detection at high speed as compared with the linear search type even when the high volume of entries 510 are registered in the entry table 550, and a table access method.

As a first embodiment of the entry table structure adopted in the present invention, a summary of an input line limitation type will be explained. An entry table of the input line limitation type is composed of a plurality of subtables corresponding to input line numbers. Condition checks for flow detection are executed with an entry group having input line numbers each coincident with an input line number of the received packet, i.e., only a specific subtable as an object to be checked.

Figure 7:
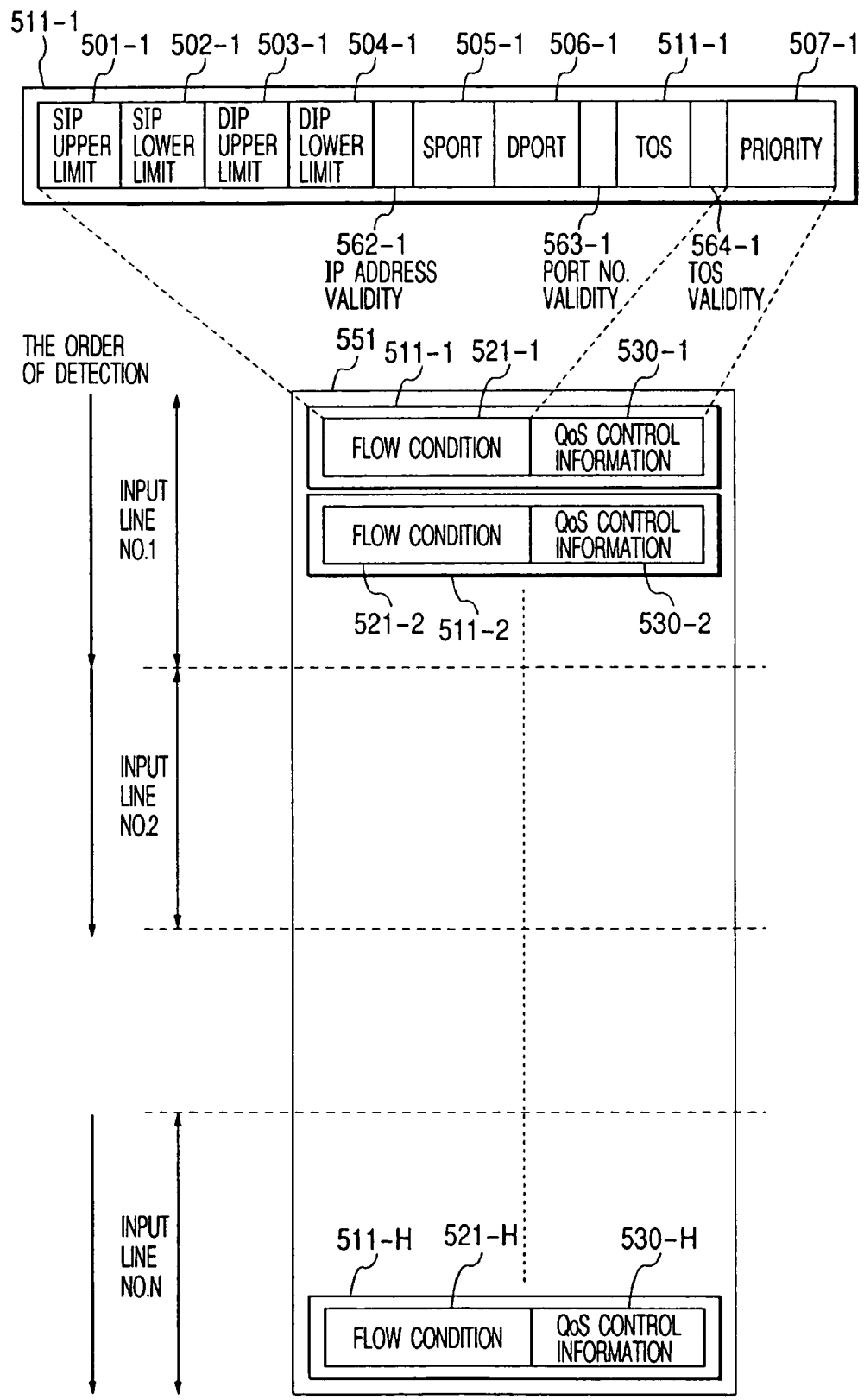
FIG. 7 is a diagram showing one embodiment of an entry table structure of an input line limitation type according to the present invention.

FIG. 7 shows one embodiment of an entry table for an input line limitation type.

The entry table 551 for the input line limitation type comprises a plurality of subtables each corresponding to an input line number. A plurality of entries 511-i having flow conditions 521 of contents obtained by deleting the input line number 508 and the input line number validity indication bit 561 from the entry 510 for the linear search type shown in FIG. 6 are registered in each subtable.

According to the above-described table structure, flow detection processing is executed with a small number of entries registered in each subtable corresponding to the input line number of each received packet as objects to be checked. Therefore, even if the entries are sequentially selected within each subtable and a check is made as to whether header information of the received packet coincides with a flow condition of each entry, a processing time necessary for the flow detection is extremely short. Further, since the number of items which constitute a flow condition 521 of each entry 511, is reduced, the capacity of a memory, which is necessary to form the entry table 551, may be small.

Figure 8:
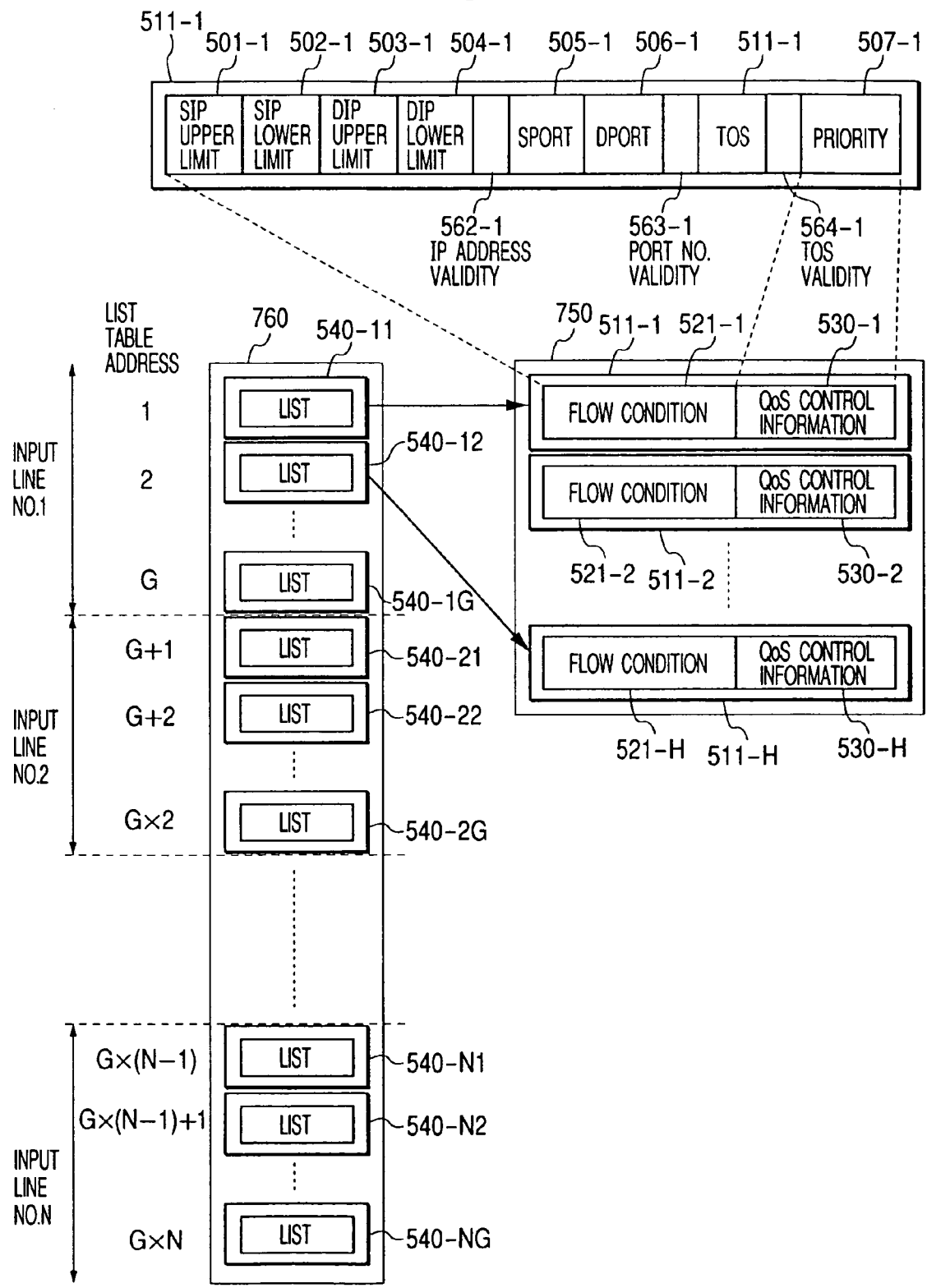
FIG. 8 is a diagram illustrating another embodiment of the entry table structure of the input line limitation type according to the present invention.

FIG. 8 shows a preferred embodiment of an entry table for an input line limitation type.

According to the structure of the entry table shown in FIG. 7, when it is desired to define entries each independent of the input line number, e.g., "traffic of Telnet is forwarded with a higher priority even when it is inputted from any input line" within the entry table, it is necessary to set the entries 511 having the same contents to the plurality of subtables. Further, the availability of the memory for the entry table 551 is reduced.

Thus, in the embodiment shown in FIG. 8, a list table 760 comprised of a plurality of sub-list tables each corresponding to an input line number is provided aside from an entry table 750 which stores a plurality of entries 511-1 . . . 511-H therein. Data block (list) groups 540 each indicative of a pointer address of an entry associated with the input line are stored in their corresponding sub-list tables. When it is desired to define entries having the same flow condition for a plurality of input lines, lists including the same pointer address may be registered in a plurality of sub-list tables.

In FIG. 8, a first sub-list table corresponding to an input line 1 is comprised of, for example, G lists (pointer addresses). As indicated by arrow, a first list 540-11 having a list table address 1 includes a pointer address of the entry 511-1, and a second list 540-12 having a list table address 2 includes a pointer address of the entry 511-H. Upon flow detection, a specific sub-list table corresponding to an input line number of the received packet becomes an object to be checked. Entries 511-i are read out from the entry table 750 in accordance with the pointer addresses indicated by the lists 540 registered in the sub-list tables, and a decision is made as to whether header information of each received packet coincides with its corresponding flow condition.

According to the table structure shown in FIG. 8, the entries 511-i large in data length (bit width) are stored in the entry table region 750 shared between the plurality of input lines, the lists 540 increased in number and small in bit width (respective lists may be 10 bits for 1024 entries) are stored in the list table region corresponding to the input line numbers. Therefore, the memory is effectively utilized and the large number of entries can be registered therein.

Figure 17:
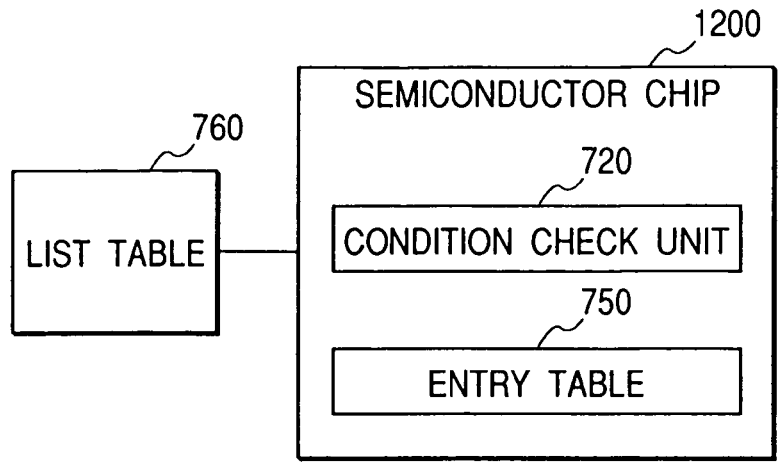
FIG. 17 is a diagram for describing the relationship of a layout between an entry table, a list table and a condition check unit.

In order to complete the reference to the entry table in a short time, an entry table 750 may be placed in an internal memory on a semiconductor chip 1200 with a condition check unit 720 to be described later formed therein as shown in FIG. 17 by way of example. If the memory for the entry table and the condition check unit are disposed on the same semiconductor chip, it is then possible to read data large in bit width at a time through interconnections formed over the semiconductor chip without having to use data input/output pins of the semiconductor chip 1200. Since the number of external connecting pins available for the semiconductor chip 1200 is limited, the bit width of once-readable data is reduced due to the restriction of the number of the connecting pins if the entry table 750 is formed in an external memory. Therefore, the time required to effect a reading process on each entry becomes long.

In the embodiment illustrated in FIG. 8, the list table 760 is divided into a plurality of subtables including the G lists 540 for each input lines. The number G of the lists 540 is set so as to have a relationship of $G \leq H$ with respect to the number H of the entries 511 held in the entry table 750.

Upon the flow detection, list data (pointer address data) are read out in decreasing order of list table addresses within the sub-list tables each corresponding to the input line number of the received packet, and the entries lying within the entry table 750 are respectively accessed according to the pointer addresses.

The list table 760 may be placed over an external memory different form that of the semiconductor chip 1200 as shown in FIG. 17. Since the data blocks of the respective lists 540 are small in bit width, one list can be read in one read cycle at high speed through a relatively small number of external connecting pins. When the entries are fully registered in each individual sub-list tables, the memory capacity of the list table 760 results in bit widths of lists 540×number of input lines× number of entries H and hence increases with an increase in the number of input lines held in each router. In order to use the internal memory on the semiconductor chip 1200 with efficiency, the list table 760 may be formed in an external memory different from that of the semiconductor chip 1200.

Figure 1:
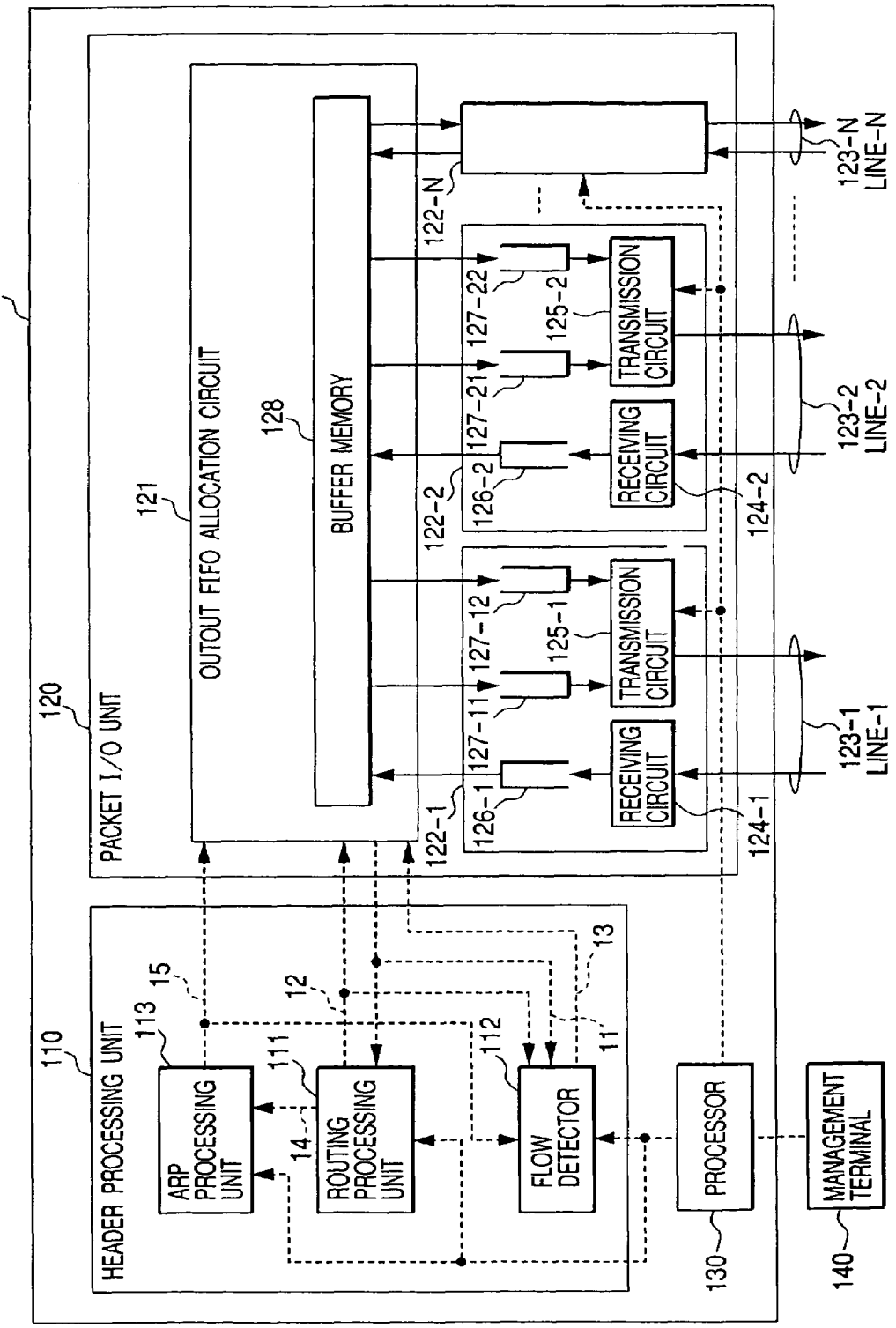
FIG. 1 is a block diagram showing a configuration of a router according to the present invention.

FIG. 1 shows an example of one configuration of a router according to the present invention.

The router 100 comprises a header processing unit 110, a packet I/O unit 120 which performs the input/output of a packet from and to each I/O line 123, and a processor 130.

The header processing unit 110 consists of a routing processing unit 111, a flow detector 112, and an ARP (Address Resolution Protocol) processing unit 113. The packet I/O unit 120 comprises an output FIFO (First In First Out) allocation circuit 121 for performing packet forwarding control and priority control within the router, and a plurality of line interface units 122-i (where i=1 through N) respectively connected to the I/O lines 123-i.

A management terminal 140 provided outside the router 100 is connected to the processor 130.

When a packet is inputted from an ith line 123-i to a line interface unit 122-i, a receiver circuit 124-i adds an internal header including a line number i as an input line number 407 to the packet to thereby convert the received packet to an internal packet format useful inside the router, then stores the internal packet in the input FIFO buffer 126-*i*. At this time, meaningless values are set to fields for an output line number 408 and QoS control information 409 of the internal header. The packets stored in the input FIFO buffers 126-*i* are read in input order and forwarded to the output FIFO allocation circuit 121. The output FIFO allocation circuit 121 stores each received packet in a buffer memory 128 and supplies header information 11 of the received packet to the header processing unit 110. The header information 11 comprises information lying within an internal header field 430 and a header field 410.

In the header processing unit 110, the routing processing unit 111 detects or retrieves a routing table, based on DIP in the header information 11 to determine the number of an output line connected to a subnet to which the DIP belongs, and an IP address (NIP: Next Hop IP Address) of the next router which receives the packet sent from the router 100. Further, the routing processing unit 111 outputs the output line number determined from the routing table to the output FIFO allocation circuit 121 and the flow detector 112 as output line information 12 and outputs NIP to the ARP processing unit 113 as NIP information 14. Incidentally, the creation and management of the routing table are performed by the processor 130, and the retrieval of the routing table is described in, for example, Japanese Patent Application Laid-Open No. Hei 10-222535. The output FIFO allocation circuit 121 writes the output line information 12 received from the routing processing unit 111 into the internal header of the corresponding packet stored in the buffer memory 128 as an output line number 408.

When the ARP processing unit 113 receives the NIP information 14 from the routing processing unit 111, it determines a MAC address corresponding to the NIP and outputs it to the output FIFO allocation circuit 121 and the flow detector 112 as DAMAC information 15. The output FIFO allocation circuit 121 writes the DAMAC information 15 received from the ARP processing unit 113 into the header filed of the corresponding packet-stored in the buffer memory 128 as DAMAC 401.

On the other hand, the flow detector 112 detects or retrieves an entry table 750 (or 551) based on the header information 11 received from the output FIFO allocation circuit 121 to determine priority information on the received packet and outputs the priority information to the output FIFO allocation circuit 121 as packet priority information 13. When the output FIFO allocation circuit 121 receives the packet priority information 13 therein, it writes it into the header of the corresponding packet stored in the buffer memory 128 as QoS control information 409.

When all of the output line number 408, DAMAC 401 and QoS control information 409 are written into the header of the received packet, the output FIFO allocation circuit 121 writes each received packet into the corresponding output FIFO buffer 127-*ij* (where j=1 or 2) specified by the QoS control information 409, which exits in the line corresponding unit 122-*i* corresponding to the output line number 408.

A transmission circuit 125-*i* in each line corresponding unit 122-*i* reads and controls each packet stored in the output FIFO buffer 127-*ij* by methods such as "Head of Line Scheduling", "Weighted Pound-robin Scheduling", etc. Upon the "Head of Line Scheduling", packets are read out from an output FIFO buffer 127-*i*1 one after another in storage order so long as the stored packets exist in the output FIFO buffer 127-*i*1 having high priority, and packets are read out from an output FIFO buffer 127-*i*2 low in priority in storage order only when the high-priority output FIFO buffer 127-*i*1 becomes idle. Upon the "Weighted Pound-robin Scheduling" on the other hand, packets are read from the output FIFO buffer 127-*i*1 and output FIFO buffer 127-*i*2 according to a pre-set ratio. Incidentally, a manager for the router 100 specifies a read control mode for each transmission circuit 125-*i* through the management terminal 140.

Each transmission circuit 125-*i* deletes the internal header field 430 from a packet read out from the corresponding output FIFO buffer 127 and writes a MAC address of each line 123-*i* into SAMAC 400 of a packet header, followed by delivery to its corresponding output line 123-*i*.

Figure 12:
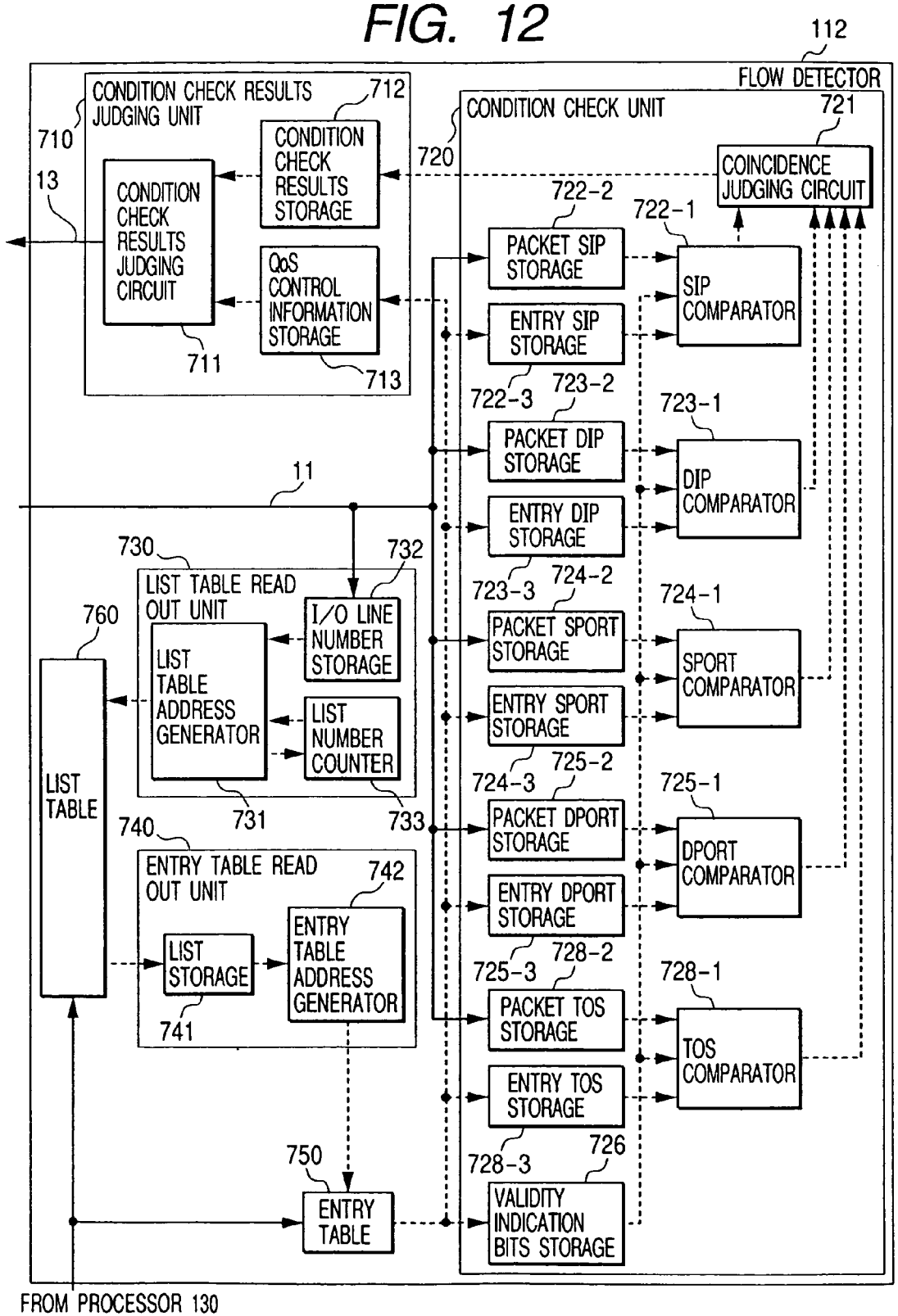
FIG. 12 is a block diagram illustrating one embodiment of a flow detector of an input line limitation type according to the present invention.

One example of the configuration of the flow detector 112 is shown in FIG. 12.

The flow detector 112 comprises a condition check results judging unit 710, a condition check unit 720, a list table read out unit 730, an entry table read out unit 740, an entry table 750, and a list table 760.

Figure 11:
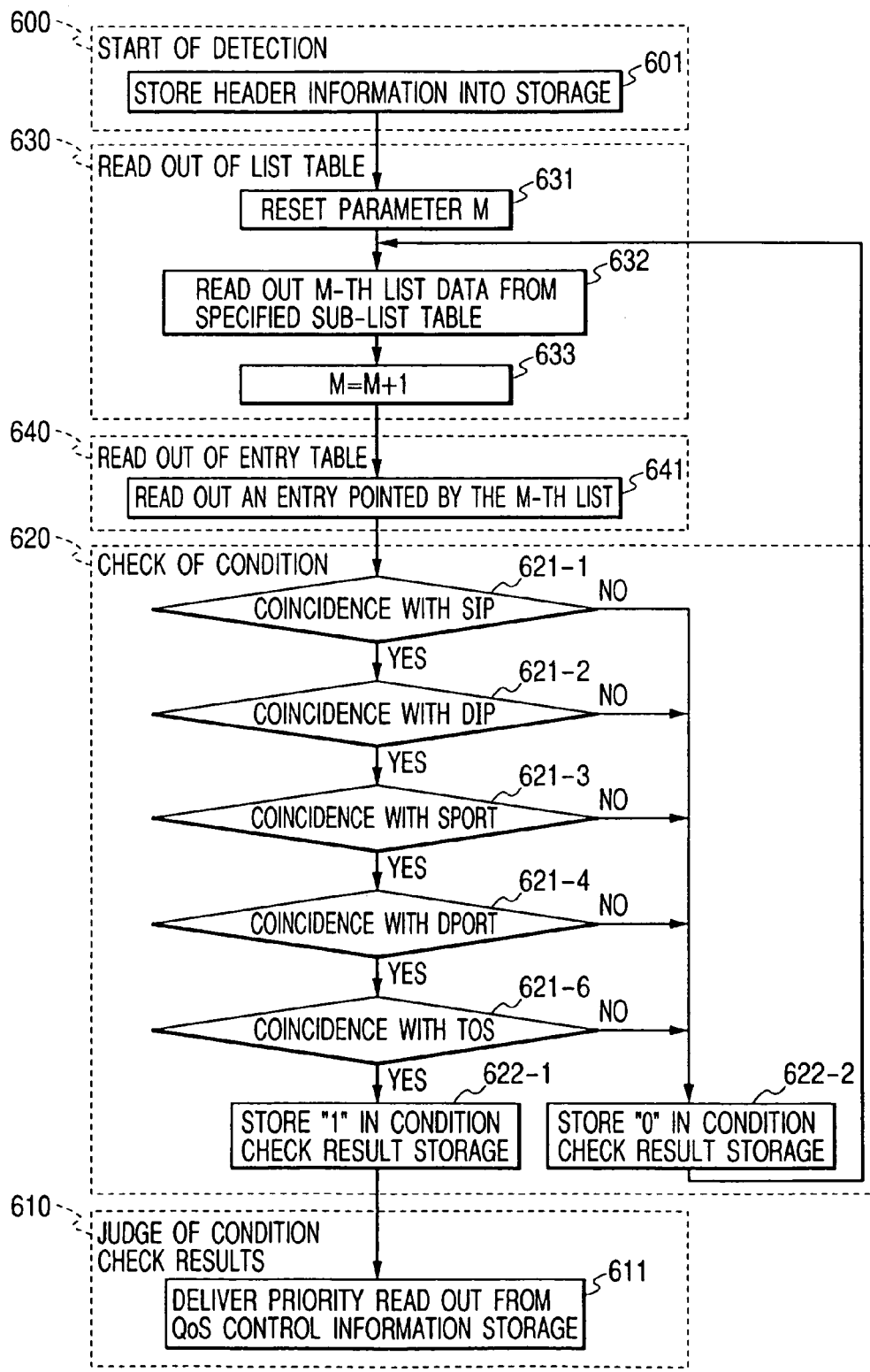
FIG. 11 is a flowchart for describing the operation of a flow detector to which an entry table of an input line limitation type according to the present invention is applied.

A flowchart for describing processing executed by the flow detector 112 is shown in FIG. 11.

The flow detector 112 roughly executes five processes: start of detection 600, read out of list table 630, read out of entry table 640, check of condition 620, and judge of condition check results 610. The process 630, process 640, process 620 and process 610 are respectively executed by the list table read out unit 730, the entry table read out unit 740, the condition check unit 720 and the condition check results judging unit 710 shown in FIG. 12.

A flow detection process of an input line limitation type will be explained below with reference to FIG. 11.

When header information 11 of a packet is transmitted from the packet I/O unit 120 to the header processing unit 110, the start of detection 600 is executed and the flow detector 112 stores input line numbers 407, SIP 402, DIP 403, SPORT 404, DPORT 405 and TOS 411 included in the header information 11 into an I/O line number storage 732 provided within the list table read out unit 730, and a packet SIP storage 722-2, a packet DIP storage 723-2, a packet SPORT storage 724-2, a packet DPORT storage 725-2 and a packet TOS storage 728-2 provided within the condition check unit 720 respectively (Step 601).

Upon the read out of list table 630, the list table read out unit 730 reads only list data 540 lying within a sub-list table corresponding to an input line number indicated by the header information 11 from the list table 760 and stores the same in a list storage 741. The list table read out unit 730 first resets a value M of a list number counter 733 to an initial value 1 to read a leading list 540-*i*1 of a sub-list table corresponding to each input line number i (Step 631). Next, a list table address generator 731 generates each of addresses for the list table 760 from the input line number stored in the I/O line number storage 732 and the value M (M=1 at present) of the list number counter 733 to thereby read the list 540-*i*1 and stores it into the list storage 741 (Step 632). In this case, the address for the list table 760 results in (input line number−1)×G+M. Here, G indicates the number of lists every input lines. When the list table address generator 731 notifies the reading of the list 540 to the list number counter 733, the list number counter 733 increments the value M of the list number counter 733 by 1 so that a list 540-*i*2 can be read according to the next read out of list table 630 (Step 633). By repeating the above-described read out of list table 630, the list table read out unit 730 sequentially reads the lists 540 from small list table addresses to large list table addresses.

Upon the read out of entry table 640, the entry table read out unit 740 reads each entry 511-*i* from the entry table 750. An entry table address generator 742 of the entry table read out unit 740 utilizes each value stored in the list storage 741 as an entry table address as it is and reads out each entry 511-*i* from the entry table 750. An SIP upper limit value 501 and an SIP lower limit value 502 are stored in an entry SIP storage 722-3 of the condition check unit 720, a DIP upper limit value 503 and a DIP lower limit value 504 are stored in an entry DIP storage 723-3, a SPORT 505 and a DPORT 506 are respectively stored in an entry SPORT storage 724-3 and an entry DPORT storage 725-3, a TOS 515 is stored in an entry TOS storage 728-3, an IP address validity indication bit 562, a port number validity indication bit 563 and a TOS validity indication bit 564 are stored in a validity indication bits storage 726, and priority information 507 is stored in a QoS control information storage 713 of the condition check results judging unit 710, respectively (Step 641).

Upon the check of condition 620, the condition check unit 720 makes a decision as to whether header information of each received packet coincides with flow conditions set to the entry SIP storage 722-3, the entry DIP storage 723-3, the entry SPORT storage 724-3, the entry DPORT storage 725-3 and the entry TOS storage 728-3.

In the flowchart shown in FIG. 11, the process for determining whether the header information of each received packet coincides with each individual flow conditions of SIP, DIP, SPORT, DPORT and TOS indicated by the flow conditions of the entries read from the entry table is described so as to be performed every check items in time sequence. In the condition check unit 720, however, comparators are specifically prepared every check items (SIP, DIP, SPORT, DPORT, TOS) to shorten a turnaround time of the check of condition 620, and a plurality of condition judgments or decisions may be executed in parallel.

When the SIP upper and lower limit values stored in the packet SIP storage 722-2 and SIP stored in the entry SIP storage 722-3 meets the condition of "SIP lower limit value≦SIP≦SIP upper limit value" or when the IP address validity indication bit in the validity indication bits storage 726 is "0", an SIP comparator 722-1 outputs a coincidence signal (Step 621-1). A DIP comparator 723-1 executes a DIP process similar to SIP (Step 621-2).

When SPORT stored in the packet SPORT storage 724-2 and SPORT stored in the entry SPORT storage 724-3 are equal to each other or when the port number validity indication bit in the validity indication bits storage 726 is "0", a SPORT comparator 724-1 determines that a match or coincidence has occurred, and outputs a coincidence signal (Step 621-3). A DPORT comparator 725-1 executes a DPORT process similar to the SPORT comparator 724-1 (Step 621-4).

When TOS stored in the packet TOS storage 728-2 and TOS stored in the entry TOS storage 728-3 are equal to each other or when the TOS validity indication bit in the validity indication bits storage 726 is "0", a TOS comparator 728-1 determines that a match has occurred (Step 621-6).

When it is determined in all of Steps 621-1, 621-2, 621-3, 621-4 and 621-6 that the "coincidence" has occurred, a coincidence judging circuit 721 stores information indicative of "coincidence" into a condition coincidence results (condition check results) storage 712 of the condition check results judging unit 710 (Step 622-1) and stores information indicative of "non-coincidence" therein at all other times (Step 622-2).

In the above-described embodiment, the respective comparators outputs the coincidence signals with respect to the flow conditions under which the IP address validity indication bit 562, port number validity indication bit 563 and TOS validity indication bit 564 are "0", whereby decision results similar to the non-execution of a condition check for the corresponding items (SIP/DIP, SPORT/DPORT or TOS) of each packet header are obtained where the validity indication bits are "0". Since flow conditions independent of the IP addresses, port numbers or TOS can be defined in the entry table 750 owing to the provision of these validity indication bits, the description of each flow condition is greatly improved. Thus, this can flexibly cope with diverse flow conditions that the manager for the router 100 desires.

When information indicating that each received packet has coincided with the flow condition, is stored in the condition check results storage 712 upon the judge of condition check results 610, a condition check results judging circuit 711 judges the value of the QoS control information storage 713 as priority information for each received packet. In this case, the information (priority information) stored in the QoS control information storage 713 is outputted to the output FIFO allocation circuit 121 of the packet I/O unit 120 as packet priority information 13 and the flow detection process is ended (Step 611). When the information indicative of "non-coincidence" is stored in the condition check results storage 712, the flow detector 112 is returned to Step 632 where the aforementioned flow detection process is repeatedly effected on a flow condition defined in the next entry.

Upon the flow detection of the input line limitation type according to the present invention as described above, the objects to be retrieved in the entry table are limited to the subtables (entry group) each coincident with the input line number of each received packet to thereby speed up the processing.

Now consider where the edge router-B 327 of the network shown in FIG. 2 performs QoS control on packets sent from the enterprise network-C: 323 and the enterprise network-D: 324. Since the enterprise network-C: 323 and the enterprise network-D: 324 are different in owner from each other, they are generally different in flow detection method. Therefore, the edge router-B: 327 must have each entry 511-*i* for the enterprise network-C 323 and each entry 511-*i* for the enterprise network-D 324. The edge router of the linear search type regards all the entries 511-*i* registered in the table as objects to be retrieved, whereas the edge router of the input line limitation type according to the present invention takes only entry groups for specific input lines (enterprise networks) as objects to be retrieved. Therefore, the input line limitation type has performance equal or equivalent to twice or more times that of the linear search type. When K enterprise networks are connected to the edge router-B: 327, the performance equal to about K times is obtained. If list (pointer address) tables 540 are introduced in this case, then a large number of flow conditions can be defined by using memory capacity effectively.

A description will be made of a flow detection of output line limitation type as a second embodiment of the present invention. In the flow detection of the output line limitation type, the flow detection can be speeded up by taking only entry groups coincident with each other in output line number corresponding to one of flow condition items as objects to be retrieved. The flow detection of output line limitation type will be described below by placing emphasis on a point of difference between the output line limitation type and the aforementioned input line limitation type.

In the output line limitation type, the list table 760 comprises a plurality of sub-list tables each corresponding to the output line number. Thus, the flow detector 112 stores each output line number supplied from the routing processing unit 111 into the I/O line number storage 732 in place of the input line number indicated by the header of each received packet in Step 601 of FIG. 11. In Step 632, the list table address generator 731 generates each list table address from the corresponding output line number stored in the I/O line number storage 732 and the corresponding value M of the list number counter 733. Except for these items, the flow detection of the output line limitation type is identical to that of the input line limitation type.

If a packet sent to the enterprise network-C: 323 and a packet sent to the enterprise network-D: 324 are different in flow detection from each other when the edge router-B: 327 performs QoS control on the packets sent to the enterprise networks-C: 323 and -D: 324 in the network shown in FIG. 2, the flow detection of the output line limitation type has performance equal to twice or more times that of the linear search type due to the reason similar to the aforementioned input line limitation type.

The flow detection may be performed by using SAMAC included in header information 11 of each received packet in place of the aforementioned input line number or output line number and taking each subtable (entry group) defined by the value of SAMAC as an object to be retrieved. In the case of the flow detection of the SAMAC limitation type, subtables are prepared corresponding to SAMAC groups composed of a plurality of SAMAC, and a sub entry table (or sub-list table) associated with a SAMAC identifier coincident with that of the received packet is taken as an object to be retrieved.

The flow detection of the SAMAC limitation type will be explained below as a third embodiment of the present invention while centering around a point of difference between the present type and the input line limitation type.

Figure 9:
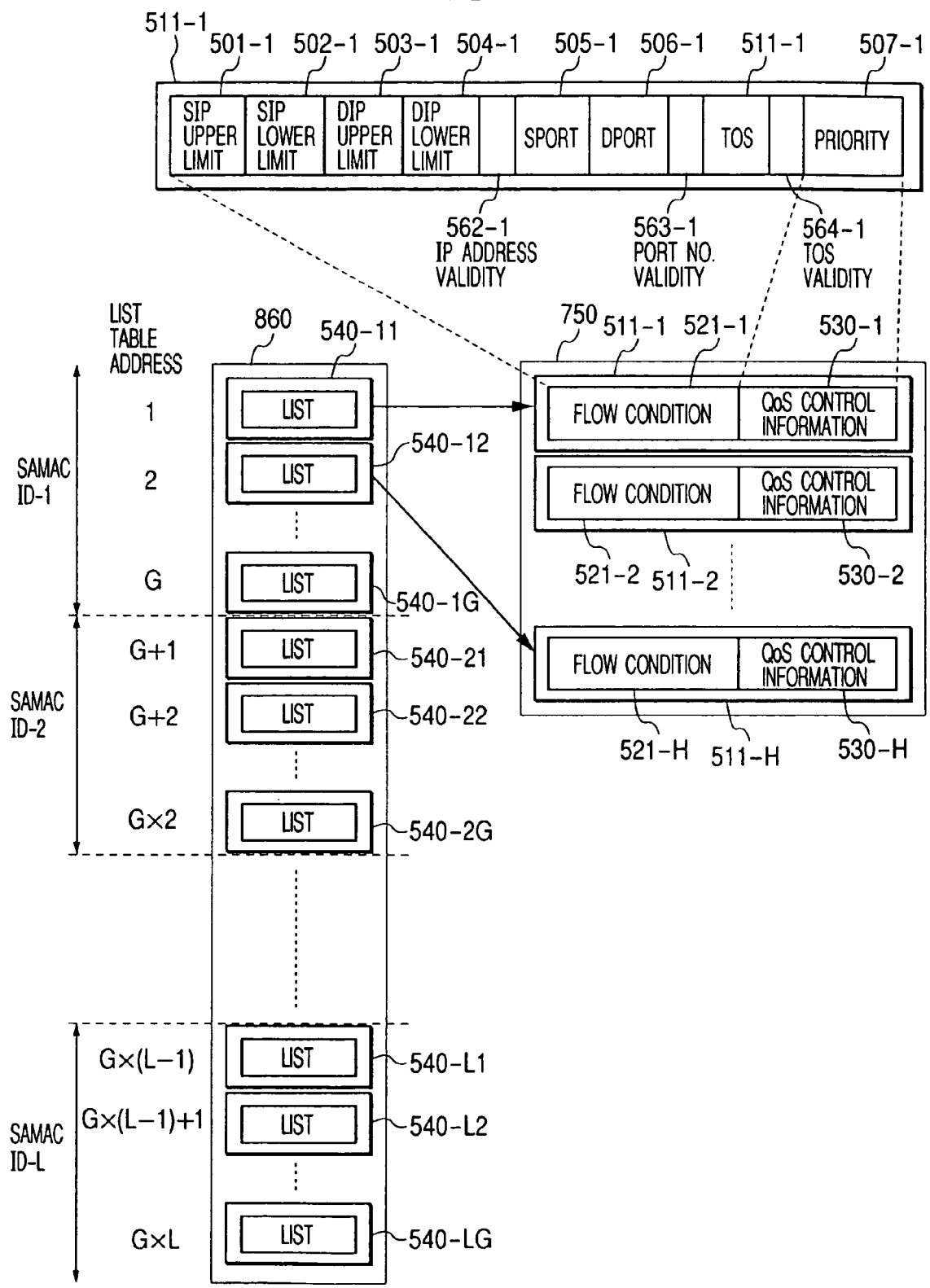
FIG. 9 is a diagram depicting one embodiment of an entry table structure of an SMAC limitation type according to the present invention.

FIG. 9 shows formats of an entry table 750 and a list table 860 for the SAMAC limitation type.

Figure 13:
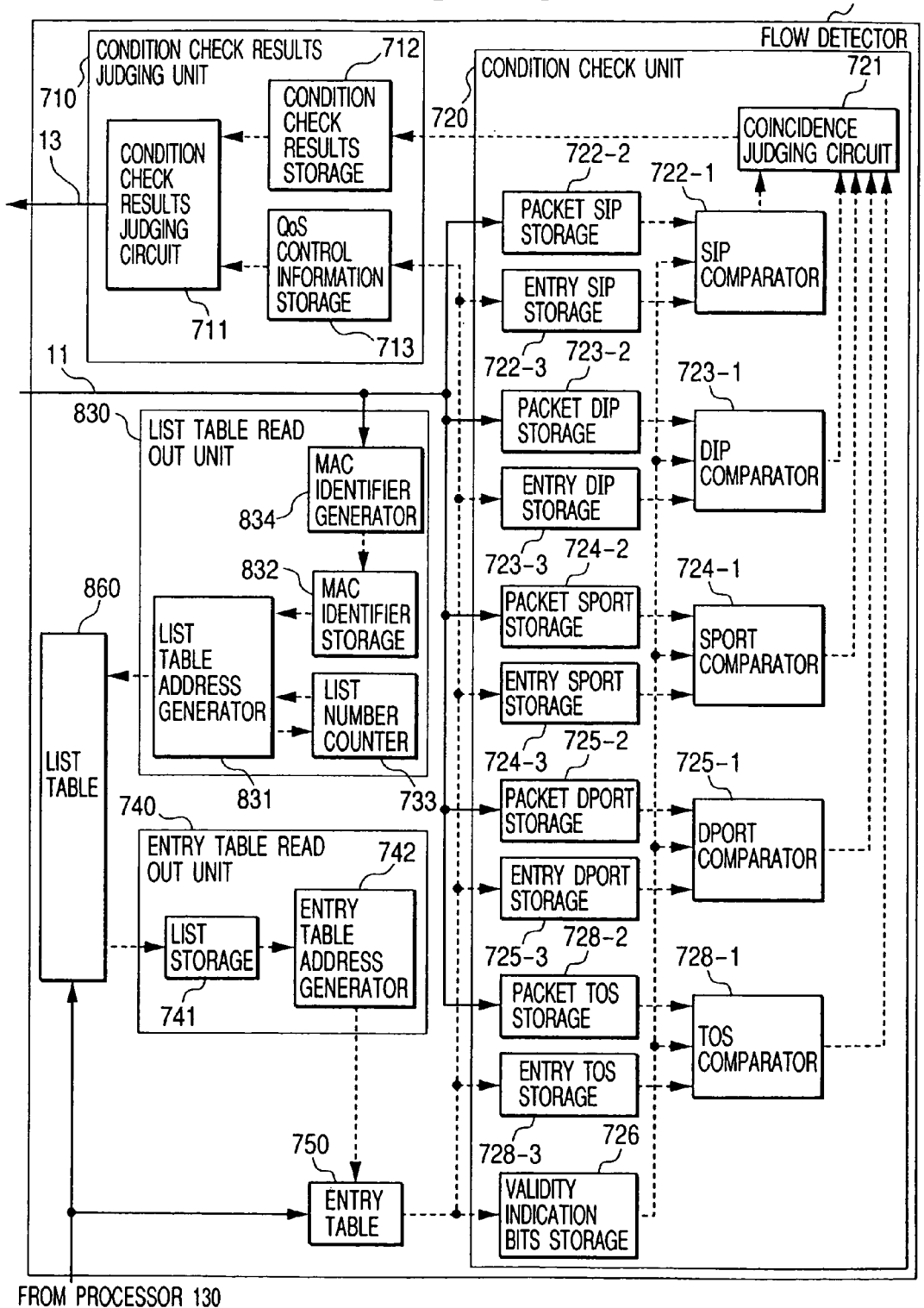
FIG. 13 is a block diagram depicting one embodiment of a flow detector of an SAMAC limitation type according to the present invention.

Entries each having the same format as the input line limitation type shown in FIG. 8 are registered in the entry table 750 for the SAMAC limitation type. The list table 860 is divided into L sub-list regions corresponding to SAMAC identifiers. A list table read out unit 830 of a flow detector 812 is provided with a MAC identifier storage 832 and a MAC identifier generator 834 in place of the I/O line number storage 732 as shown in FIG. 13.

Upon the flow detection of the SAMAC limitation type, the MAC identifier generator 834 hashes SAMAC (6 bytes) by the Hash function in Step 601 of the flowchart shown in FIG. 11 to generate SAMAC identifiers each having a bit width smaller than SAMAC. A plurality of SAMAC in which the results of hash by the hash function become the same value, constitute one SAMAC group. At this time, the SAMAC identifiers are stored in the MAC identifier storage 832 in place of the input line numbers in the list table read out unit 830. In Step 632, the list table address generator 831 generates each list table address from the SAMAC identifier in the MAC identifier storage 832 and the value M of the list number counter 733. The flow detection of the SAMAC limitation type is identical in other operations to the flow detection of the input line limitation type.

Figure 18:
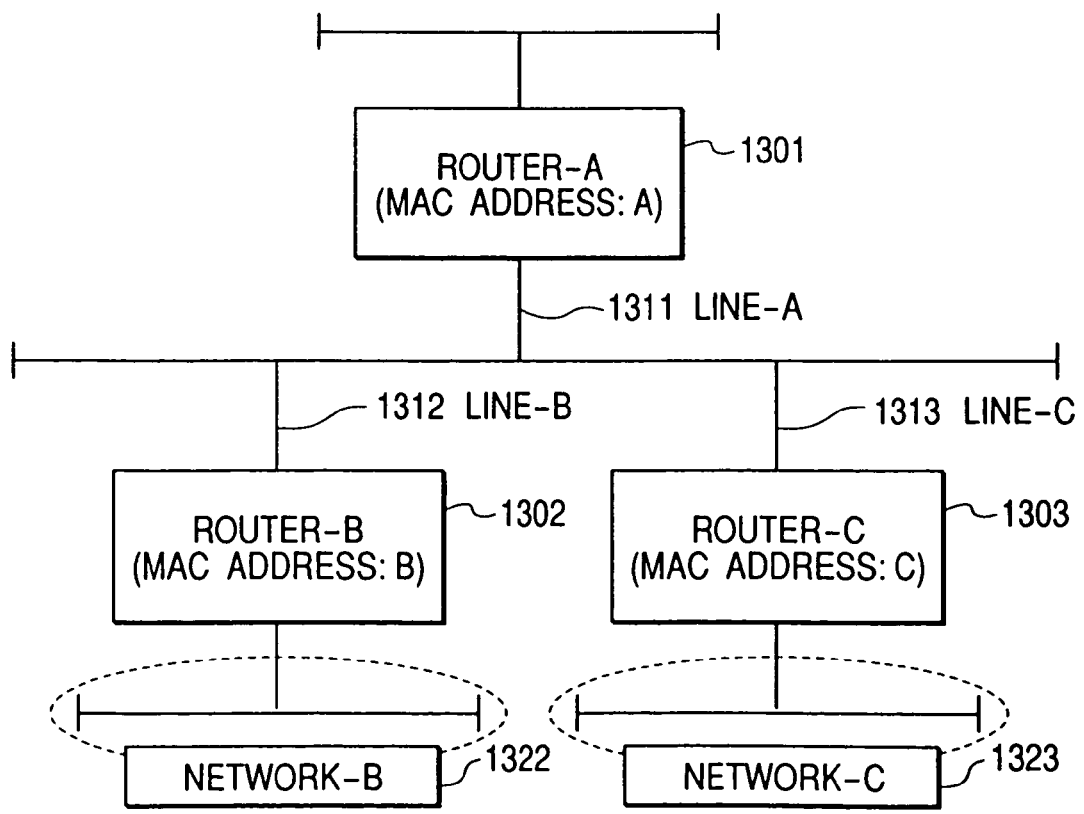
FIG. 18 is a diagram showing a configuration of a network to which a plurality of routers are connected by buses respectively.

FIG. 18 shows a network wherein a line-A: 1311 having a MAC address A, which is connected to a router-A: 1301, a line-B: 1312 having a MAC address B, which is connected to a router-B: 1302, and a line-C: 1313 having a MAC address C, which is connected to a router-C: 1303, are connected to one another by a bus. Consider where the router-A: 1301 performs QoS control on packets sent from a network-B: 1322 and a network-C: 1323.

Since the router-A: 1301 cannot identify a transmission network for each received packet by an input line number in the case of such a network configuration, it is necessary to identify each network from the MAC address. When the network-B: 1322 and the network-C: 1323 are different in flow detection method from each other, an entry table of the router-A: 1301 needs an entry group for the network-B: 1322 and an entry group for the network C: 1323. However, if the entry table is divided into a plurality of tables every SAMAC identifiers as in the third embodiment, then the flow detection can be performed with only either one of the entry groups as the retrieval object upon packet reception. Therefore, the flow detection of the SAMAC limitation type can also obtain performance equal to twice or more times that of the flow detection of the linear search type.

A flow detection of a DAMAC limitation type using DAMAC determined by an ARP processing unit 113 will be described as a fourth embodiment of the present invention.

In the DAMAC limitation type, an entry table is divided into a plurality of subtables so as to correspond to identifiers of each DAMAC group comprised of a plurality of DAMAC. Further, only entry groups each coincident with a DAMAC identifier included in a header of the received packet will be defined as objects to be retrieved. A description will be made below of a point of difference between the SAMAC limitation type and the DAMAC limitation type.

In a flow detector for the DAMAC limitation type, the list table 860 shown in FIG. 13 has sub-list tables every DAMAC identifiers in place of the SAMAC identifiers. In the aforementioned SAMAC limitation type flow detection, the MAC identifier generator 834 shown in FIG. 13 has generated the SAMAC identifiers from SAMAC in the header information 11. In the DAMAC limitation type in contrast to this, the MAC identifier generator 834 generates a DAMAC identifier from DAMAC of each received packet and stores it in the MAC identifier storage 832 in Step 601 of FIG. 11. In Step 632, the list table address generator 831 generates each of list table addresses from the corresponding DAMAC identifier in the MAC identifier storage 832 and the value M of the list number counter 733. The DAMAC limitation type is identical in other operations to the SAMAC limitation type.

If DAMAC identifiers for a MAC address B and a MAC address C differ from each other where the flow detection is effected on packets sent to the network-B: 1322 and the network-C: 1323 in the network shown in FIG. 18, then a flow condition for each received packet can be determined with only the entry group corresponding to either one of the DAMAC identifiers as an object to be retrieved, according to the flow detection of the DAMAC limitation type. Therefore, the DAMAC limitation type can obtain performance equal to twice or more times that of the linear search type.

A description will next be made of a point of difference between a source subnet-limitation type flow detection for restricting a retrieval-oriented entry group according to a source subnet, which is defined as a fifth embodiment of the present invention, and the input line limitation type flow detection.

Figure 10:
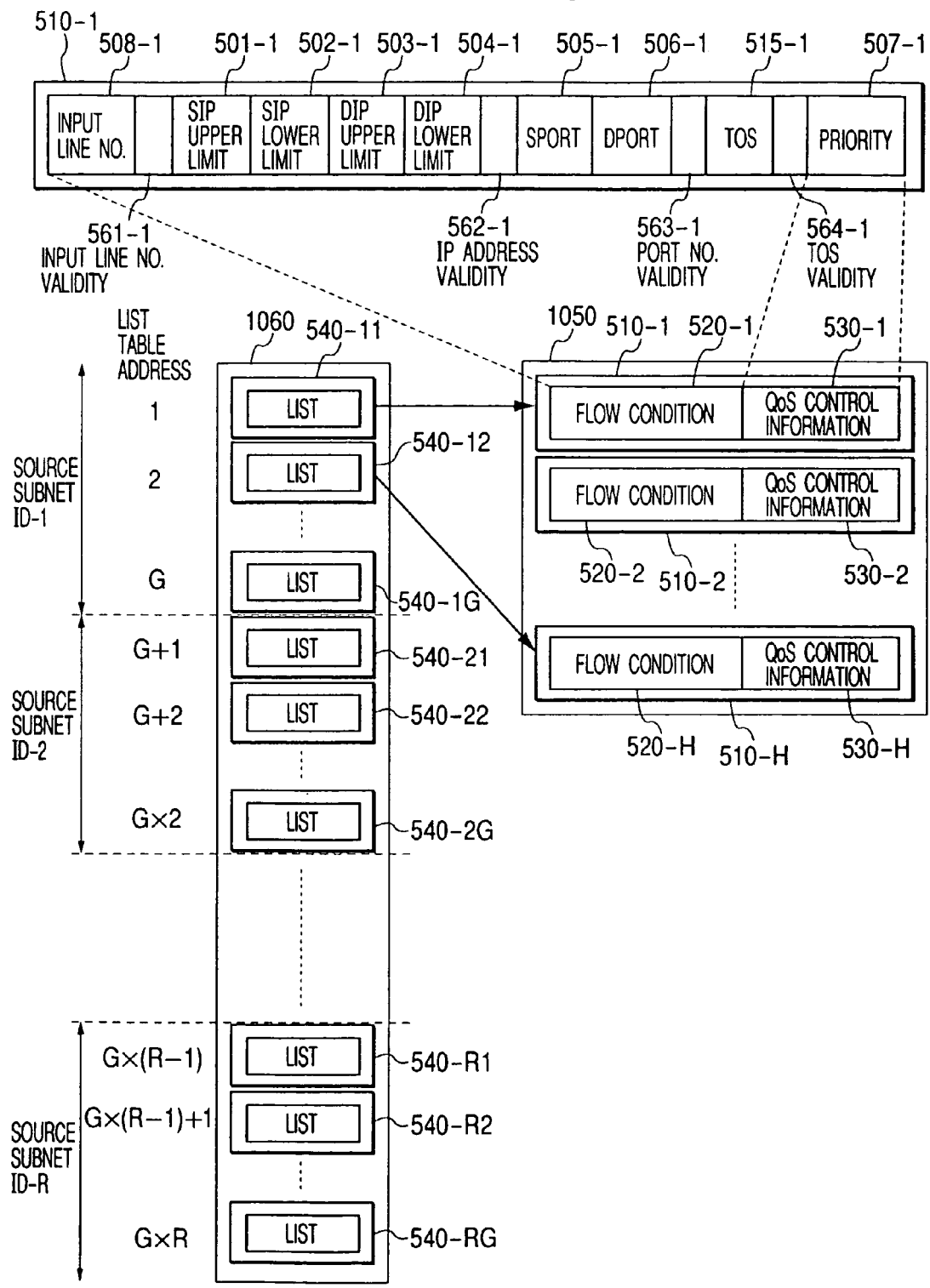
FIG. 10 is a diagram showing one embodiment of an entry table structure of a source subnet limitation type according to the present invention.

FIG. 10 shows formats of an entry table 1050 and a list table 1060 for the source subnet limitation type. Each entry 510-i registered in the entry table 1050 includes an input line number 508 and an input line number validity indication bit 561 in a manner similar to each entry employed in the linear search type shown in FIG. 6. The list table 1060 is divided into R sub-list table regions in association with source subnet identifiers.

Figure 15:
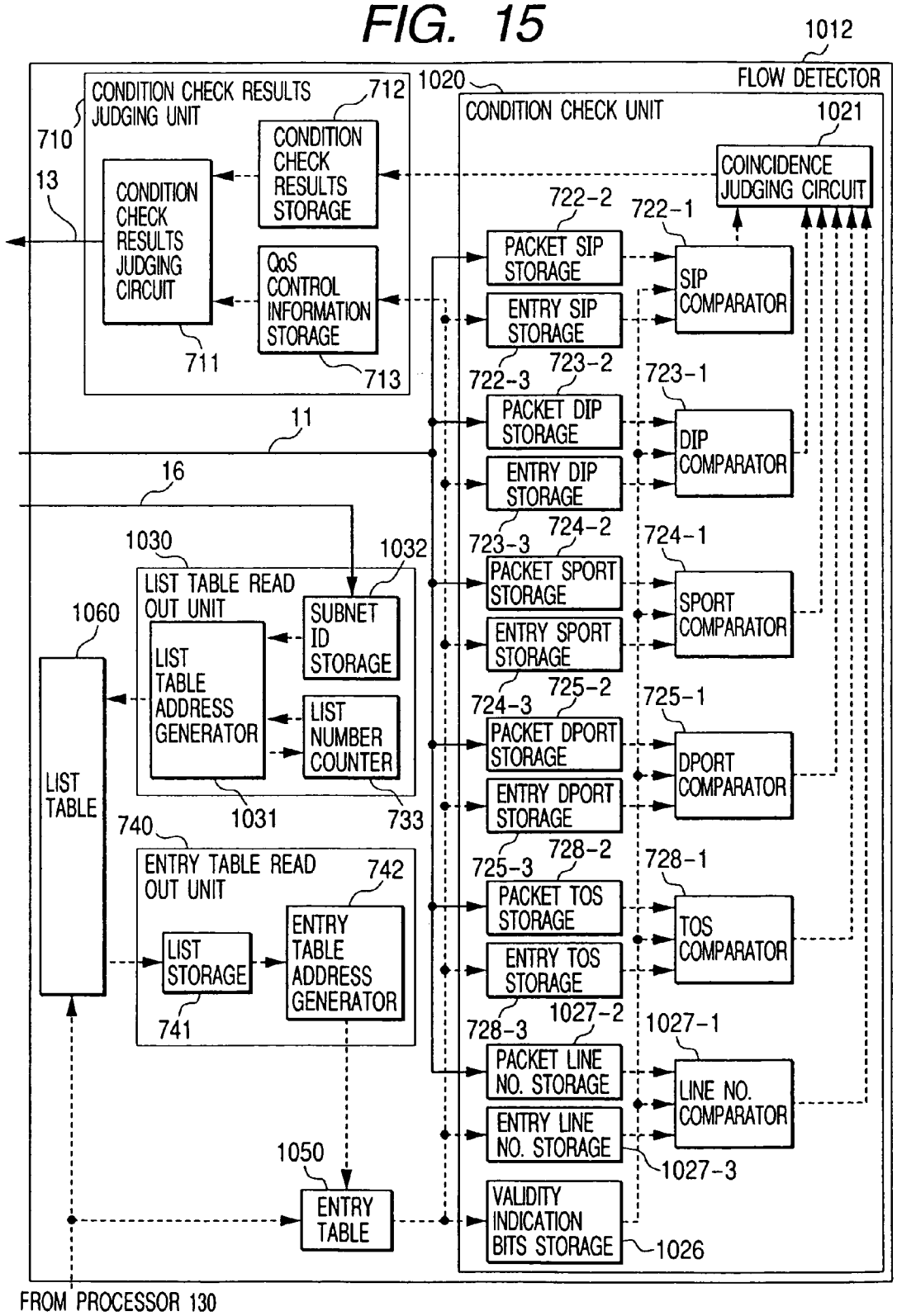
FIG. 15 is a block diagram showing one embodiment of a flow detector 1012 of a source subnet limitation type according to the present invention.

FIG. 15 is a block diagram of a flow detector 1012 for the source subnet limitation type. The flow detector 1012 has a subnet ID storage 1032 in place of the I/O line number storage 732 shown in FIG. 12 and is further provided with a line number comparator 1027-1, a packet line number storage 1027-2 and an entry line number storage 1027-3.

The routing processing unit 111 is also additionally modified. The routing processing unit 111 of the input line limitation type has determined the output line number to be forwarded to the corresponding subnet to which DIP belongs, whereas the source subnet limitation type determines even a destination subnet identifier indicative of a subnet to which DIP belongs, in addition to the output line number. If the retrieval system described in Japanese Patent Application Laid-Open No. Hei 10-222535 referred to above is used, then the routing processing unit 111 can determine even the destination subnet identifier. Further, the routing processing unit 111 determines even a source subnet identifier indicative of a subnet to which SIP belongs, according to a method similar to DIP. The above-described source subnet identifier and destination subnet identifier are transmitted to the flow detector 1012 as subnet identifier information 16.

Figure 14:
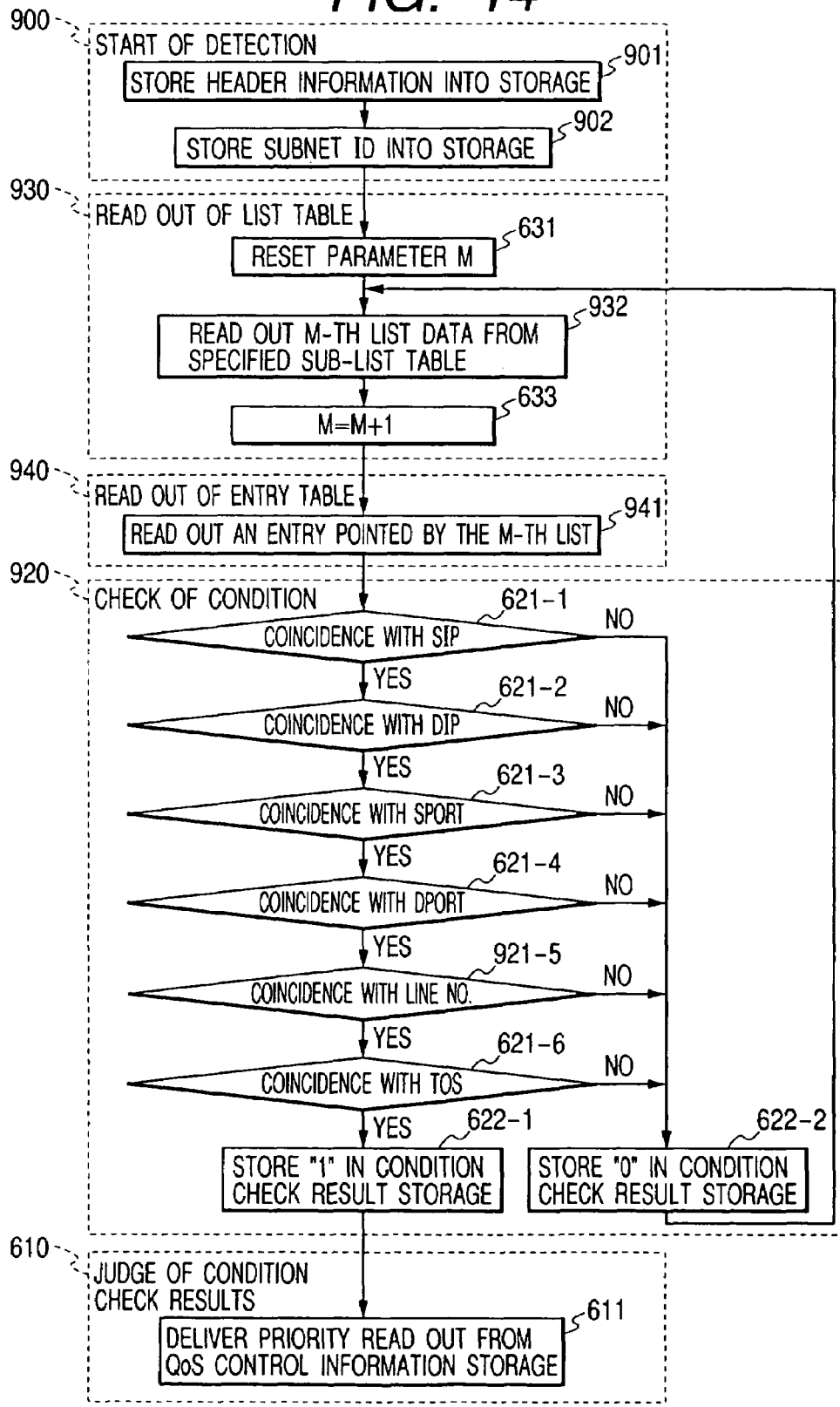
FIG. 14 is a flowchart for describing the operation of a flow detector to which an entry table of a source subnet limitation type according to the present invention is applied.

FIG. 14 shows a control flowchart employed in the flow detection of the source subnet limitation type. The flowchart shown in FIG. 14 will be explained below while centering around a point of difference between the process of the source subnet limitation type and the process of the input line limitation type shown in FIG. 11.

With a change in the format of the list table 1060, the flow detector 1012 stores an input line number 408 contained in header information 11 of each received packet in the packet line number storage 1027-2 as an alternative to the I/O line number storage 732 in Step 901 of a start of detection 900. When the flow detector 1012 receives the subnet identifier information 16 from the routing processing unit 111, it stores a source subnet identifier in the subnet ID storage 1032 (Step 902). In a read out of list table 930, a list table address generator 1031 generates each of list table addresses from the source subnet identifier stored in the subnet ID storage 1032 and the corresponding value M of the list number counter 733 and reads out the corresponding list 540 from the list table 1060 (Step 932).

A description will next be made of changes in processing for comparisons between input line numbers by a condition check unit 1020. In Step 941 of a read out of entry table 940, the storage of an input line number 508 in the entry line number storage 1027-3 and the storage of an input line number validity indication bit 561 in a validity indication bits storage 1026 are performed in addition to the storage of the condition items SIP, DIP, SPORT, DPORT and TOS described in FIG. 11. Upon a check of condition 920, the line number comparator 1027-1 determines the coincidence between information stored in the packet line number storage 1027-2 and the entry line number storage 1027-3 according to the state of the input line number validity indication bit 561 (Step 921-5). The source subnet limitation type is identical to the input line limitation type in operation other than the above.

When the backbone router 328 of the network shown in FIG. 2 performs QoS control on packets sent from the enterprise network-C: 323 and the enterprise network-D: 324, each enterprise network cannot be identified by the input line number as in the case of the edge router-B 327. In this case, each source subnet is used to specify an enterprise network. When the enterprise network-C and the enterprise network-D: 324 are different in flow detection from each other, the backbone router 328 must have an entry group for the enterprise network-C: 323 and an entry group for the enterprise network-D: 324. Since, however, the flow detection can be performed with only the specific entry group corresponding to each source subnet, of these entry groups as a retrieval object, the flow detection of the source subnet limitation type can obtain performance equal to twice or more times that of the linear search type.

A destination subnet limitation type flow detection for limiting each retrieval-oriented entry by a destination subnet will next be explained as a sixth embodiment of the present invention while centering around a point of difference between the present destination subnet limitation type and the source subnet limitation type.

In the flow detection of the destination subnet limitation type, the list table 1060 shown in FIG. 10 is divided into a plurality of sub-list tables every destination subnet identifiers in place of the source subnet identifiers. In Step 902 in the flowchart shown in FIG. 14, a destination subnet identifier included in subnet identifier information 16 given from the routing processing unit 111 is stored in the subnet ID storage 1032. In Step 932, the list table address generator 1031 generates each of list table addresses from the destination subnet identifier stored in the subnet ID storage 1032 and the corresponding value M of the list number counter 733. The destination subnet limitation type is identical in other processes to the source subnet limitation type.

When the enterprise network-C: 323 and enterprise network-D: 324 are different in flow detection from each other where the backbone router 328 of the network shown in FIG. 2 performs QoS control on packets to be forwarded to the enterprise network-C: 323 and enterprise network-D: 324, the present destination subnet limitation type can obtain performance equal to twice or more times that of the linear search type by limiting each retrieval-oriented entry with the destination subnet as in the present embodiment.

Figure 22:
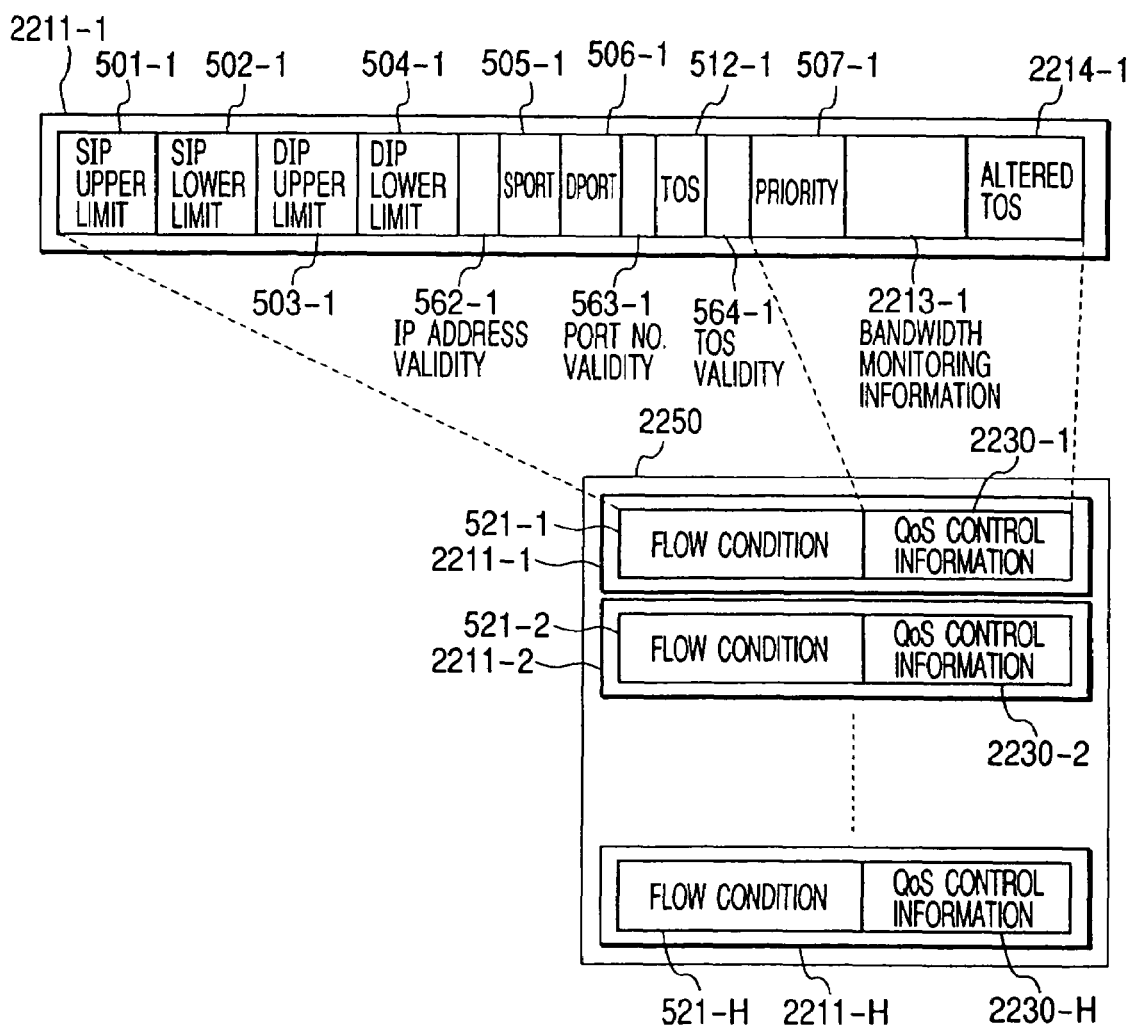
FIG. 22 is a diagram showing another embodiment of an entry table according to the present invention, in which bandwidth monitoring information and altered TOS are defined in addition to priority information.
Figure 23:
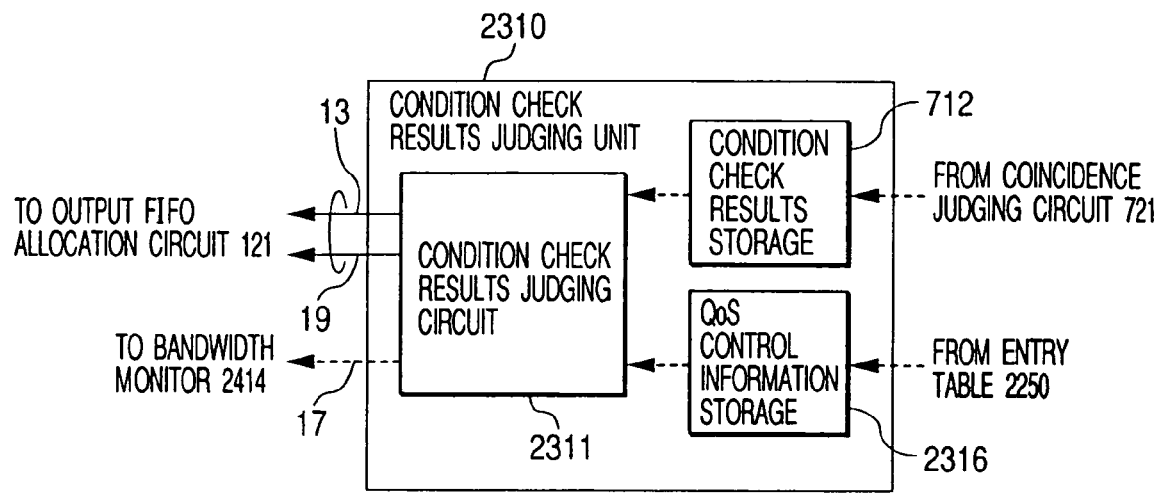
FIG. 23 is a block diagram illustrating one embodiment of a condition check results judging unit for determining the priority information, bandwidth monitoring information and altered TOS.
Figure 24:
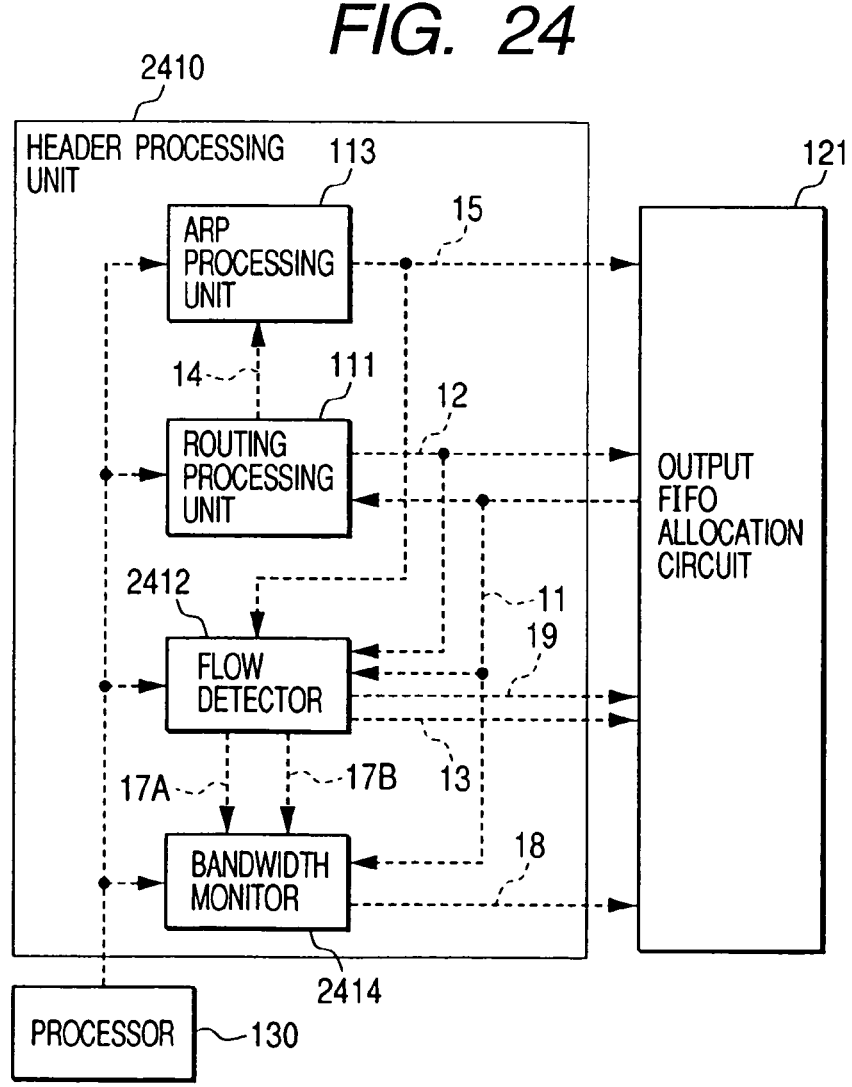
FIG. 24 is a block diagram depicting another embodiment of a header processing unit.
Figure 25:
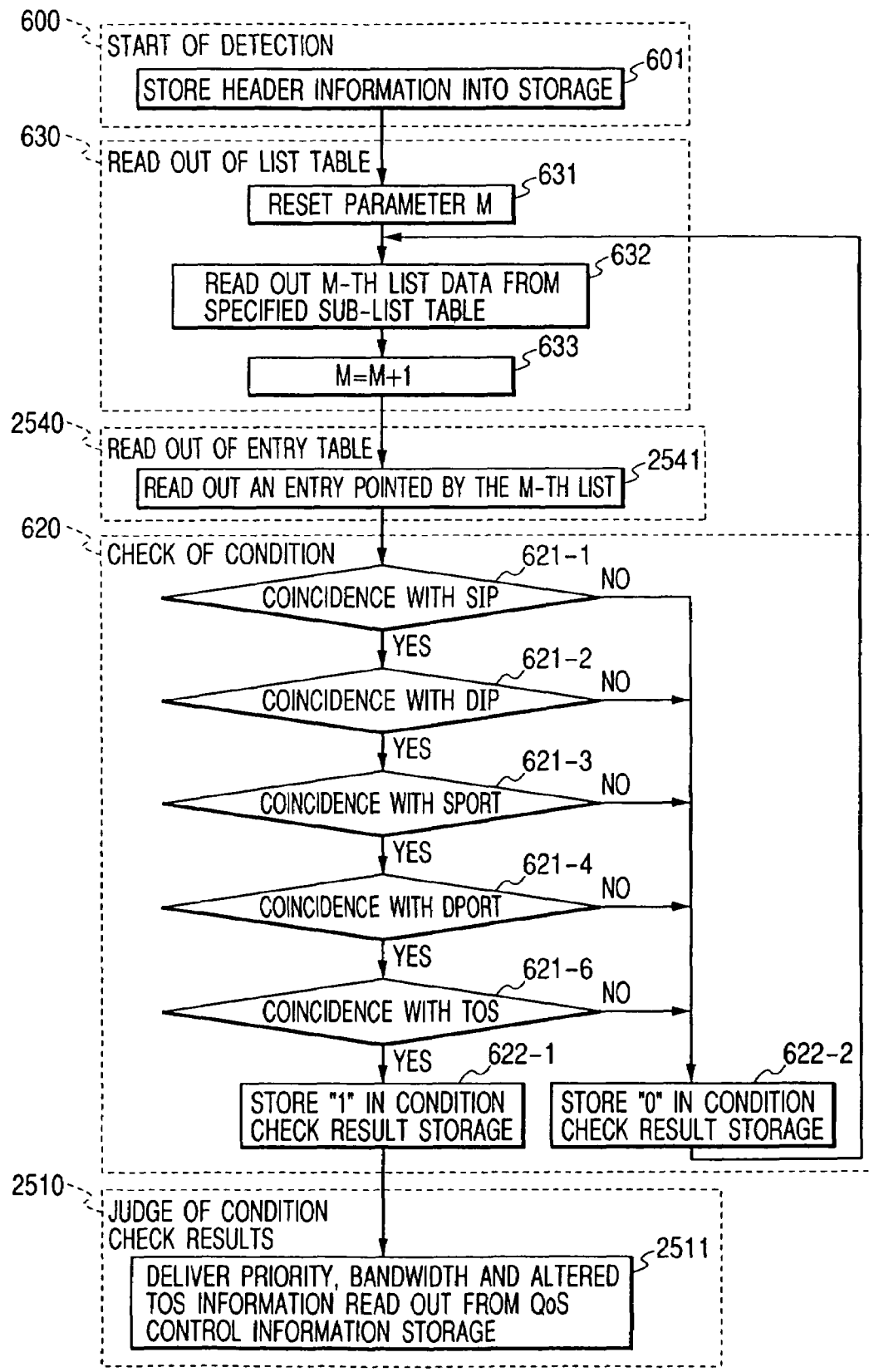
FIG. 25 is a flowchart for describing a further embodiment of a flow detector of an input line limitation type according to the present invention, which is used for determining bandwidth monitoring information and altered TOS in addition to priority information.

A method of determining bandwidth monitoring information necessary for bandwidth monitoring and an altered TOS necessary to rewrite or alter TOS 512 in addition to priority information every received packets by reference to an entry table will next be described as a seventh embodiment of the present invention. A table format for determining the priority information, bandwidth monitoring information and altered TOS according to the flow detection of input line limitation type is shown in FIG. 22, the configuration of a condition check results judging unit 2310 is shown in FIG. 23, the configuration of a header processing unit 2410 is illustrated in FIG. 24, and a flowchart for describing the method is depicted in FIG. 25. A description will be made below of the difference between the present method and the flow detection (input line limitation type) according to the first embodiment for determining only priority information as QoS control information.

In each entry registered in an entry table 2250, bandwidths allowed for its flow, e.g., bandwidth monitoring information 2213 indicative of the amount of data transmittable per unit hour and an altered TOS 2214 are newly added to QoS control information 2230 in addition to the priority information 507. Upon the flow detection, the bandwidth monitoring information 2213 and the altered TOS 2214 are stored in a QoS control information storage 2316 together with the priority information 507 in Step 2541 of a read out of entry table 2540 as shown in FIG. 25. At this time, line numbers and list table addresses are supplied from a flow detector 112 to a bandwidth monitor 2414 as flow identification information 17A.

In a judge of condition check result 2510, a condition check results judging circuit 2311 transmits the priority information and altered TOS read out from the QoS control information storage 2316 to an output FIFO allocation circuit 121 as packet priority information 13 and packet altered TOS information 19 respectively, and transmits the bandwidth monitoring information read out from the QoS control information storage 2316 to the bandwidth monitor 2414 as packet bandwidth monitoring information 17B (Step 2511).

The bandwidth monitor 2414 is supplied with information indicative of a total length (not shown in FIG. 3) of each packet included in an IP header field of each received packet from the output FIFO allocation circuit 121 in addition to the flow identification information 17A and bandwidth monitoring information 17B sent from the flow detector 112 in Step 601. The bandwidth monitor 2414 cumulates the total lengths of the received packets per unit hour in a counter area corresponding to the flow identification information 17A when the bandwidth monitor 2414 has received the bandwidth monitoring information 17B therein. Further, the bandwidth monitor 2414 determines whether the cumulated value exceeds a bandwidth supplied as the bandwidth monitoring information 17, and outputs a bandwidth judgment signal 18 indicative of whether the flows of the respective received packets comply with a contract bandwidth or is in violation of contract, to the output FIFO allocation circuit 121.

The output FIFO allocation circuit 121 writes the packet priority information 13 and the packet altered TOS 19 received from the flow detector 112 into the corresponding header field of each received packet stored in a buffer memory 128 as QoS control information 409 and TOS 411. If the bandwidth judgment signal 18 indicates the compliance of the control bandwidth when all the output line number 408, DAMAC 401, QoS control information 409 and TOS 411 are written into the header of each received packet, then the output FIFO allocation circuit 121 supplies each received packet stored in the buffer memory 128 to each output FIFO buffer 127-$ij$ (j=1 or 2) specified by the priority information 13, of each line corresponding unit 122-$i$ indicated by the output line number 408. If the bandwidth judgment signal 18 indicates a violation of contract bandwidth, then the output FIFO allocation circuit 121 discards the received packet stored in the buffer memory 128. In place of the discarding of the received packet, the TOS 411 or QoS control information 409 of each packet header are rewritten into a value indicative of low priority and the received packet may be supplied to a low-priority output FIFO buffer.

In order to implement QoS control over an ATM network or a frame relay network which connects between routers, each router needs to allocate connections (VC/VP and DLCI) every received packets according to users or applications specified by packet headers and perform QoS control with a data link layer. In this case, each router needs a flow detection for determining each connection.

One example of the allocation of connections will be explained with reference to FIG. 46. A network shown in FIG. 46 comprises an enterprise network-A: 4302, an enterprise network-B: 4303, and a public ATM network 4301 for connecting these enterprise networks to one another. The public ATM network 4301 includes an ATM switch A: 4310, and an ATM switch B: 4311. Assume that a connection VC1 of CBR (Constant Bit Rate) and a connection VC2 of UBR (Unspecified Bit Rate) are set between a router 4312 of the enterprise network-A: 4302 and a router 4313 of the enterprise network-B: 4303. Since a packet on the connection VC1 is transferred preferentially as compared with a packet on the connection VC2 at the ATM switch 4310 and ATM switch 4311 in this case, QoS is assured but not for the packet on the connection VC2. The router 4312 performs flow detection on the corresponding packet sent from the enterprise network-A: 4302 to the enterprise network-B: 4303, and allocates the CBR connection VC1 to each packet to assure QoS and assigns the UBR connection VC2 to packets other than that.

Figure 26:
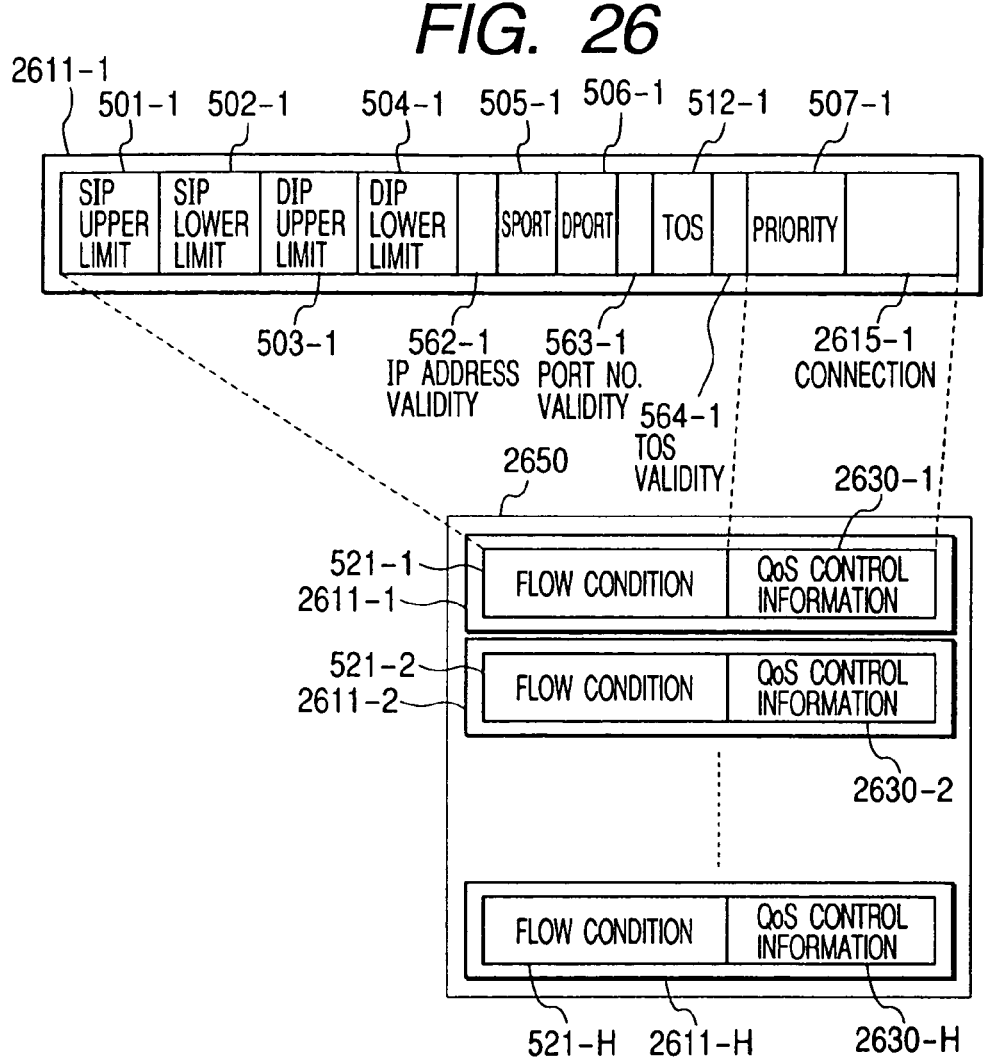
FIG. 26 is a diagram showing a further embodiment of an entry table according to the present invention, in which connection information is defined in addition to priority information.
Figure 27:
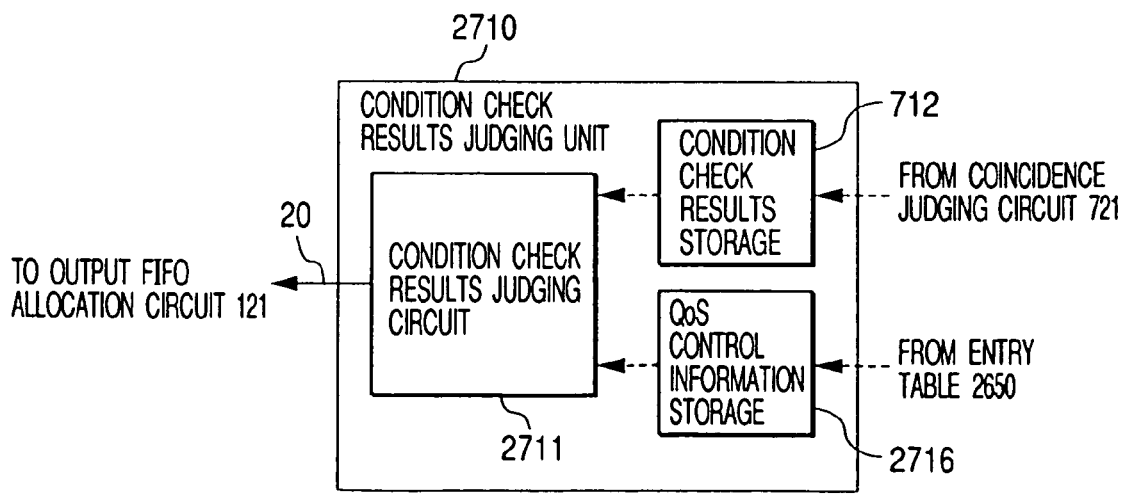
FIG. 27 is a block diagram illustrating one embodiment of a condition check results judging unit for determining priority information and connection information.
Figure 28:
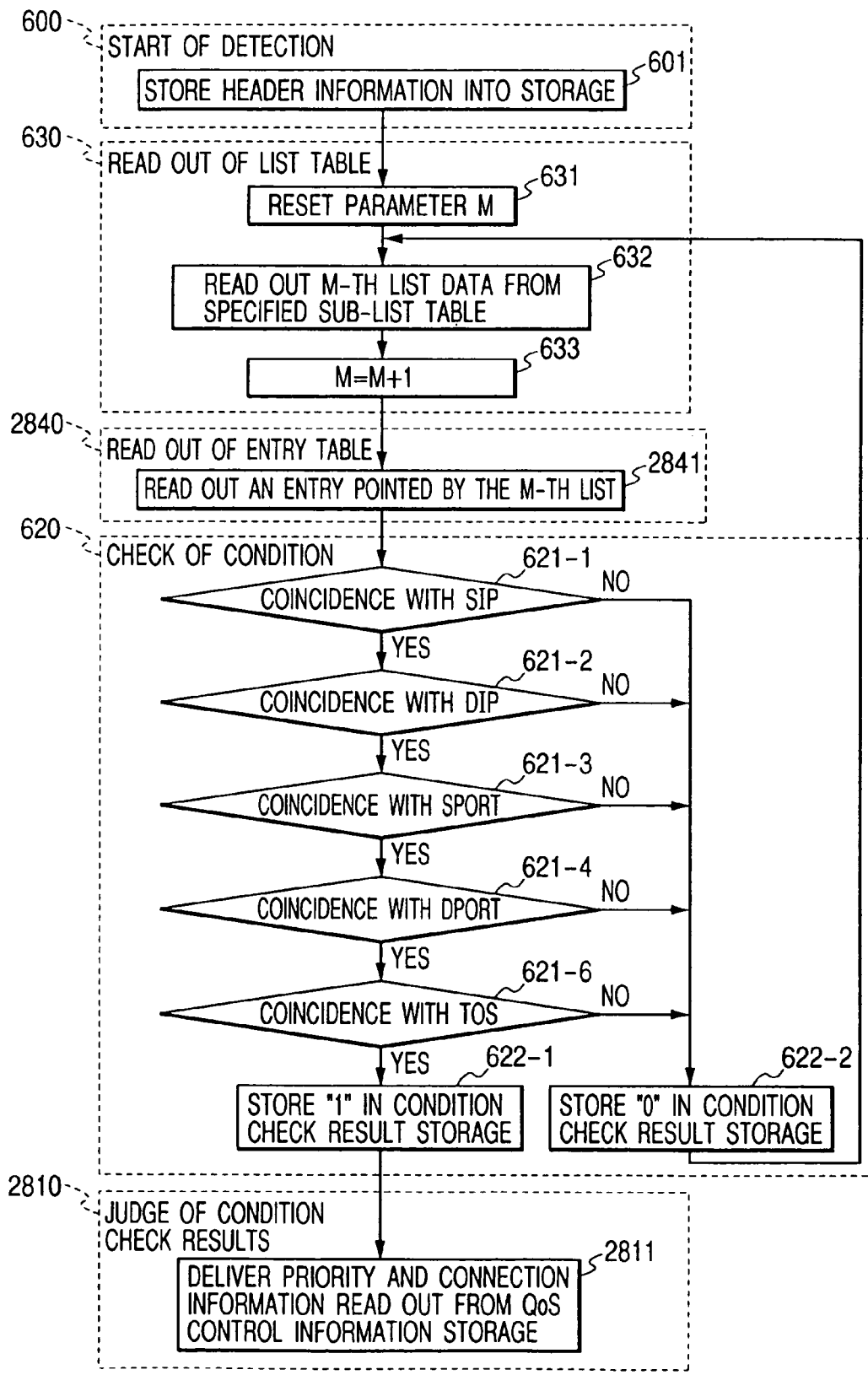
FIG. 28 is a flowchart depicting a still further embodiment of a flow detector of an input line limitation type according to the present invention, for determining priority information and connection information.

One examples of an entry table 2650, a condition check results judging unit 2710 and a control flowchart employed in the input line limitation type used for determining the aforementioned connections will be shown in FIGS. 26, 27 and 28 as an eighth embodiment of the present invention. A description will be made below of a point of difference between the present flow detection and the flow detection according to the first embodiment for determining only the priority information.

As shown in FIG. 26, connection information 2615 is newly added to each entry of the entry table 2650 as QoS control information 2630.

In a read out of entry table 2840 in the flowchart shown in FIG. 28, the connection information 2615 is also stored in a QoS control information storage 2716 together with priority information 507. In a judge of condition check results 2810, a condition check results judging circuit 2711 reads the connection information and priority information from the QoS control information storage 2716 according to condition check results set to a condition check results storage 712 and outputs them to an output FIFO allocation circuit 121 as QoS information 20 (Step 2811). The output FIFO allocation circuit 121 writes the priority information and connection information specified by the QoS information 20 into a QoS control information field 409 of each received packet stored in a buffer memory 128 and supplies the packet to each output FIFO buffer 127-$ij$ indicated by the priority information lying within each line interface unit 122-$i$ indicated by an output line number 408. Each packet is assigned the connection specified by the connection information on the QoS control information field 409 by each transmission circuit 125-$i$ and sent to its corresponding line 123-$i$.

While the flow detection for the QoS control has been described above, a flow detection for filtering will next be described as a ninth embodiment of the present invention.

Figure 29:
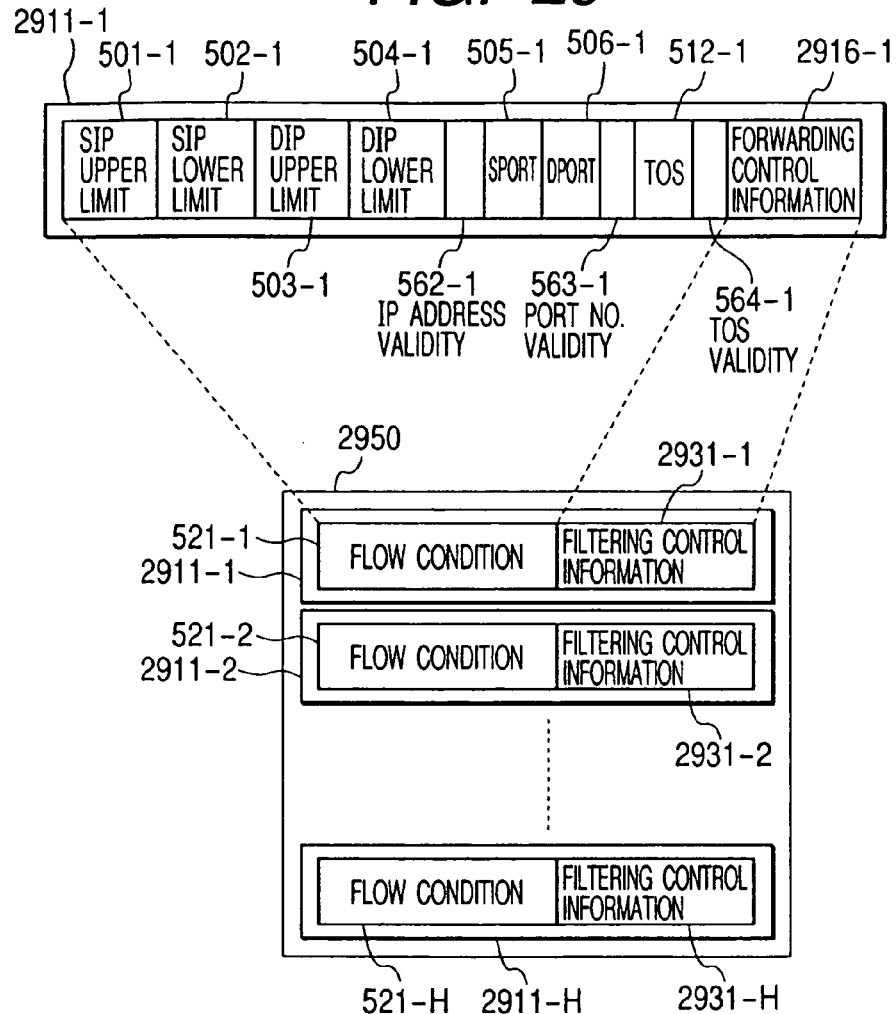
FIG. 29 is a diagram showing a still further embodiment of an entry table according to the present invention, in which control information for executing filtering is defined.
Figure 30:
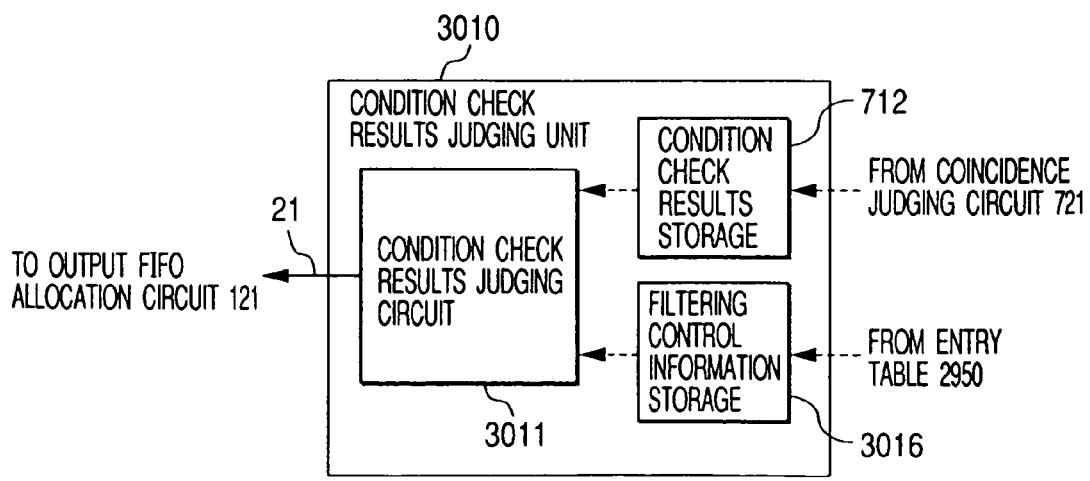
FIG. 30 is a block diagram showing one embodiment of a condition check results judging unit for executing filtering.
Figure 31:
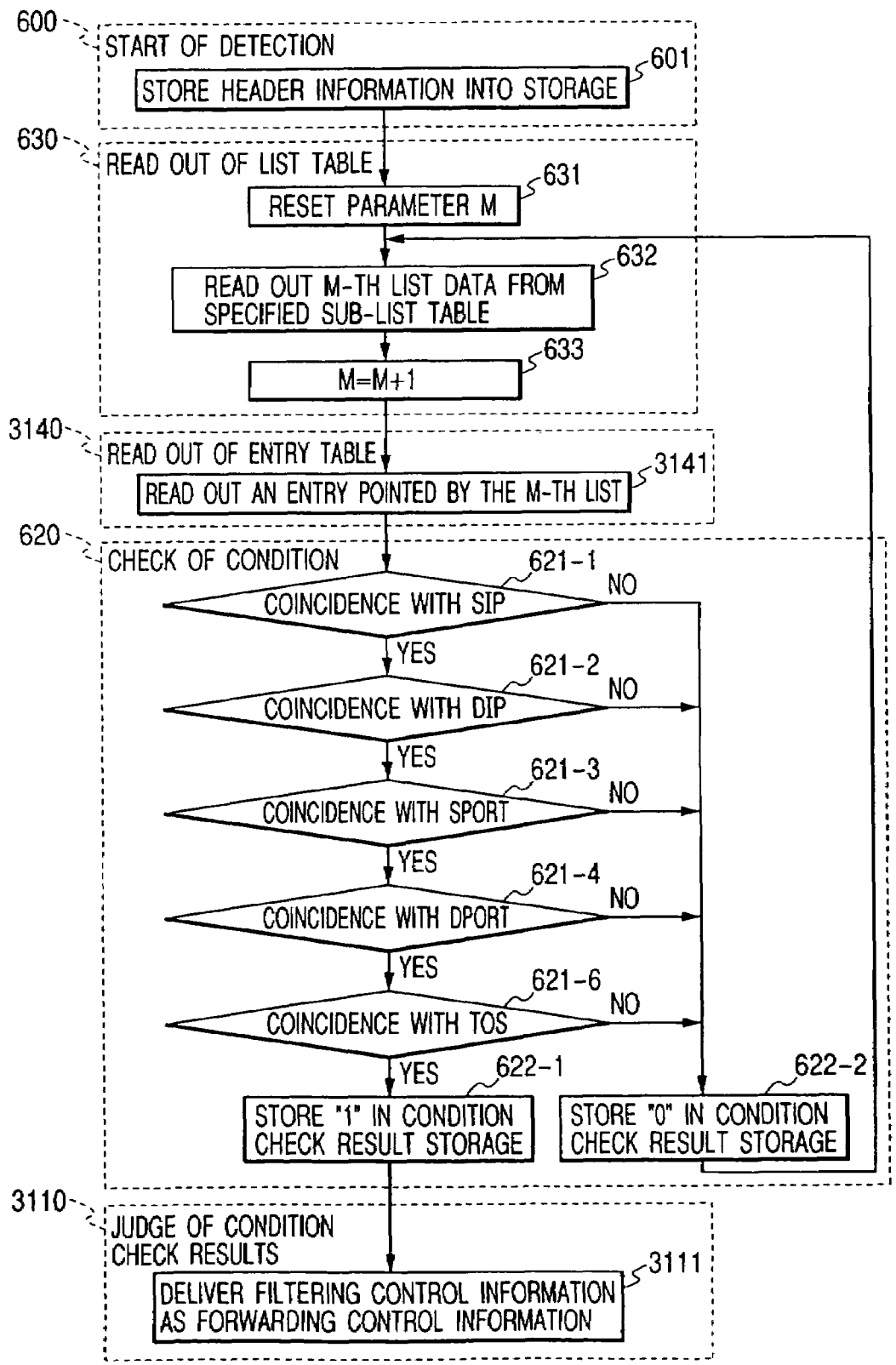
FIG. 31 is a flowchart illustrating a still further embodiment of a flow detector of an input line limitation type according to the present invention, which is provided with a filtering function.

FIGS. 29, 30 and 31 respectively show one examples of an entry table 2950, a condition check results judging unit 3010 and a control flowchart employed in an input line limitation type applied to the flow detection for filtering. A description will be made below of a point of difference between the present flow detection and the flow detection according to the first embodiment for determining the priority information based on the QoS control.

Upon the filtering, a check is made as to header information about a packet received by each line corresponding unit 122 and whether or not it can be forwarded to other line interface units, is determined. As shown in FIG. 29, each entry registered in the entry table for filtering includes filtering control information 2931 indicative of forwarding control information 2916 in place of the QoS control information 530 employed in the first embodiment. As shown in FIG. 30, the condition check results judging unit 3010 of the flow detector 112 has a filtering control information storage 3016 in place of the QoS control information storage 713. In a read out of entry table 3140 in the flowchart shown in FIG. 31, the forwarding control information 2916 of each entry read out from the entry table is stored in the filtering control information storage 3016. When the header information of each received packet has coincided with a flow condition in a judge of condition check results 3110, a condition check results judging circuit 3011 outputs filtering control information read out from the filtering control information storage 3016 to an output FIFO allocation circuit 121 as forwarding control information 21 in place of the priority information employed in the first embodiment (Step 3111).

The illustrated embodiment has described the flow detection with the objective of performing either one of the QoS control and filtering. While the router 326 lying within the Internet 325 may generally perform only the flow detection for the QoS control in the network shown in FIG. 2 by way of example, the gateway router 329 connected to the router 326 needs to perform both flow detections for the QoS control and filtering.

A description will be made below of flow detections applicable to the QoS control and filtering as further embodiments of the present invention. In the present invention, a flow detection in which each entry is applied to both QoS control and filtering, is called "simultaneous flow detection", and a flow detection in which different entries are applied to QoS control and filtering respectively, is called "two-stage flow detection".

Figure 32:
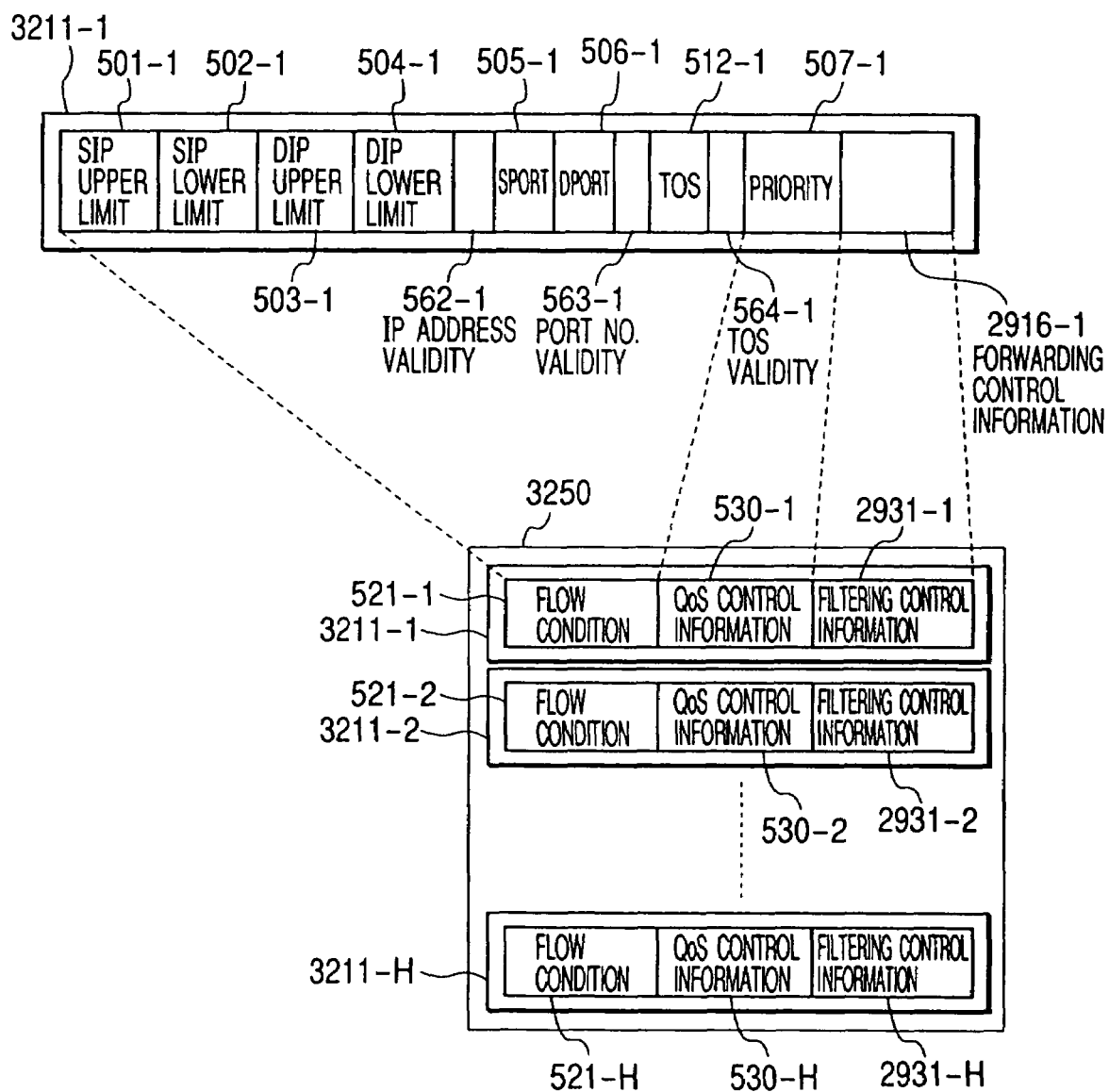
FIG. 32 is a diagram depicting a still further embodiment of an entry table according to the present invention, in which QoS control information and filtering control information are defined.
Figure 33:
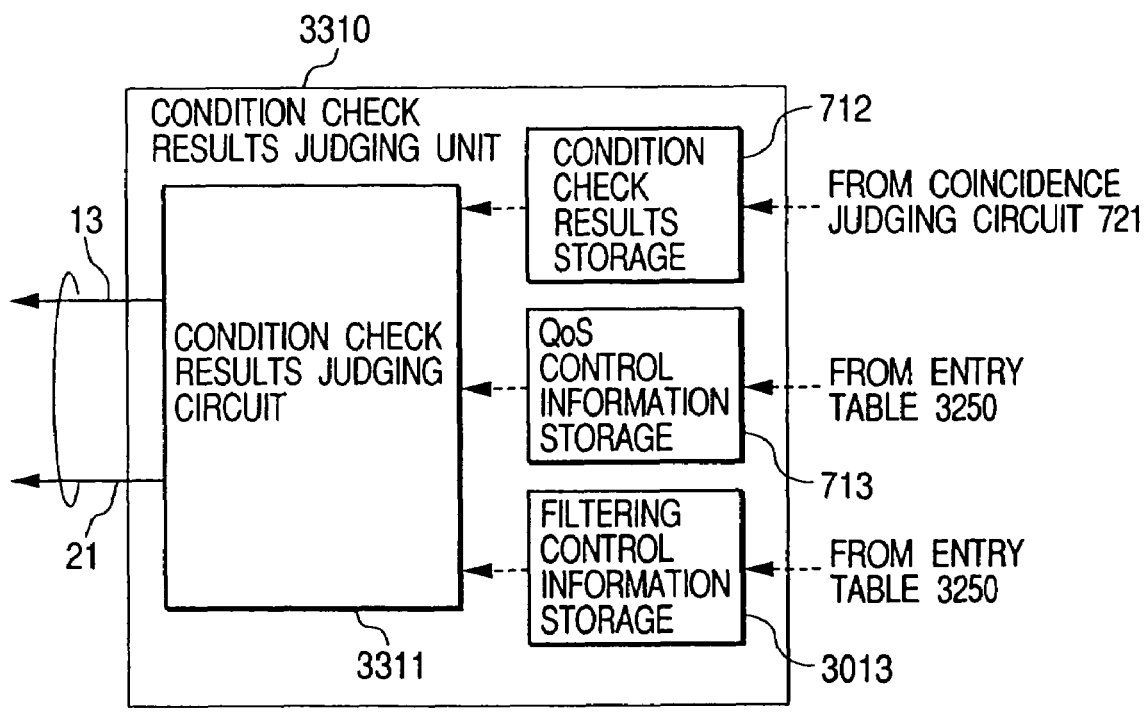
FIG. 33 is a block diagram showing one embodiment of a condition check results judging unit for simultaneously determining QoS control information and filtering control information.
Figure 34:
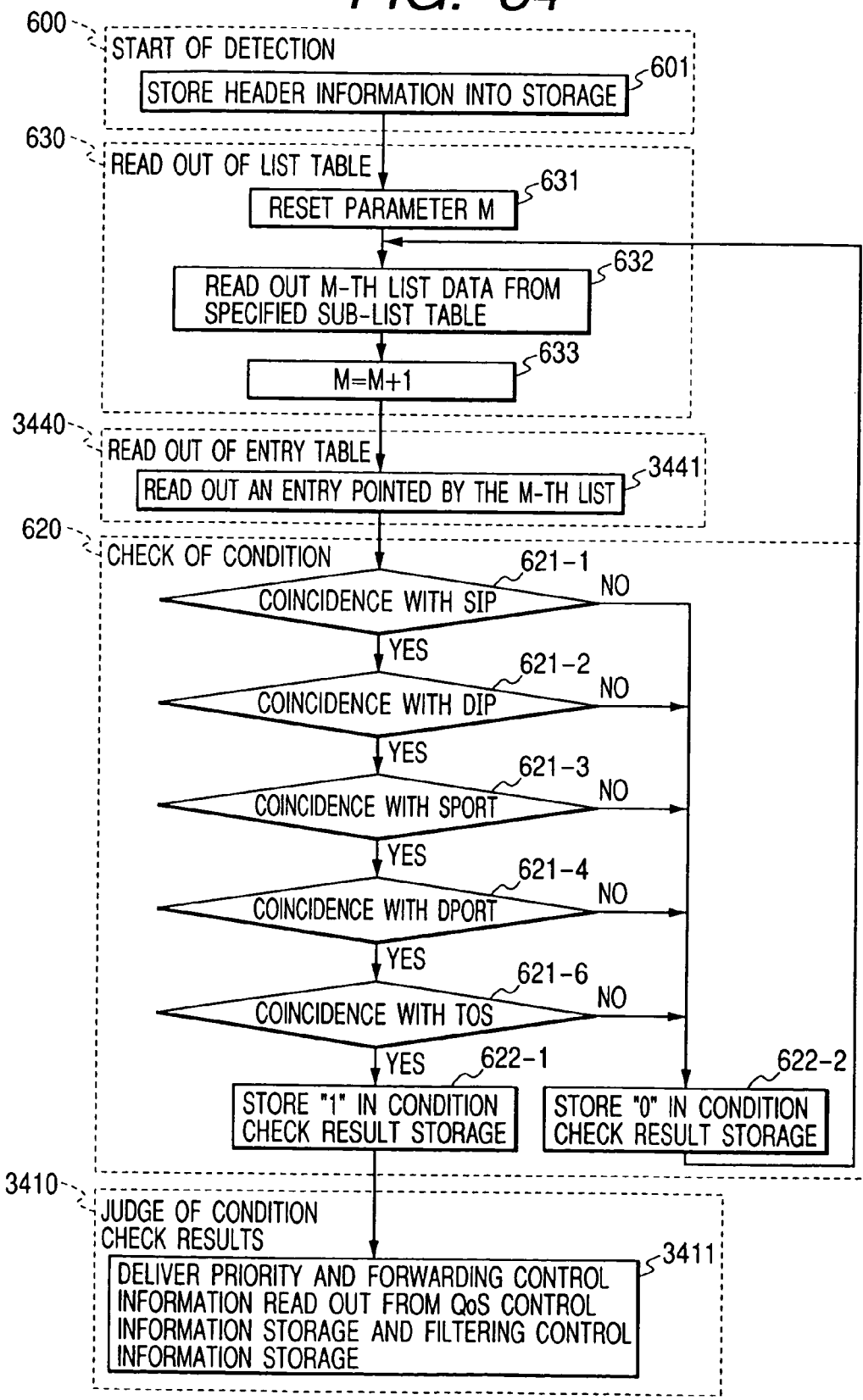
FIG. 34 is a flowchart for describing the operation of a flow detector of a simultaneous detection mode, which performs QoS control and filtering simultaneously.

The flow detection of simultaneous flow detection type will first be described as a tenth embodiment of the present invention. In the flow detection of simultaneous flow detection, QoS control information necessary for QoS control and forwarding control information necessary for filtering are simultaneously determined. FIGS. 32, 33 and 34 respectively show one examples of an entry table 3250, a condition check results judging unit 3310, and a control flowchart based on an input line limitation type used for the simultaneous flow detection. A description will be made below of a point of difference between the present flow detection and the flow detection of the first embodiment for determining the priority information for QoS control.

As shown in FIG. 32, each entry 3211 of the entry table 3250 includes a flow condition 3211 and filtering control information 2931 including forwarding control information 2916 in addition to the QoS control information 530 including the priority information.

As shown in FIG. 33, the condition check results judging unit 3310 is provided with a filtering control information storage 3016 in addition to a condition check results storage 712 and a QoS control information storage 713.

In Step 3441 of a read out of entry table 3440 in the flowchart shown in FIG. 34, priority information 507 and forwarding control information 2916 of each entry are respectively stored in the above-described storages 713 and 3016. When the header information of each received packet has coincided with a flow condition, a condition check results judging circuit 3311 outputs priority information and forwarding control information read out from these storages 713 and 3016 to an output FIFO allocation circuit 121 in a judge of condition check results 3410.

Figure 35:
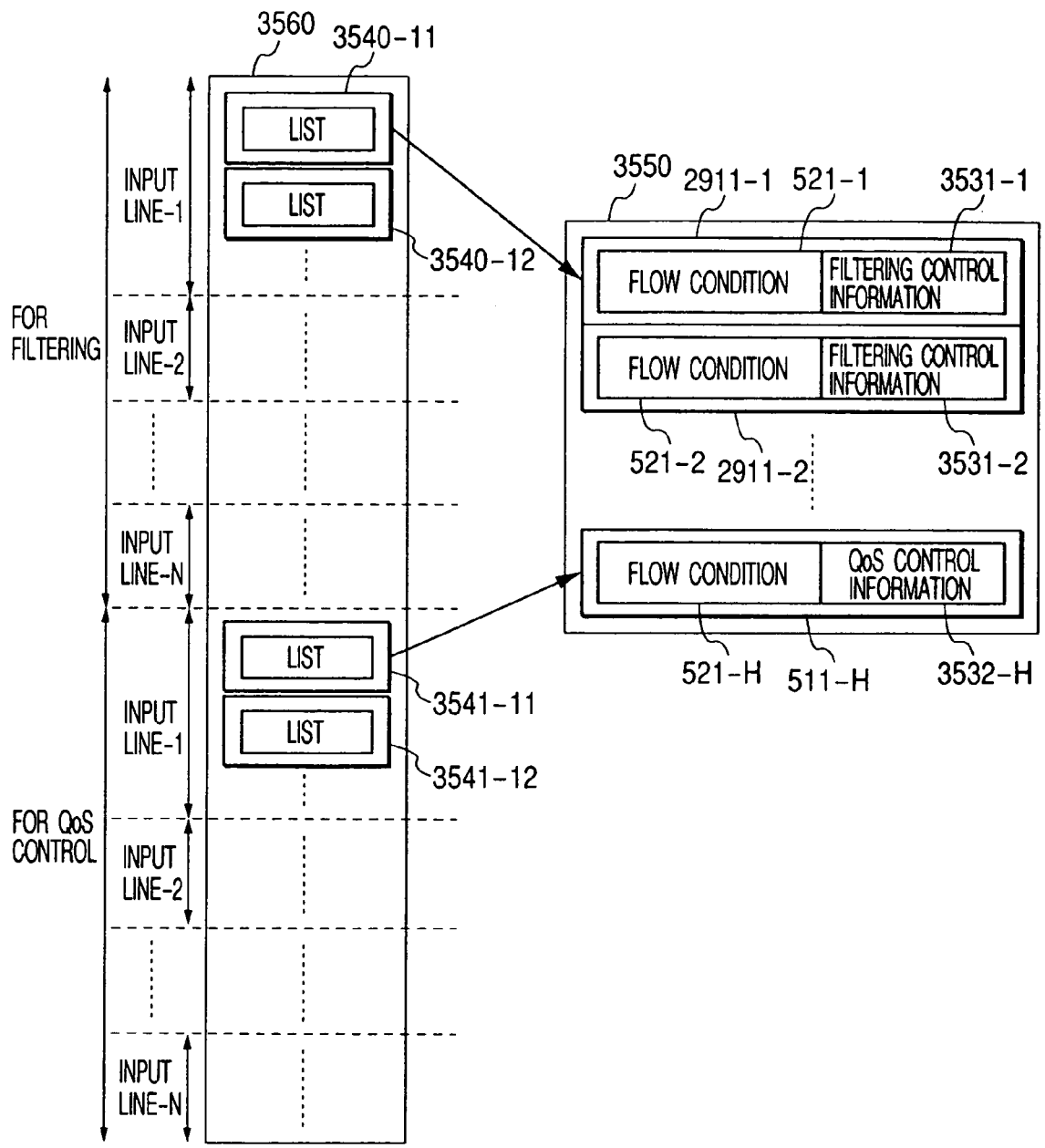
FIG. 35 is a diagram depicting embodiments of a list table and an entry table for alternately performing QoS control and filtering.
Figure 36:
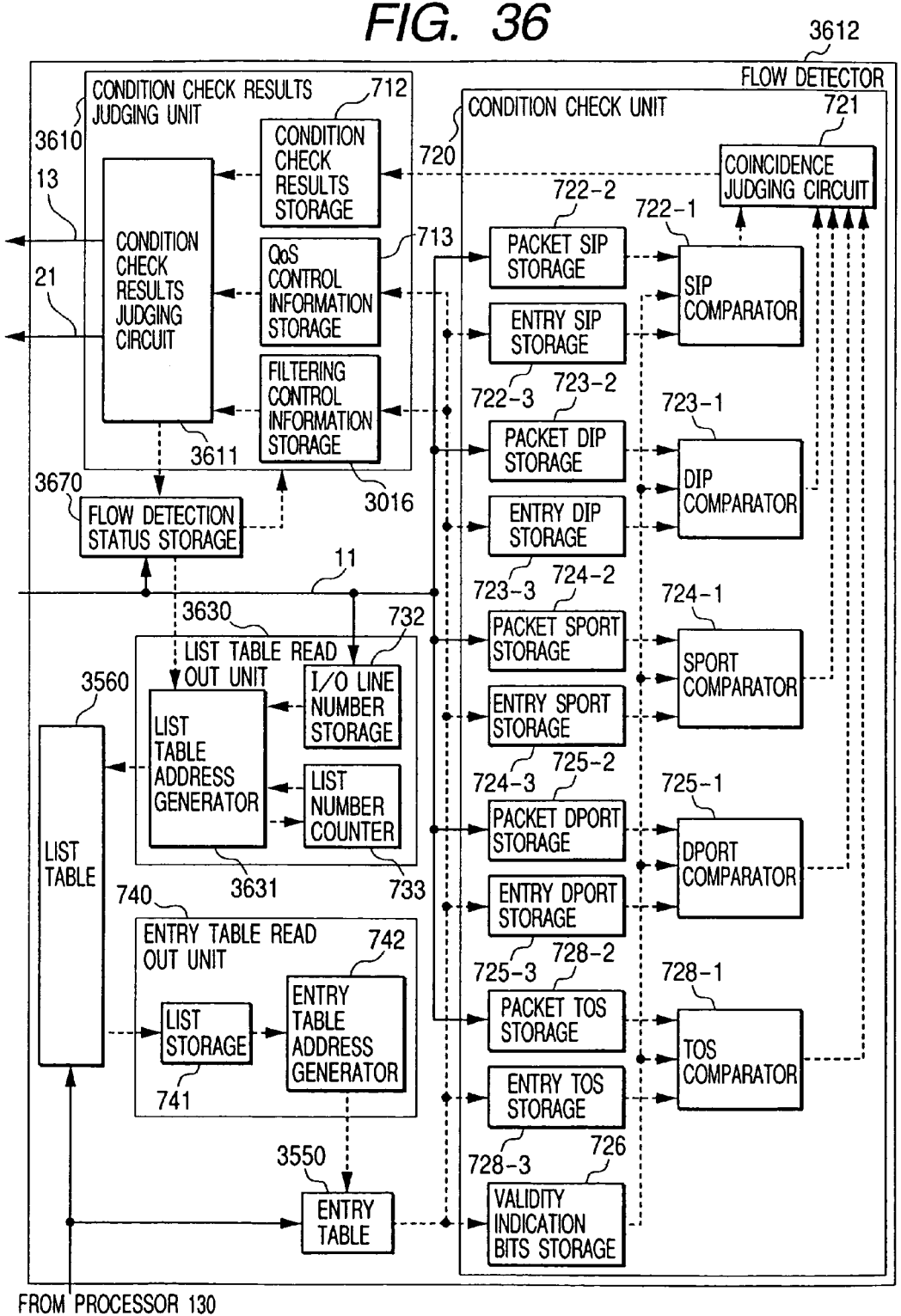
FIG. 36 is a block diagram showing one embodiment of a flow detector of a two-stage detection mode, which alternately performs QoS control and filtering.
Figure 37:
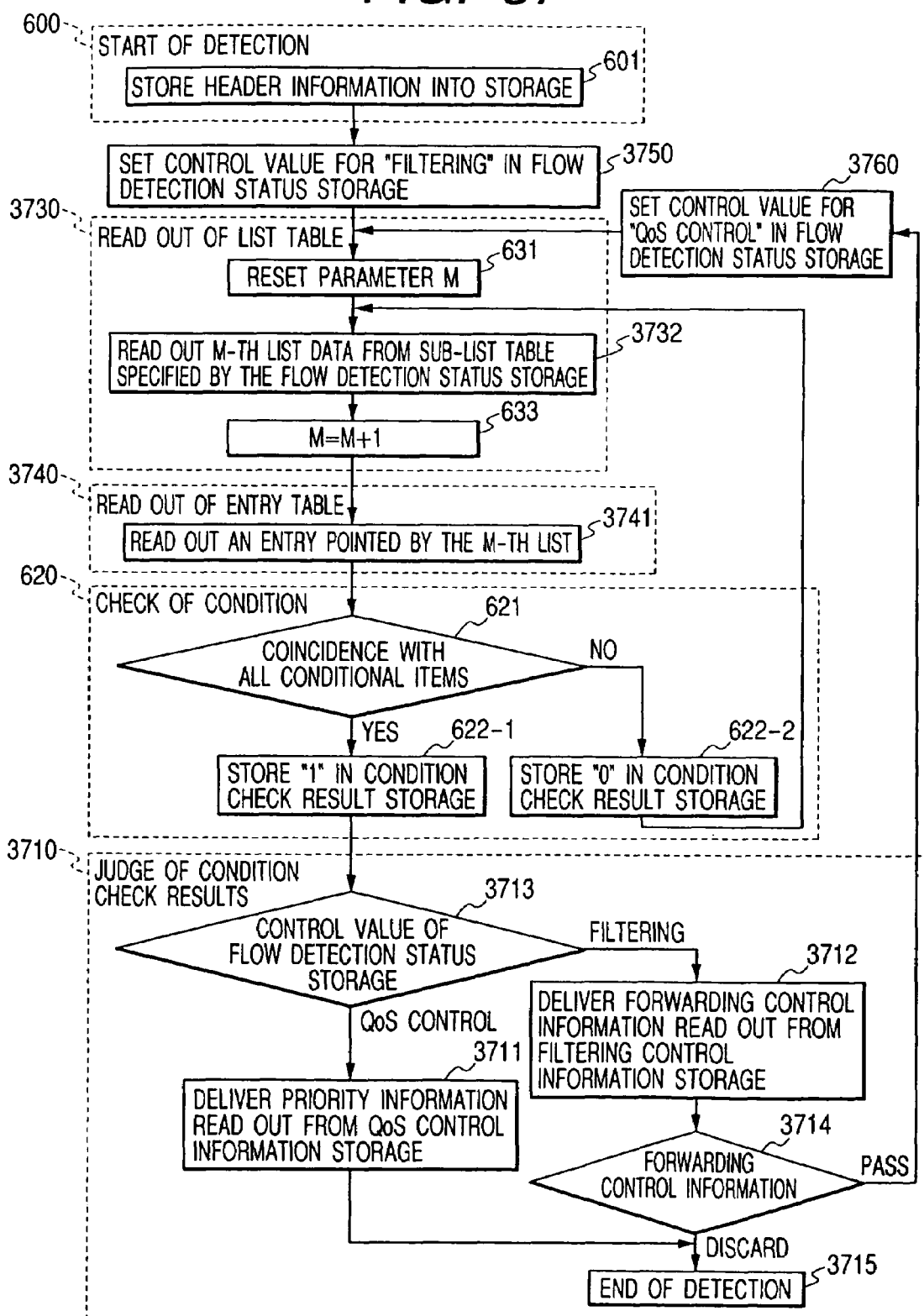
FIG. 37 is a flowchart for describing the operation of the flow detector of the two-stage detection mode.

In the two-stage flow detection type flow detection according to an eleventh embodiment of the present invention, a flow detection for QoS control and a flow detection for filtering are executed on a time sequence basis. FIGS. 35, 36 and 37 respectively show one examples of a list table-3560 and an entry table 3550, a flow detector 3612, and a control flowchart according to an input line limitation type employed in the two-stage flow detection type. Incidentally, condition check Steps 621-1 through 621-4 and 621-6 provided every items are summarized as Step 621 in FIG. 37.

As shown in FIG. 35, entries 2911 for filtering and entries 511 for QoS control are registered in the entry table 3550 in mixed form. On the other hand, the list table 3560 includes a list table for filtering comprised of a plurality of lists 3540 including pointer addresses of the entries 2911 for filtering, and a list table for QoS control comprised of a plurality of lists 3541 including pointer addresses of the entries 511 for QoS control. Each list table is divided into a plurality of subtables corresponding to input line numbers respectively. Upon the flow detection for filtering, each list for filtering 3540 is read out, whereas upon the flow detection for QoS control, each list for QoS control 3541 is read out.

As shown in FIG. 36, the flow detector 3612 is provided with a flow detection status storage 3670 indicative of whether either of the flow detection for filtering and the flow detection for QoS control is being executed.

When the flow detector 3612 receives header information 11 from a packet I/O unit 120 as shown in FIG. 37, it sets a value indicative of filtering status to the flow detection status storage 3670 to perform the flow detection for filtering after the execution of a start of detection 600 (Step 3750).

Upon a read out of list table 3730, an entry table read out unit 3630 determines each list table to be accessed, according to a status value of the flow detection status storage 3670. In the preset example, a list table for filtering is first selected and lists are sequentially read out from subtables each corresponding to an input line number of each received packet (Step 3732). In a read out of entry table 3740, entries are read out from the entry table 3550 based on pointer addresses indicated by the lists respectively. When the flow detection is being in a filtering state, respective item information on flow conditions 521 in the read entries are respectively stored in storages 722-3, . . . 728-3 of a condition check unit 720, and forwarding control information included in filtering control information 3531 is stored in a filtering control information storage 3016 (Step 3741). In a judge of condition check results 3710, a condition check results judging unit 3610 determines the status value of the flow detection status storage 3670 (Step 3713). When the flow detection is in the filtering state, the condition check results judging unit 3610 sends the value stored in the filtering control information storage 3016 to the FIFO allocation circuit 121 as packet forwarding control information 21 (Step 3712). Thereafter, the condition check results judging unit 3610 makes a decision as to whether the forwarding control information indicates either a packet pass or a packet discard (Step 3714). If the forwarding control information indicates the packet discard, then the flow detection related to each packet referred to above is terminated without the execution of the flow detection for QoS control (Step 3715). When the forwarding control information is found to have indicated the packet pass, then the condition check results judging unit 3610 sets a status value indicative of a QoS control state to the flow detection status storage 3670 to proceed to the flow detection for QoS control (Step 3760) and returns to the read out of list table 3730.

In the read out of list table 3730, the lists 3541 registered in the list table for QoS control are sequentially read out according to the switching between status modes for the flow detection. In the read out of entry table 3740, each entry for QoS control is read out from the entry table, based on each list 3541 referred to above and each priority information included in QoS control information 3532 is stored in the QoS control information storage 713 (Step 3741). Since the status value of the flow detection status storage 3670 indicates QoS control in the judge of condition check results 3710, a condition check results judging circuit 3611 sends the information stored in the QoS control information storage 713 to the FIFO allocation circuit 121 as packet priority information 13 (Step 3711) and thereafter completes the flow detection (Step 3715).

Since the flow detection for QoS control with respect to each discarded packet can be omitted upon the first execution of the flow detection for filtering in the two-stage flow detection type flow detection as described above, the time required to perform the flow detection can be shortened.

Whether either of the aforementioned two-stage flow detection type and simultaneous flow detection type is reduced in set entry and is fit for speeding-up, varies depending on flow conditions. A description will be made of the difference in the number of entries at the time that the gateway router 329 shown in FIG. 2 executes each flow detection by reference to the entries identical in flow conditions for QoS control and filtering.

Figure 38:
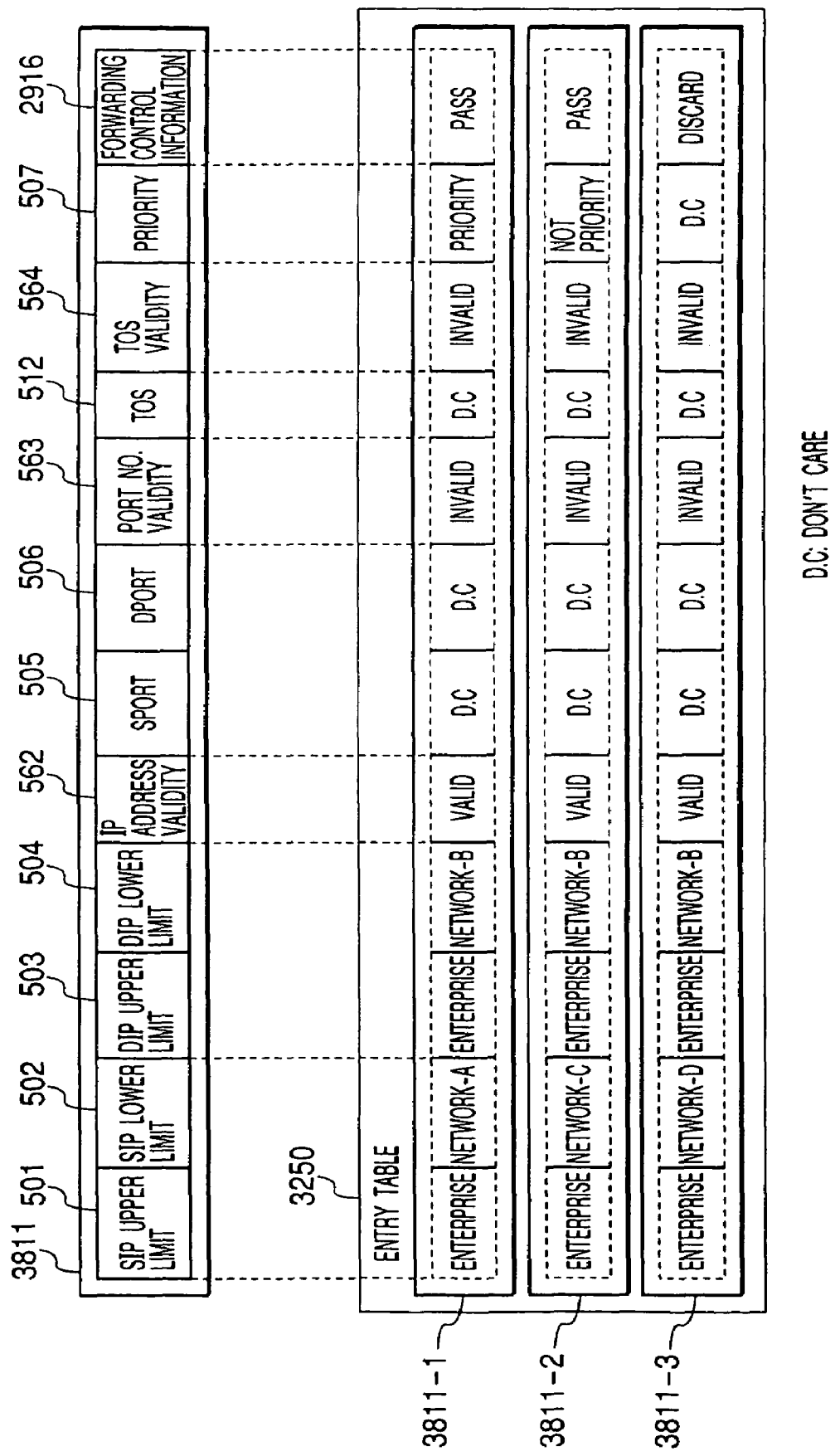
FIG. 38 is a diagram showing one example of entry contents at the time that flow conditions for filtering and QoS control are the same in an entry table for the simultaneous detection mode.
Figure 39:
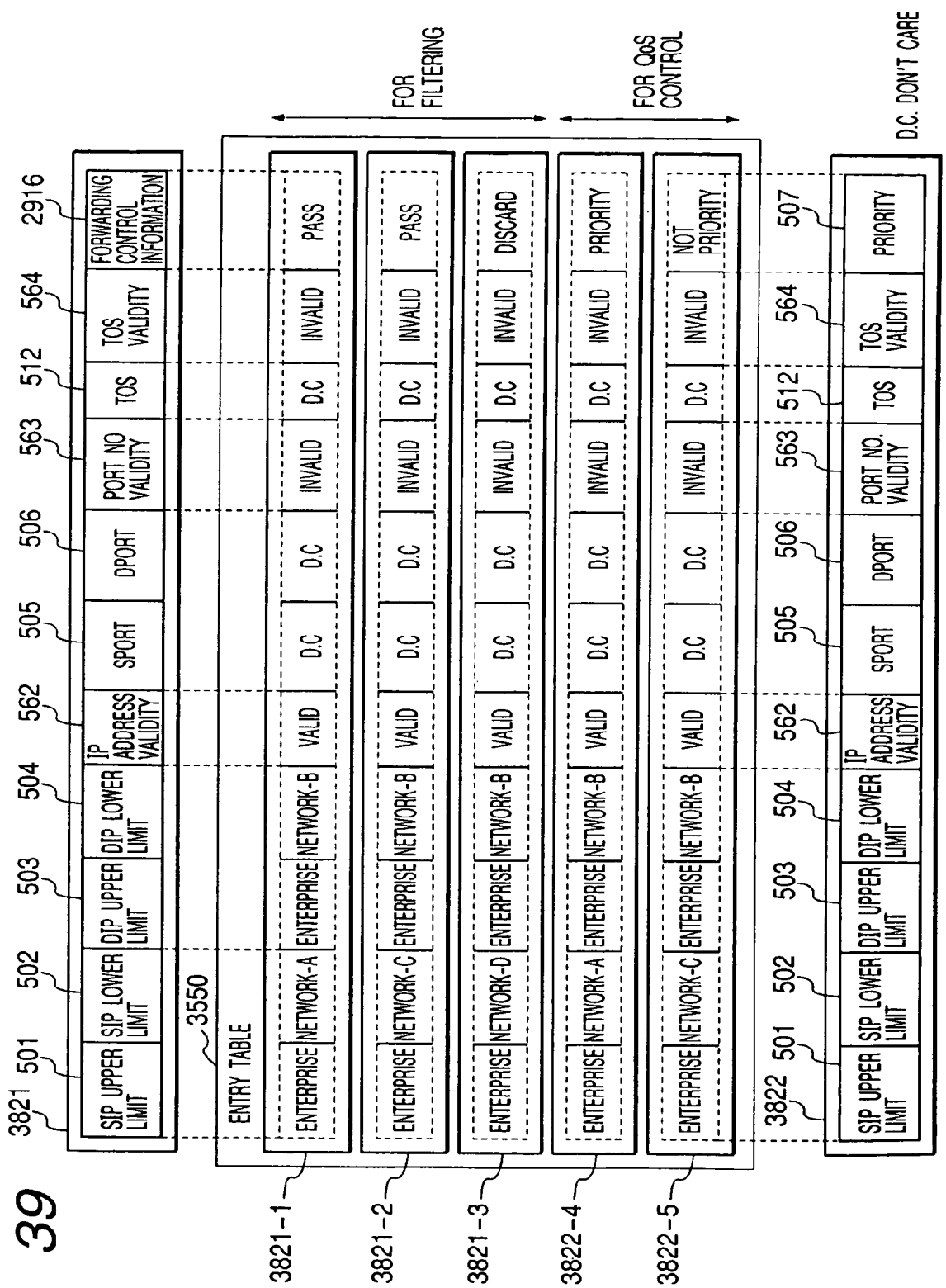
FIG. 39 is a diagram illustrating one example of entry contents at the time that flow conditions for filtering and QoS control are the same in an entry table for the two-stage detection mode.

FIG. 38 shows the contents of the entry table 3250 for the simultaneous flow detection type, and FIG. 39 shows the contents of the entry table 3550 for the two-stage flow detection type. In FIG. 39, three entries as viewed from above the entry table 3550 are used for filtering and the remaining two entries are used for QoS control.

In the case of the entries for both filtering and QoS control, the flow conditions are represented as SIP=enterprise network-A: 321, enterprise network-C: 323, enterprise network-D: 324 and DIP=enterprise network-B: 322. Assume that upon filtering, the gateway router 329 forwards received packets sent from the enterprise network-A: 321 and enterprise network-C: 323, discards a received packet sent from the enterprise network-D: 324 corresponding to another enterprise, and upon QoS control, the gateway router 329 preferentially forwards a received packet sent from the enterprise network-A: 321 and non-preferentially forwards a packet sent from the enterprise network-C: 323.

While the five entries are registered in the entry table 3550 as shown in FIG. 39 in the case of the two-stage flow detection type, the number of entries to be registered in the entry table 3250 may be three as shown in FIG. 38 in the case of the simultaneous flow detection type. The reason why each entry for QoS control of the enterprise network-D: 324 in the two-stage flow detection type is not registered, is that when each received packet is discarded in Step 3714, the flow detector 3612 terminates its flow detecting operation without performing the flow detection for QoS control.

Figure 40:
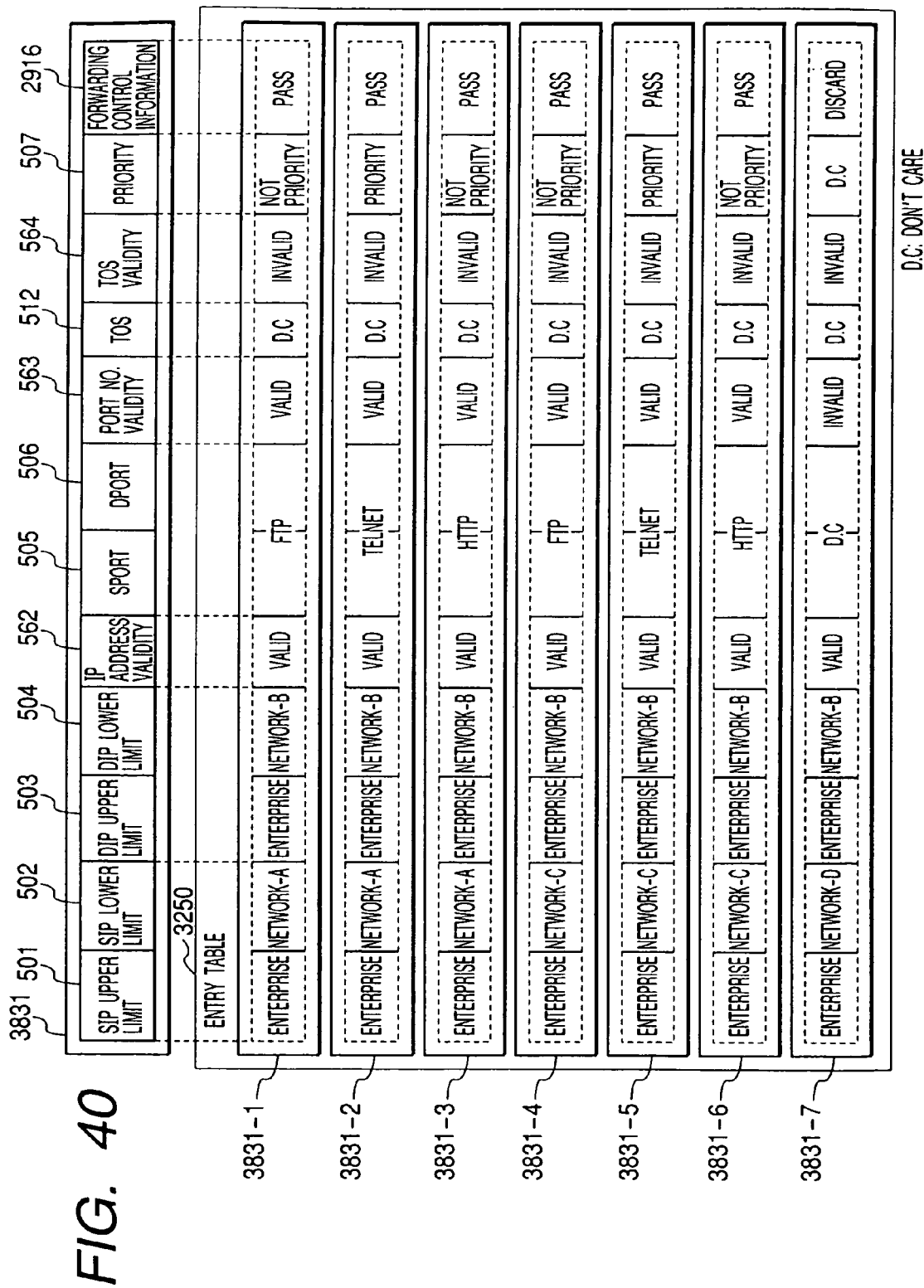
FIG. 40 is a diagram depicting one example of entry contents at the time that flow conditions for filtering and QoS control differ from each other in an entry table for the simultaneous detection mode.
Figure 41:
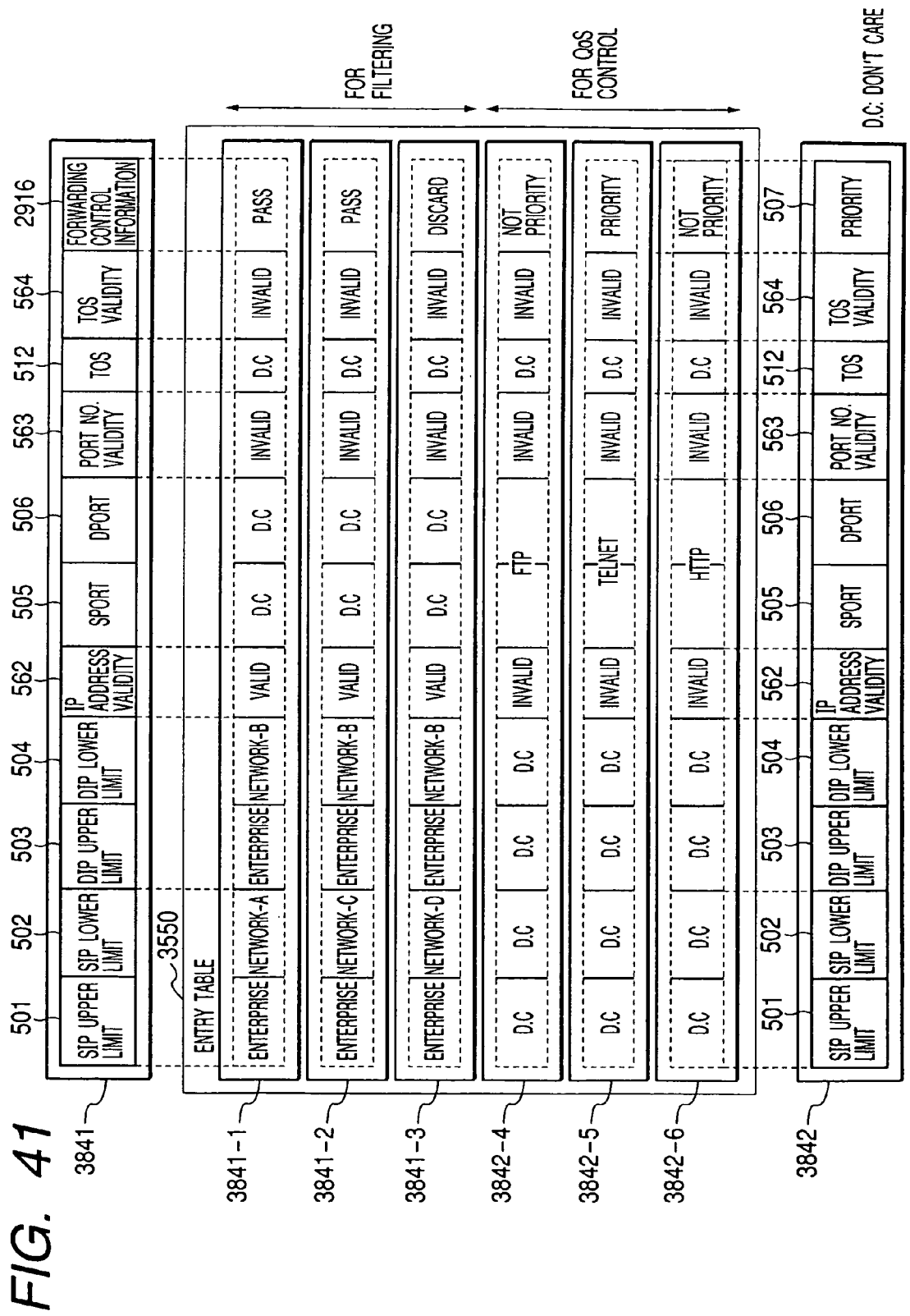
FIG. 41 is a diagram showing one example of entry contents at the time that flow conditions for filtering and QoS control differ from each other in an entry table for the two-stage detection mode.

A description will next be made of the difference in the number of entries at the time that the gateway router 329 shown in FIG. 2 executes each flow detection by reference to the entries different in flow conditions for QoS control and filtering. FIG. 40 shows an entry table 3250 for a simultaneous flow detection type, and FIG. 41 shows the contents of an entry table 3550 for a two-stage flow detection type, respectively.

Flow conditions for filtering are given as SIP=enterprise network-A: 321, enterprise network-C: 323, enterprise network-D: 324 and DIP=enterprise network-B: 322. Flow conditions for QoS control are applications (FTP, TELNET, HTTP). A packet of FTP/HTTP is non-preferentially transferred or forwarded and a packet of TELNET is preferentially forwarded. In the present example, seven entries are necessary for the simultaneous flow detection type entry table 3250, whereas six entries may be provided in the two-stage flow detection type entry table 3550. The number of combinations of the flow conditions for filtering and QoS control are given as three in the present example. However, the more the number of these combinations increases, the more the difference in the number of entries to be registered becomes great.

Judging from the above description, the number of the entries to be registered in the entry table is reduced if the simultaneous flow detection type is adopted when the flow conditions for QoS control and filtering are the same, whereas the number thereof is reduced if the two-stage flow detection type is adopted when the flow conditions are different from each other.

A "mode switching type" flow detection capable of reducing the number of entries by performing the switching between the two-stage flow detection type and the simultaneous flow detection type will be explained as a twelfth embodiment of the present invention while making a comparison with the two-stage flow detection type.

Figure 42:
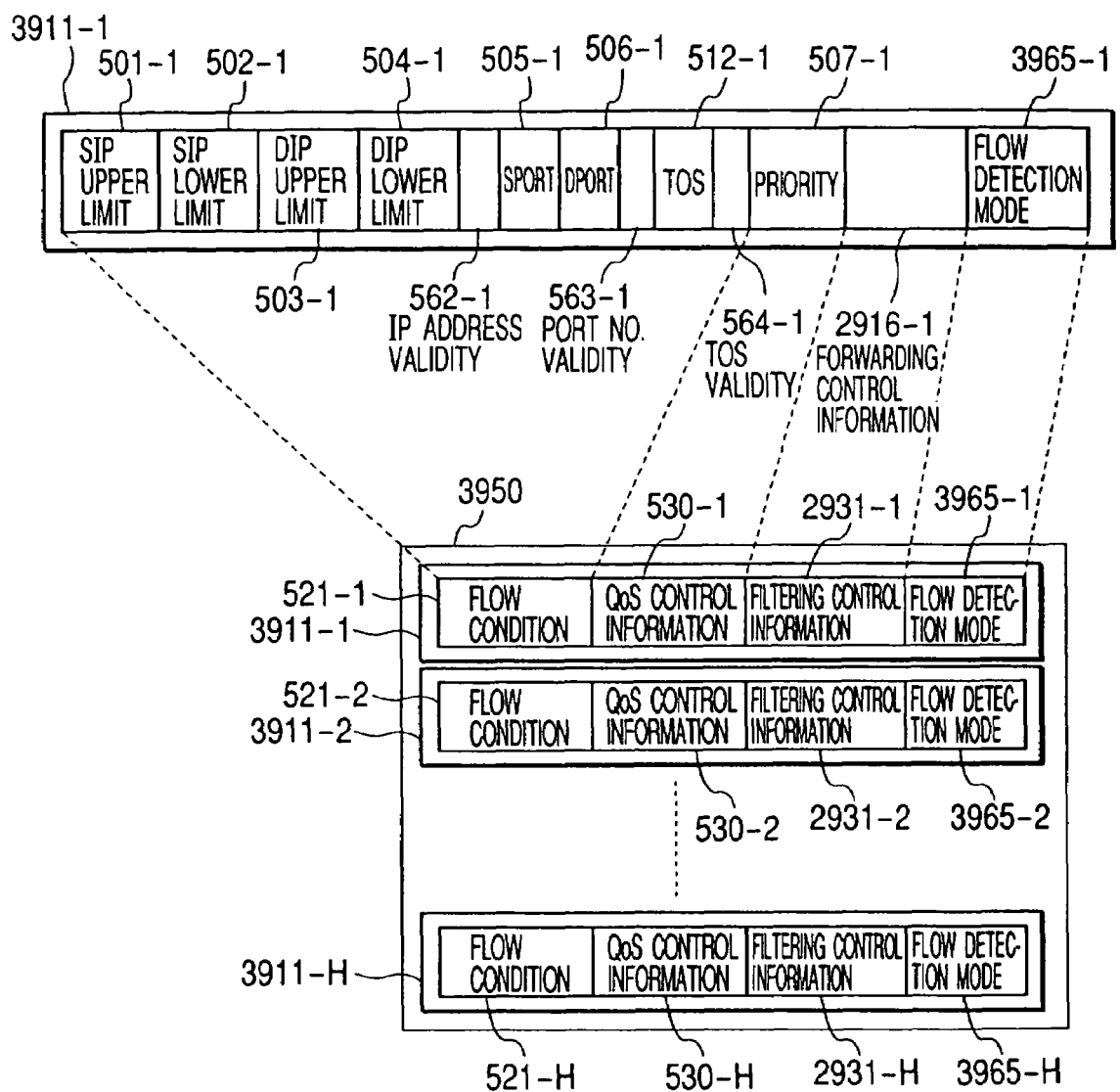
FIG. 42 is a diagram illustrating one embodiment of an entry table in which the switching between the simultaneous detection mode and the two-stage detection mode is allowed.
Figure 43:
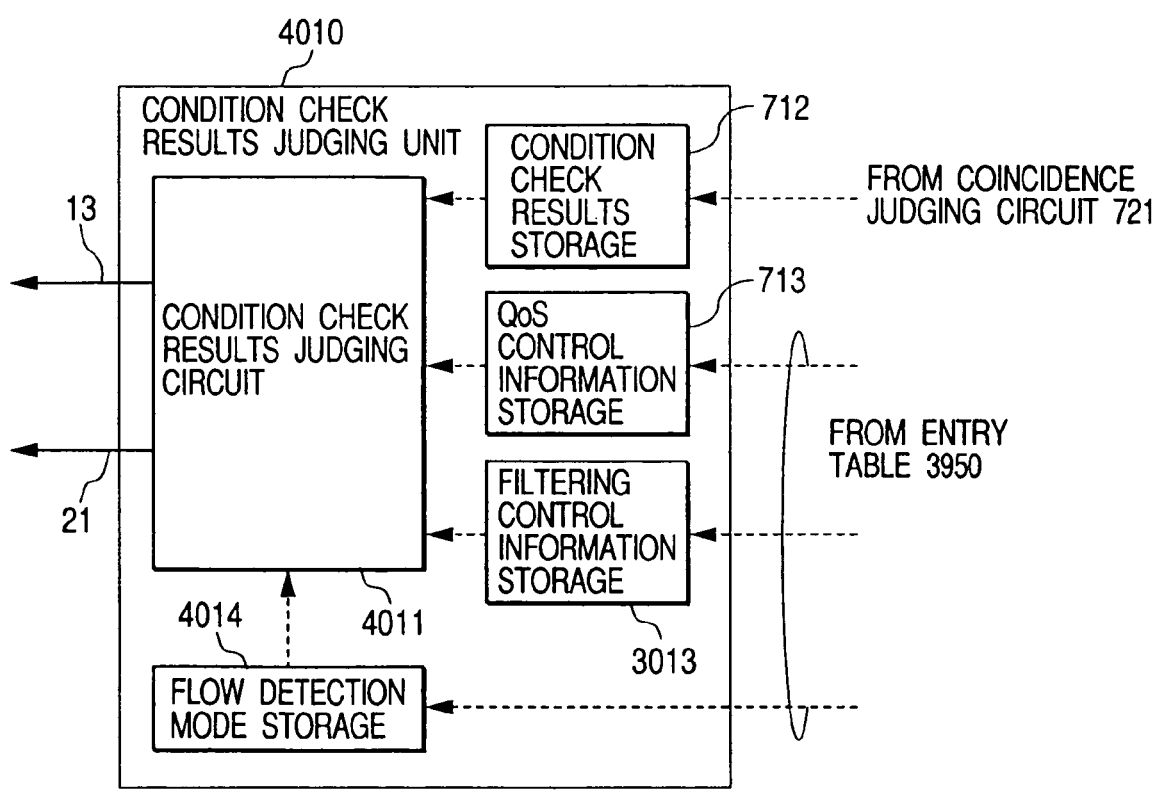
FIG. 43 is a block diagram depicting a condition check results judging unit which allows the switching between the simultaneous detection mode and the two-stage detection mode.
Figure 44:
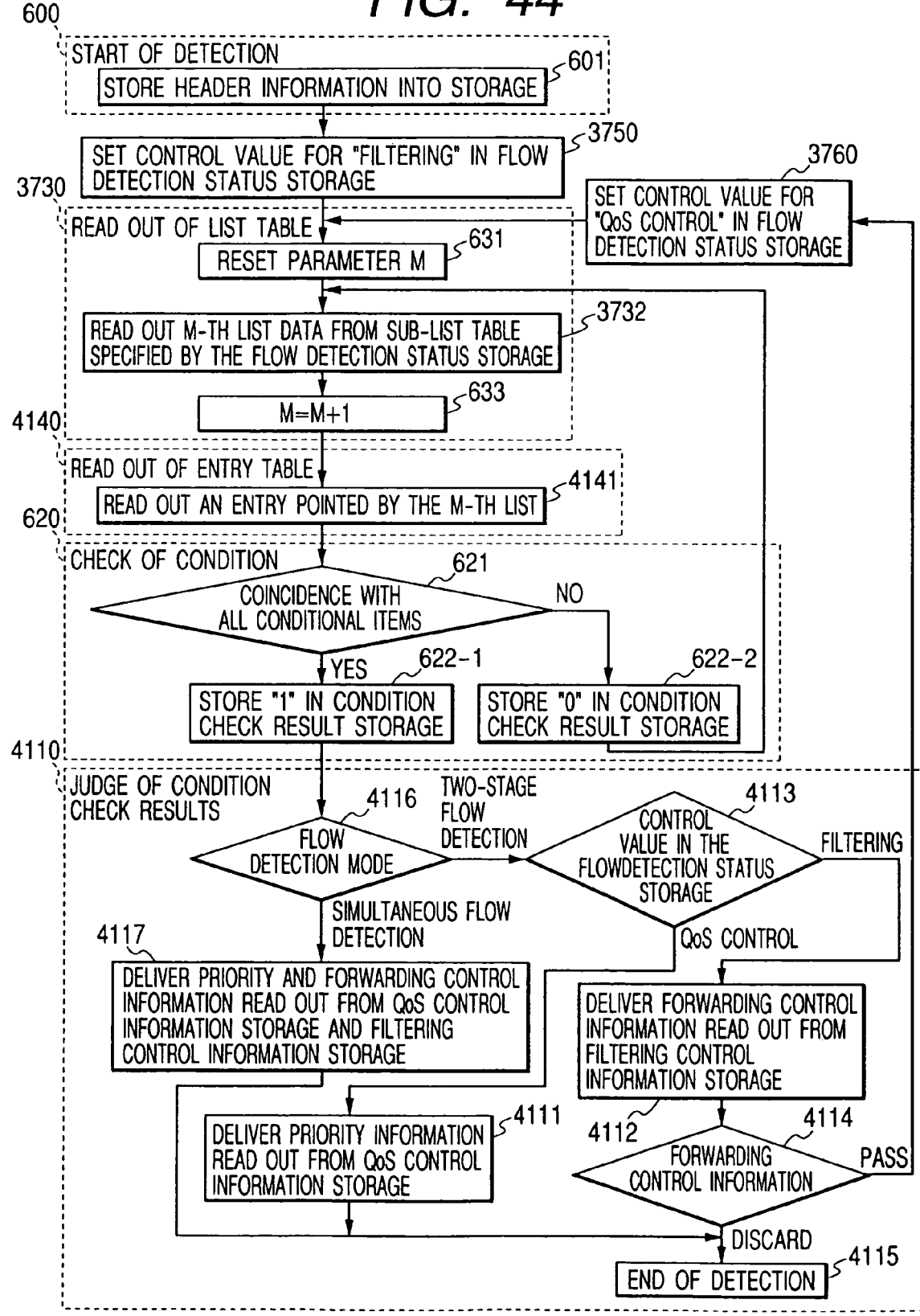
FIG. 44 is a flowchart for describing the operation of a flow detector capable of performing a detection mode changeover.

FIGS. 42, 43 and 44 respectively show one examples of an entry table 3950, a condition check results judging unit 4010 and a control flowchart applied to the mode switching type flow detection.

As shown in FIG. 42, each entry 3911 of the entry table 3950 has the contents obtained by adding a flow detection mode 3965 to each entry 3211 of the simultaneous flow detection type. A value indicative of either the simultaneous detection type or the two-stage flow detection type is set to the flow detection mode 3965. As shown in FIG. 43, the condition check results judging unit 4010 is provided with a flow detection mode storage 4014 for storing the flow detection mode 3965 therein.

In the mode switching type flow detection, the priority information 507, forwarding control information 2916 and flow detection mode 3965 of each read entry are respectively stored in the QoS control information storage 713, filtering control information storage 3016 and flow detection mode storage 4014 without regard to the status value of the flow detection status storage 3670 in Step 4141 of a read out of entry table 4140 as show in FIG. 44. If a condition check results judging circuit 4011 refers to a status value of the flow detection mode storage 4014 (Step 4116) and the flow detection mode indicates the simultaneous flow detection type in a judge of condition check results 4110, then the condition check results judging circuit 4011 outputs the priority information read from the QoS control information storage 713 and the forwarding control information read from the filtering control information storage 3016 to the output FIFO allocation circuit 121 as packet priority information 13 and packet forwarding control information 21 respectively (Step 4117) and terminates the flow detection (Step 4115).

When the flow detection mode indicates the two-stage flow detection, the condition check results judging unit 4010 determines the status value of the flow detection status storage 3670 (Step 4113). If the status value indicates a filtering state, then the condition check results judging unit 4010 outputs the contents of the filtering control information storage 3016 to the output FIFO allocation circuit 121 as forwarding control information 21 (Step 4112). Thereafter, the forwarding control information is checked (Step 4114). If the forwarding control information indicates a packet discard, then the flow detecting operation is terminated without executing the flow detection for QoS control (Step 4115). When the forwarding control information indicates the pass of a packet, the condition check results judging unit 4010 consecutively sets a value indicative of a QoS control state to the flow detection status storage 3670 to execute the flow detection for QoS control (Step 3760) and returns to the read out of list table 3730. When the status value of the flow detection status storage 3670 indicates the QoS control, the condition check results judging circuit 4011 outputs the contents of the QoS control information storage 713 to the output FIFO allocation circuit 121 as packet priority information 13 (Step 4111) and terminates the flow detection (Step 4115).

According to the mode switching type flow detection described above, since the switching between the two-stage flow detection and the simultaneous flow detection can be done every entries, the manager for the router 100 can reduce the number of the entries by designating the suitable flow detection mode corresponding to the flow condition for each entry.

A description will next be made of pipeline processing at the flow detection of the input line limitation type.

FIG. 16A shows the manner in which in the input line limitation type flow detection, the list table read out unit 730, the entry table read out unit 740, the condition check unit 720, and the condition check results judging unit 710 respectively execute the read out of list table 630, the read out of entry table 640, the check of condition 620, and the judge of condition check results 610 on a time-serial basis. Here, a "packet 1" indicates that the flow detector 112 performs the start of detection 600 on the received packet 1. Entries N (where N=1, 2, . . . ) indicate that the condition check results judging unit 710, the condition check unit 720, the list table read out unit 730, and the entry table read out unit 740 respectively execute processes (the judge of condition check results 610, the check of condition 620, the read out of list table 630, and the read out of entry table 640) corresponding to the entries N. Incidentally, the time intervals required to perform each individual processes referred to above are set to the same in FIG. 16A for simplification.

In serial processing, other processing units or processors are not operated while one processing unit or processor is under the execution of a process. While, for example, the check of condition 620 is being executed, the entry table read out unit 740 stops processing. Thus, according to the serial processing, a processing time equivalent to the sum of time periods necessary for the read out of list table 630, the read out of entry table 640, the check of condition 620 and the judge of condition check results 610 is required to make decisions as to respective entries.

It is desirable that in order to speed up the flow detection, the aforementioned plurality of operations (630, 640, 620 and 610) are subjected to pipeline processing and the four processors are activated at all times as shown in FIG. 16B. When, for example, a processor-A terminates processing of each entry-N under the pipeline processing, the processor-A is next capable of starting processing of an entry-N+1 regardless of whether a processor-B for processing the subsequent process steps has finished the processing of each entry-N. By processing each entry in the entry table by the pipeline processing in this way, a process per entry can be shortened to one processing time. In the example shown in FIG. 16B, the processing speed can be improved to four times that for the serial processing.

The pipeline processing is effective even for flow detections of other types (output line limitation type, SAMAC limitation type, DAMAC limitation type, source subnet limitation type and destination subnet limitation type) other than the input line limitation type.

The header processing unit 110 and packet I/O unit 120 shown in FIG. 1 are respectively formed of different semiconductor chips. When the priority information for QoS control is determined, for example, information communicated between a semiconductor chip equipped with the header processing unit 110 and a semiconductor chip group which constitutes the packet I/O unit 120, may include header information 11, output line information 12, packet priority information 13 and DAMAC information 15. Namely, since user data large in the amount of information is not transferred between the header processing unit 110 and the packet I/O unit 120, it is not necessary to allocate input/output pins of these semiconductor chips for user data transfer. Since the semiconductor chip equipped with the header processing unit 110 is shared between a plurality lines, the provision of semiconductor chips for header processing every lines becomes unnecessary and the number of semiconductor chips can be reduced. Even when the routing processing unit 111, flow detector 112 and ARP processing unit 113 in the header processing unit 110 are respectively implemented on different semiconductor chips, advantages obtained by sharing of these components (the routing processing unit 111, flow detector 112 and ARP processing unit 113) remain unchanged.

Figure 19:
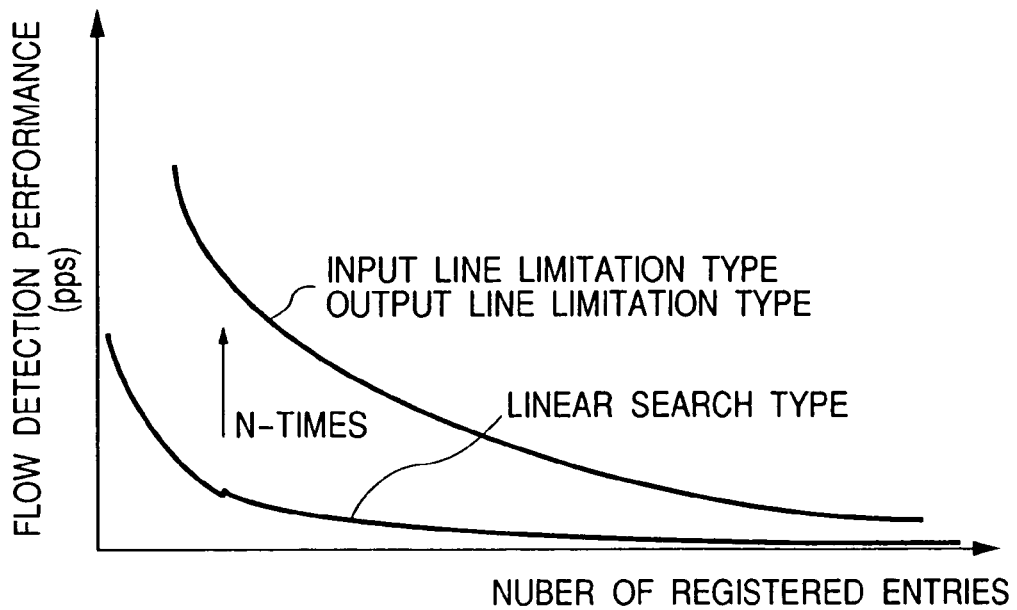
FIG. 19 is a diagram for describing a performance comparison between a flow detection based on a conventional linear search type and flow detections based on an input line limitation type and an output line limitation type according to the present invention.
Figure 20:
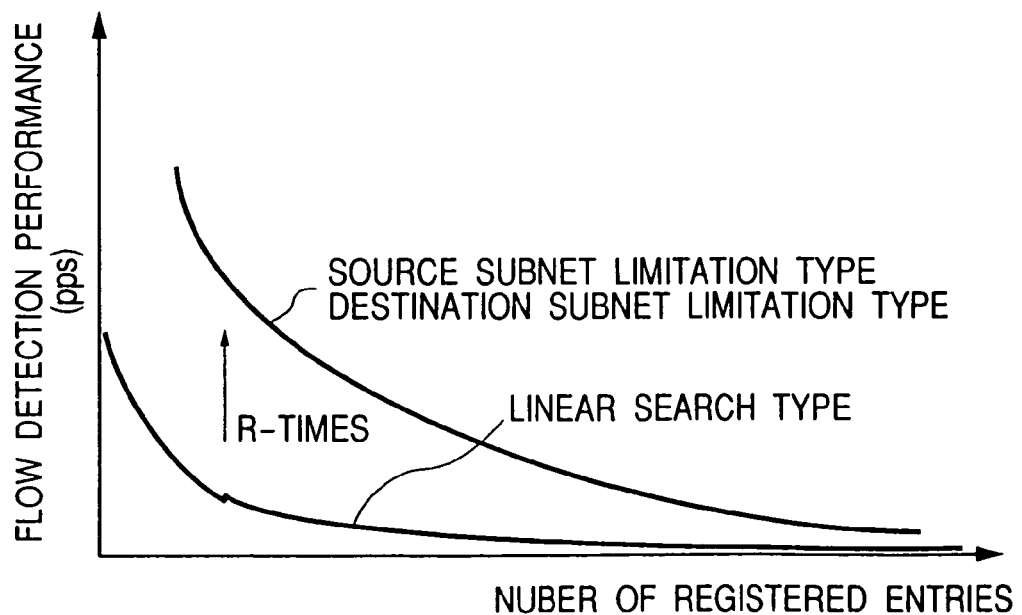
FIG. 20 is a diagram for describing a performance comparison between the flow detection based on the conventional linear search type and flow detections based on a source subnet limitation type and a destination subnet limitation type.
Figure 21:
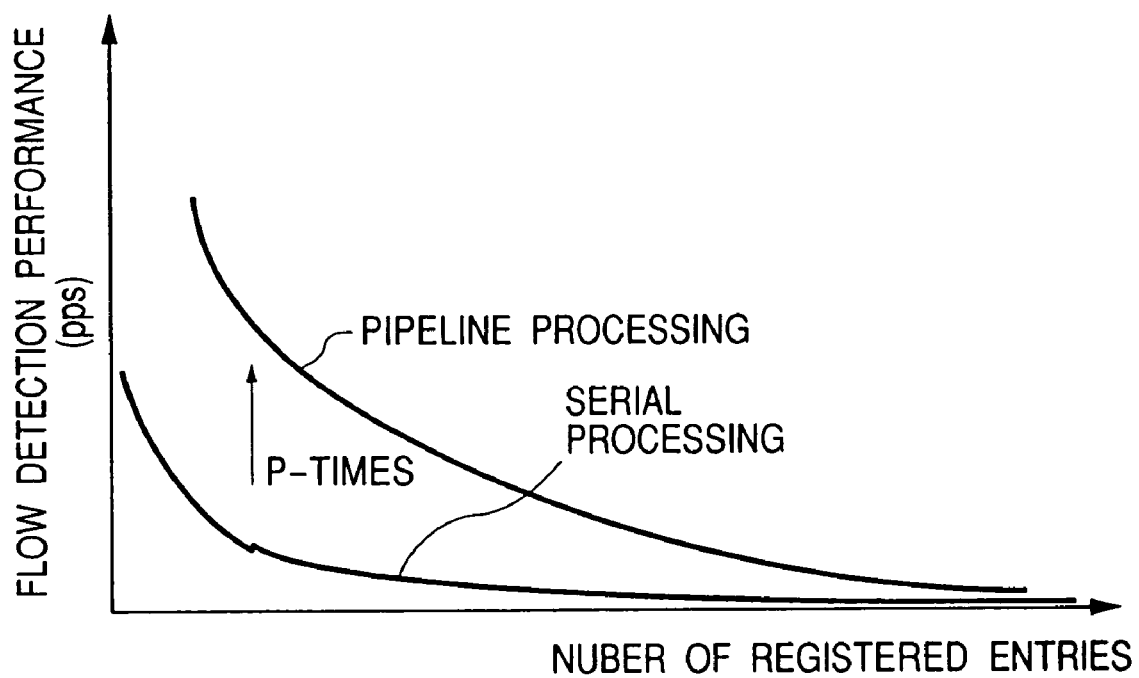
FIG. 21 is a diagram for describing a performance comparison between serial processing and pipeline processing.

FIGS. 19 through 21 show effects of the present invention respectively. In these drawings, the vertical axis indicates flow detection performance (pps: number of packets processable for one second), and the horizontal axis indicates the number of entries registered in an entry table.

FIG. 19 shows a graph in which a linear search type, an input line limitation type and an output line limitation type are compared with one another. When a router has N input lines and all the input lines are different in flow detection condition from one another, for example, enterprise networks different every lines are connected, the router needs to have flow detecting entries different from one another every input lines. In the linear search type, all these entries become objects to be detected or retrieved. According to the input line limitation type on the other hand, since only an entry group associated with an input line which coincides with that of the received packet may be set as an object to be retrieved, the number of entries to be retrieved results in 1/N as compared with the linear search type and the flow detection time is also shortened to 1/N, thus resulting in the acquisition of performance equal to N times that of the linear search type. Similarly to this, the output line limitation type can implement performance equivalent to N times that of the linear search type where a router has N output lines and all the output lines are different in flow detection condition from one another.

FIG. 20 shows a graph in which a linear search type, a source subnet limitation type and a destination subnet limitation type are compared with one another.

Assuming that when packets sent from R source networks are flow-detected, all the flow detections for these source networks differ from one another, a router needs to have R or more flow detecting entries prepared for respective source subnets. All these entries are objects to be retrieved in the linear search type flow detection, whereas in the source subnet limitation type flow detection, only an entry group associated with a source subnet which coincides with that of the transmitted packet or received packet becomes an object to be retrieved. Thus, the source subnet limitation type is capable of implementing performance equal to R times that of the linear search type. Similarly, when R destination networks have different flow detection conditions respectively, the destination subnet limitation type flow detection implements performance equivalent to R times that of the linear search type.

FIG. 21 illustrates a graph in which both performance obtained at the time that the input line limitation type flow detection is performed with serial processing and pipeline processing, are compared. When the input line limitation type flow detection shown in FIGS. 11 and 12 by way of example is executed according to the pipeline processing, the present input line limitation type can implement performance equal to four times as compared with the serial processing. When the flow detection consists of parallel-processable p processes, the pipeline processing obtains performance equal to P times that for the serial processing.

According to the present invention, as apparent from the above description, an entry table in which flow conditions for QoS control or filtering are defined, comprises a plurality of subtables corresponding to specific items attendant to header information of packets, and each entry group to be referred to for the purpose of checking flow conditions of each received packet can be limited to a specific subtable. Therefore, even when flow conditions for user identification information, protocol information, priority information, etc. are made complex, for example, a flow detection can be done at high speed.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A packet forwarding apparatus provided with a plurality of line interface units each connected to an input line and an output line, comprising:
   a routing processing unit for referring to a routing table, based on header information of each of packets received from the input line interface units, and specifying one of said output lines from which the packet should be output;
   a common table for storing a plurality of entries therein;
   a list table for storing therein pointer addresses for accessing the entries lying within said common table, said list table being divided into a plurality of sub-list tables corresponding to the values of a specific flow attribute;
   a flow detection unit for retrieving, by referring to the common table, packet transfer control information defined by one of said entries of which the flow condition is satisfied with parameter values extracted from header information of the received packet; and
   a packet forwarding unit for transferring said received packet to one of said line interface units connected to the output line specified by said routing processing unit;
   wherein said flow detection unit refers to one of said sub-list tables specified by the value of the specific flow attribute associated with each of said received packets to retrieve an entry having a flow condition satisfied with the header information of the received packet, based on pointer addresses stored in the specified sub-list table; and
   said packet forwarding unit controls the transfer of each of said received packets to one of said line interface units in accordance with the packet transfer control information notified from said flow detection unit.

2. The packet forwarding apparatus according to claim 1, wherein said list table comprises a first list table for use in filtering of said received packets and a second list table for use in forwarding control of said received packets, and both of said first and second list tables are divided into a plurality of subtables corresponding to the valves of said specific flow attribute, respectively, and
   said flow detection unit selectively refers to said first and second list tables for each of said received packets to retrieve filtering control information and said transfer control information related to each of said received packets.

3. The packet forwarding apparatus according to claim 2, wherein a memory region for forming said common table and said flow detection unit are integrated onto the same semiconductor substrate.

4. The packet forwarding apparatus according to claim 2, wherein a memory region for forming said common table, said flow detection unit, and said routing processing unit are integrated onto the same semiconductor substrate.

* * * * *